Dec. 8, 1970   H. E. ROGERT ET AL   3,546,671
APPARATUS FOR DETERMINING ONE OR MORE GEOMETRICAL PROPERTIES
Filed March 17, 1967   22 Sheets-Sheet 1

INVENTORS
HUGH E. ROGERT
JOSEPH H. SHANIS

BY *Norman R. Bardales*

ATTORNEY

Dec. 8, 1970   H. E. ROGERT ET AL   3,546,671
APPARATUS FOR DETERMINING ONE OR MORE GEOMETRICAL PROPERTIES
Filed March 17, 1967   22 Sheets-Sheet 2

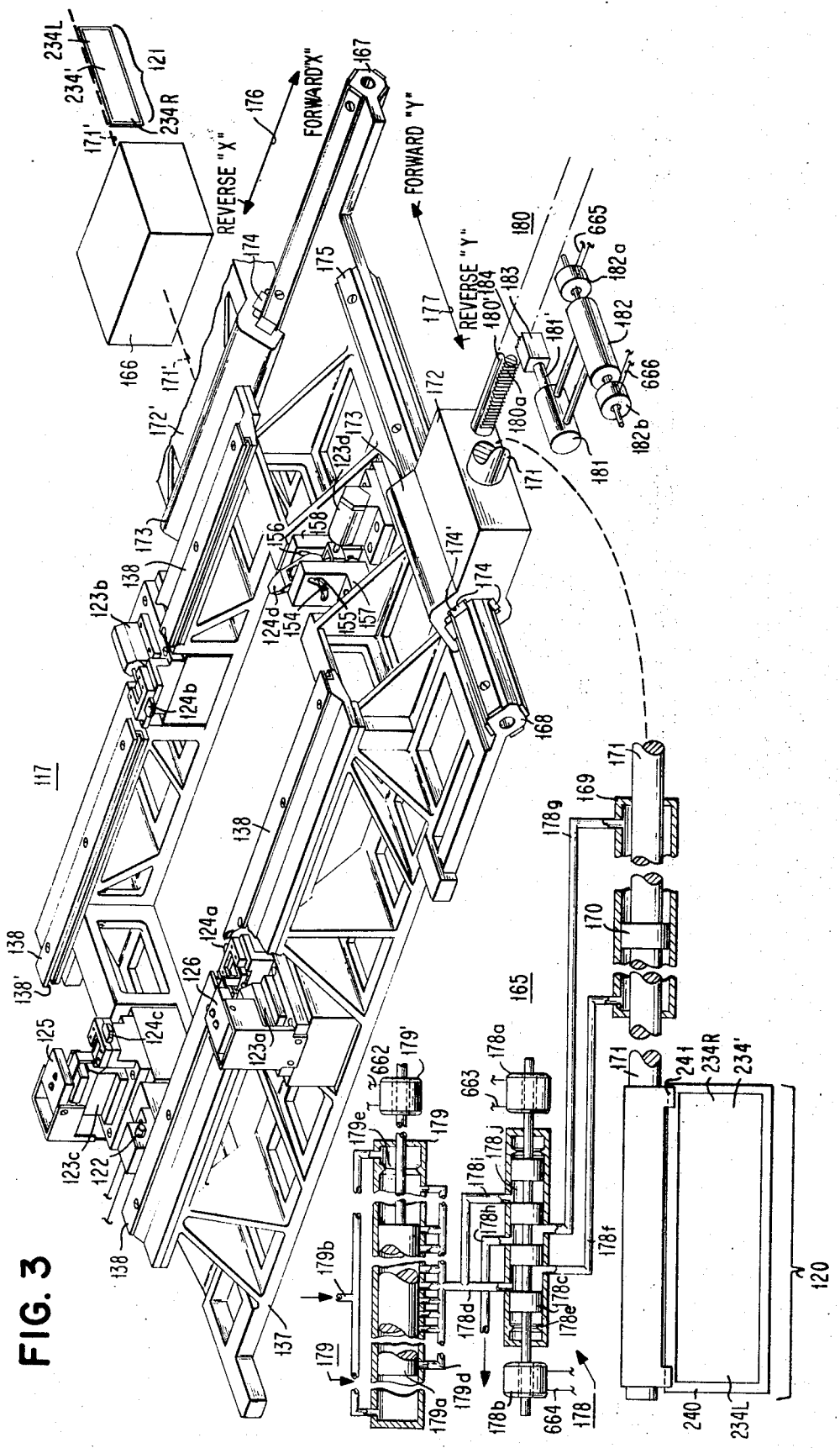

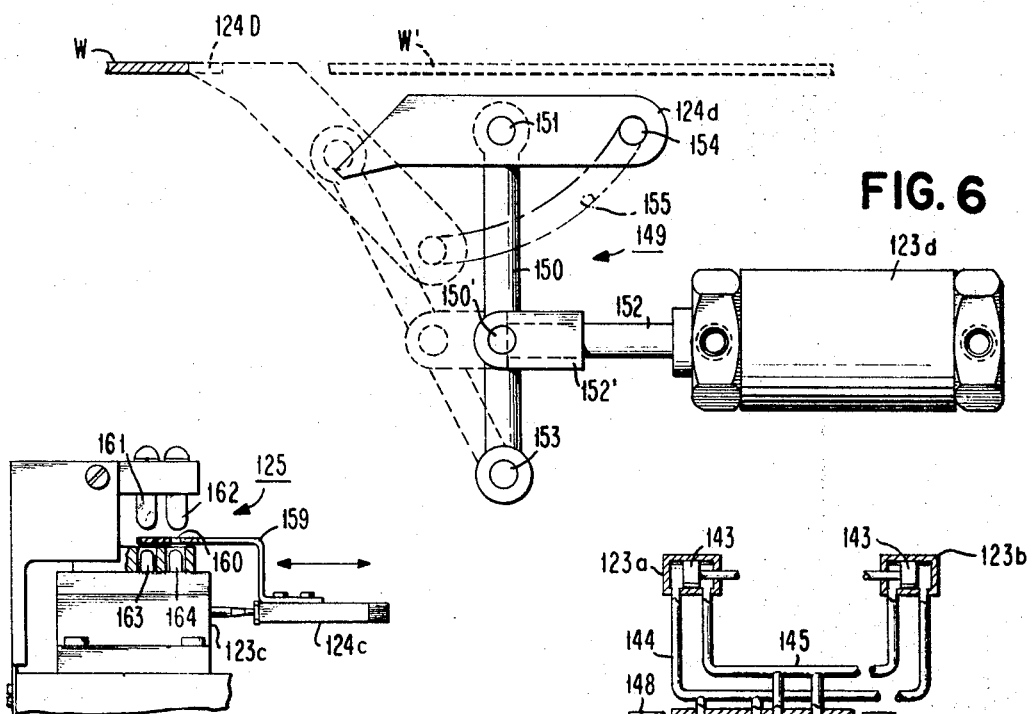
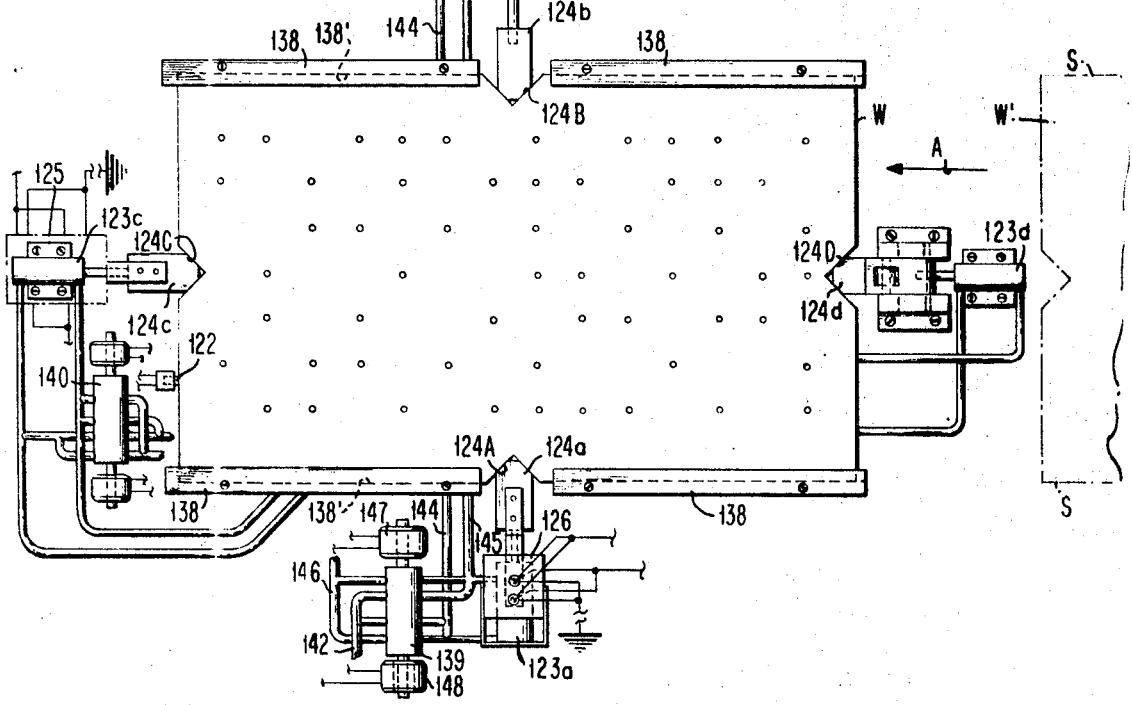

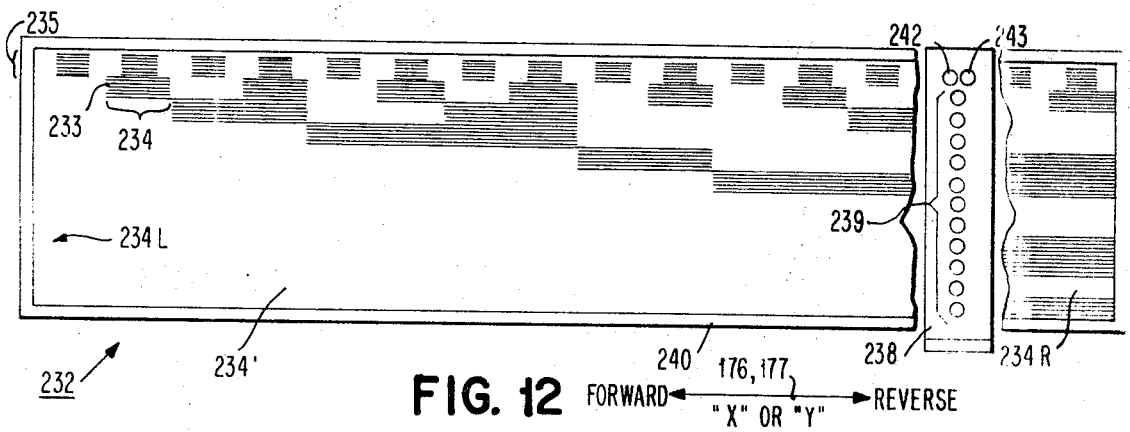
FIG. 12    FORWARD ←— "X" OR "Y" —→ REVERSE
           176,177
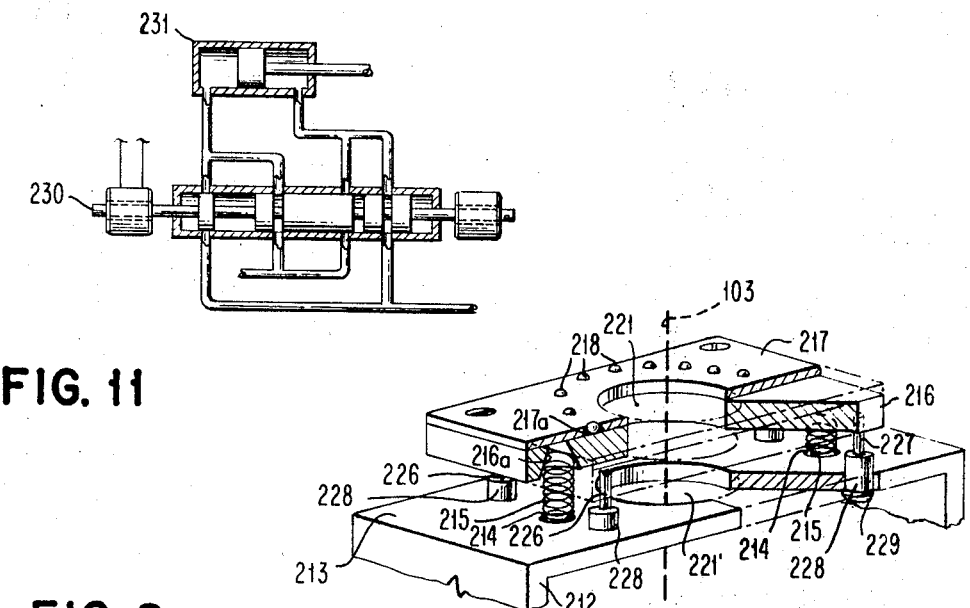
FIG. 11
FIG. 10
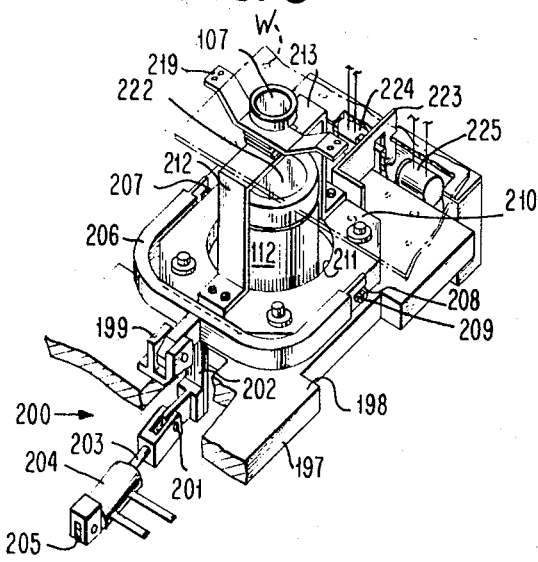
FIG. 8
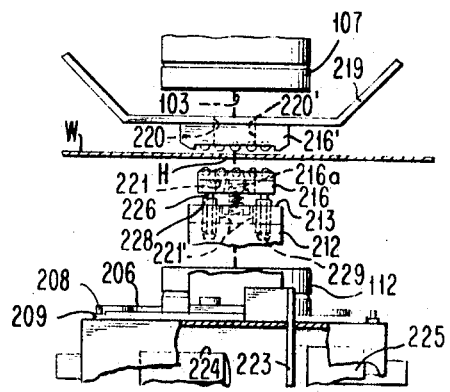
FIG. 9

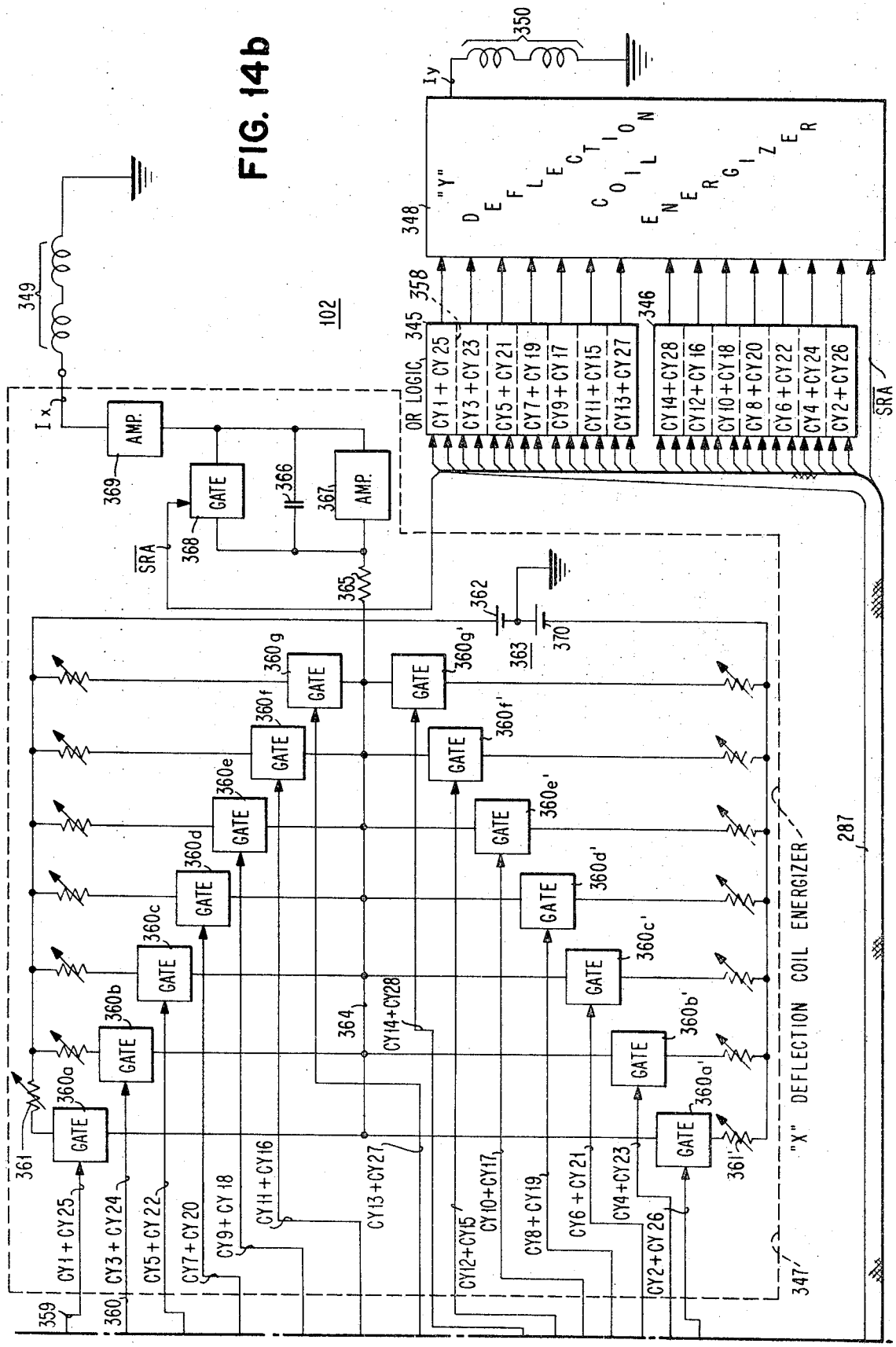

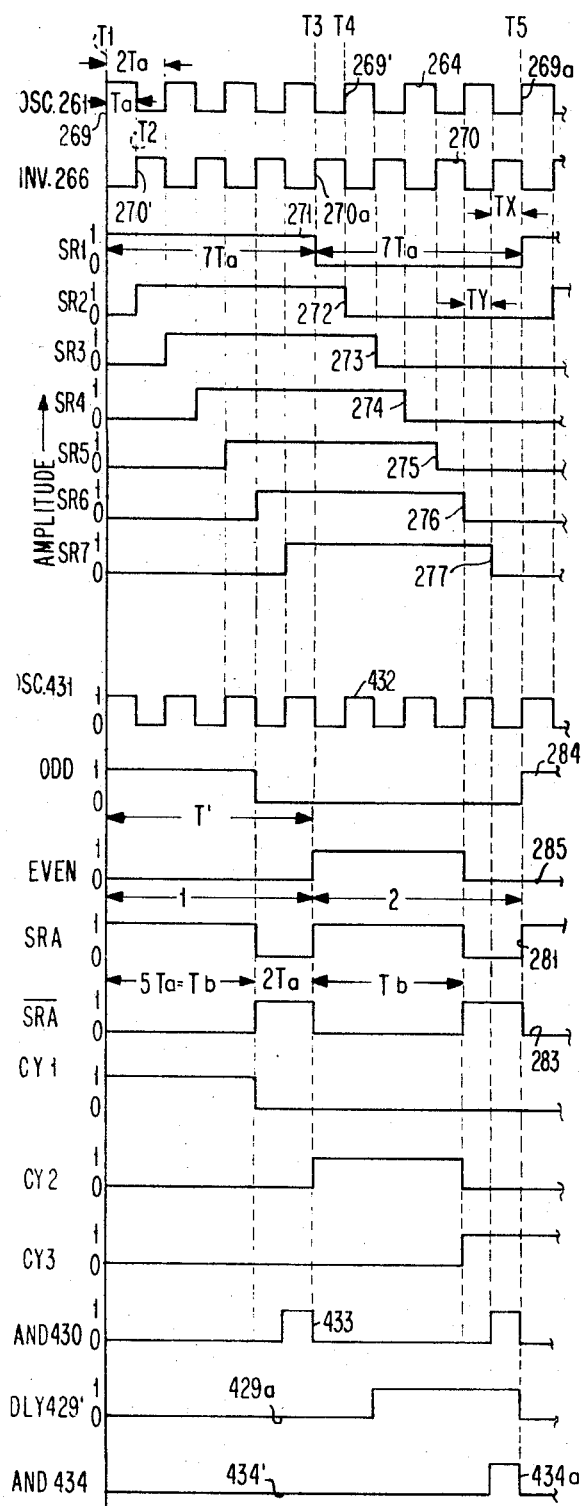
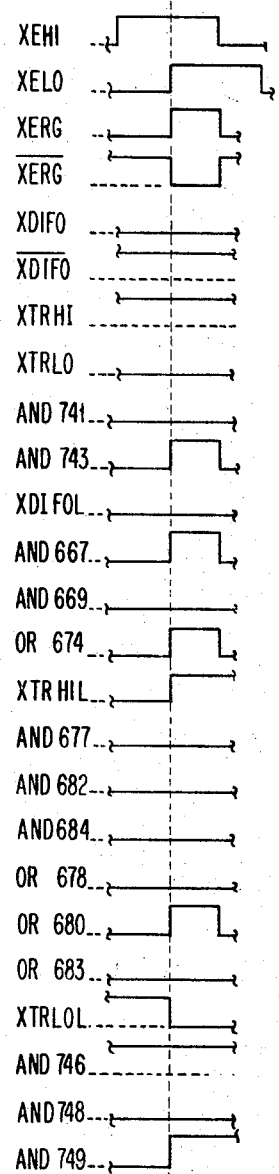
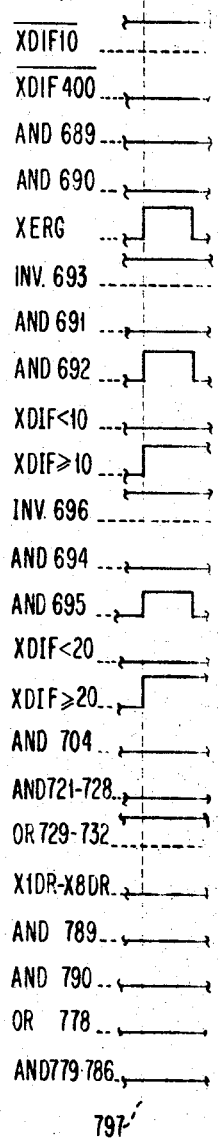

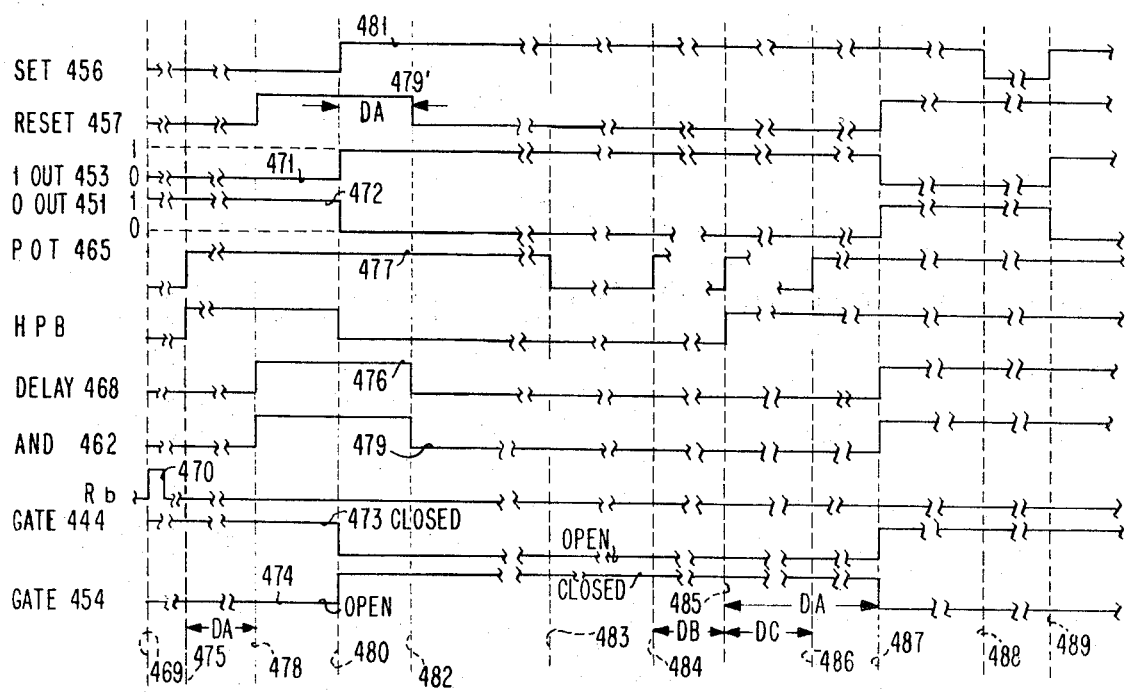
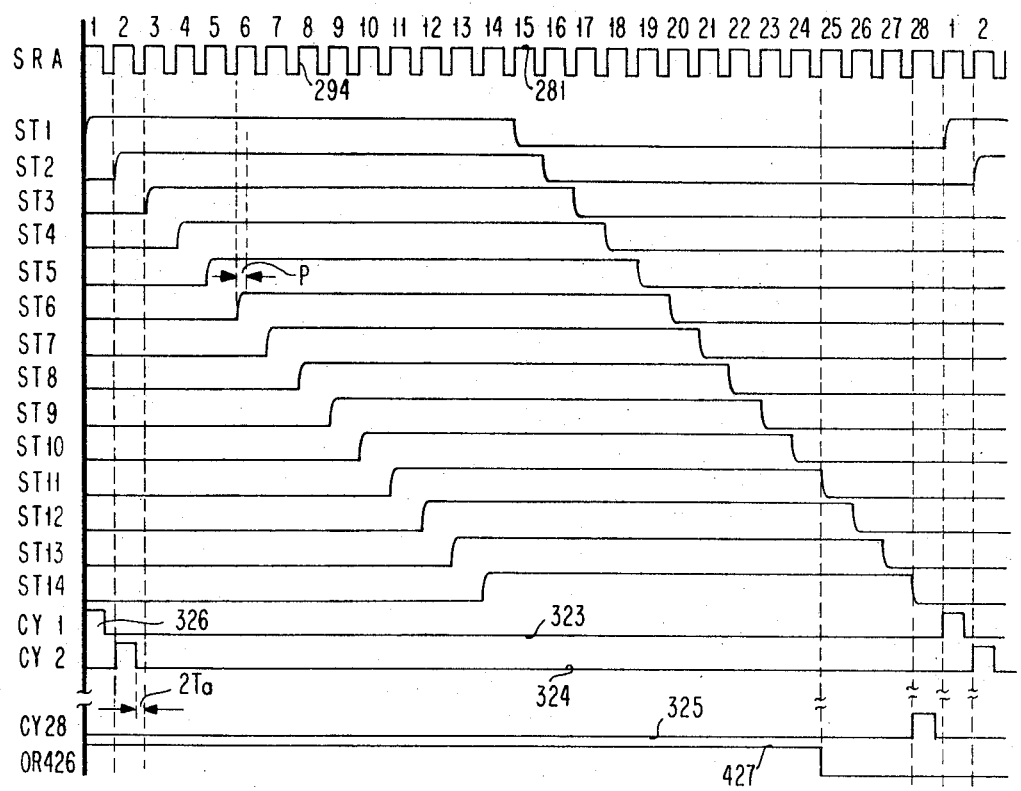

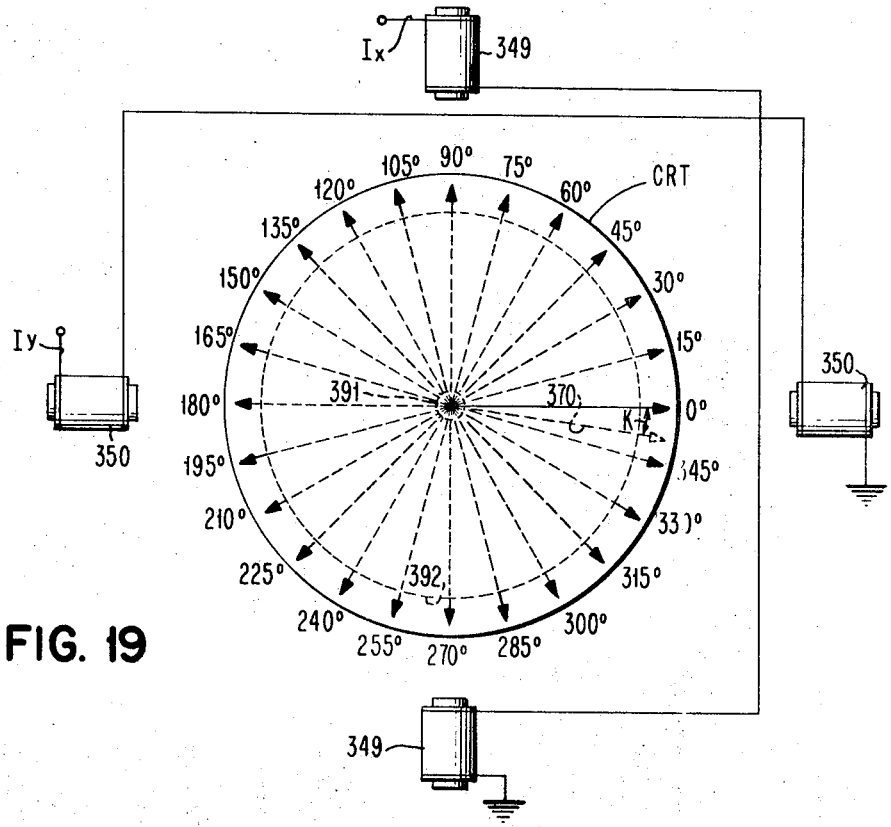
FIG. 19
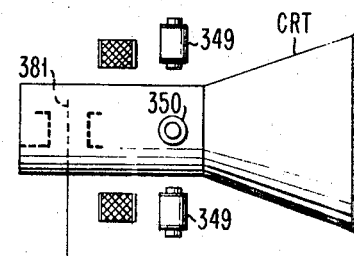
FIG. 20
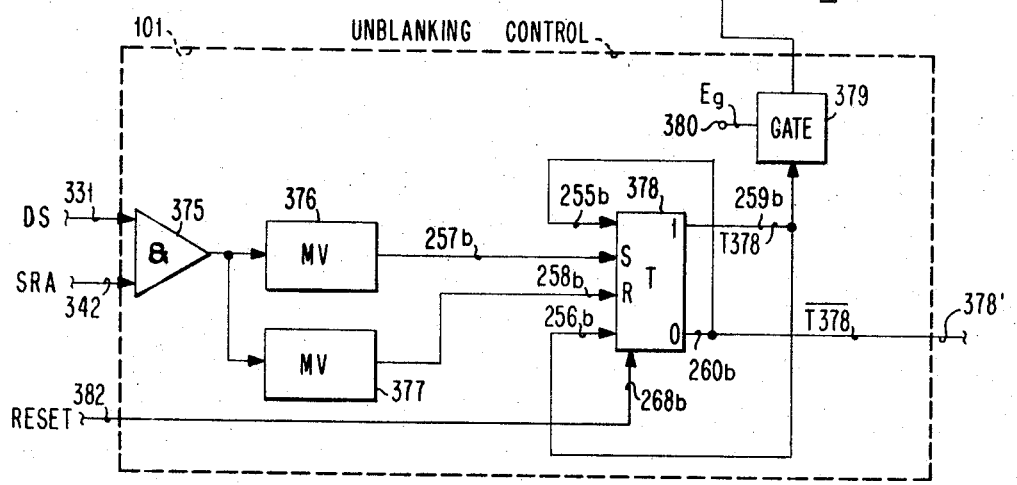

United States Patent Office 3,546,671
Patented Dec. 8, 1970

3,546,671
APPARATUS FOR DETERMINING ONE OR MORE GEOMETRICAL PROPERTIES
Hugh E. Rogert, Vestal, and Joseph H. Shanis, Endwell, N.Y., assignors to International Business Machines Corporation, Armonk, N.Y., a corporation of New York
Filed Mar. 17, 1967, Ser. No. 624,027
Int. Cl. G06k 9/00
U.S. Cl. 340—146.3                                31 Claims

ABSTRACT OF THE DISCLOSURE

Apparatus for determining one or more geometrical properties, such as size and/or location, of an object that has a scanner which employs a radial scanning pattern. A reference member is positioned with respect to the object such that the scanning element of the scanner simultaneously scans the object and the member. A sensor system detects the respective traversement by the scanning element of a predetermined spatial characteristic of the object and the traversement of a reference indicium carried by the reference member. The sensor system provides output signals at the particular traversements which are indicative of the property to be determined. The object and reference member are further positioned with respect to each other such that the particular traversements occur on the linear portion of the radial scan.

BACKGROUND OF THE INVENTION

This invention relates to apparatus for determining one or more geometrical properties of an object.

It is often desirable to ascertain some predetermined property of an object in an accurate and reliable manner. For example, in the packaging art and particularly in the microminiaturization art, it is critical that certain of the constituent components be manufactured with a predetermined geometrical configuration having close tolerances. It becomes incumbent in the manufacturing process to test or to inspect these components from a reliability and quality assurance standpoint to insure that the components are accurately manufactured with the desired geometrical configuration and with the prescribed tolerances. Furthermore, in those cases where the components are manufactured on a mass production basis, it is also desirable that the rate of testing or inspecting these components be compatible to the rate and/or quantity at which the components are being produced.

Another example where it is desirable to ascertain some predetermined geometrical property of an object also occurs in the packaging art. As is well known to those skilled in the art, the constituent components are generally located in the package and with respect to each other in a predetermined and precise manner. The exact locations of the components are therefore critically interrelated and must be within certain high tolerances. Consequently, there is a need for testing or inspecting the components to ascertain whether or not they are at their respective predetermined locations and/or within the prescribed tolerances. Again, this testing or inspecting must be compatible with mass production techniques.

Heretofore, there has been no system in the prior art which can provide the requisite accuracy for determining a predetermined geometrical property of an object in a fast and reliable manner. For example, visual inspecting or testing of the object with mechanical aids such as micrometers, measuring microscopes and the like are common and well known in the art. However, because of the manner in which the test is performed when utilizing such devices, the performed tests are subject to errors due to operator eye fatigue and/or operator manipulation and the like. Furthermore, this type of operator inspection is not conducive to the demands of today's mass production techniques.

Scanning systems of the prior art have tried to overcome some of the problems associated with the aforementioned visual and operator manipulated apparatus. These scanning systems heretofore employed a parallel line scanning pattern. Because of the distortion associated generally with the terminal portions of each line scan as well as the distortion associated with the upper and lower scanning lines of the pattern, these systems have been found to be unreliable for ascertaining the accuracy of a geometrical property of an object. In addition, these systems are extremely complex because of the scanning pattern utilized and the manner in which the associated data must be correlated. More specifically, the scanning element is capable of providing information in only one dimension. In order to obtain information concerning the other dimension of the object, it is necessary to detect the first and last scanning lines which intercept the object and to tally the number of scans that occur from the first to the last scanning line. Alternatively, the parallel line scanning pattern must be performed twice, once in the direction of the first dimension and once in the direction of the second dimension. Such a scanning technique, however, effectively doubles the time for performing the test and is undesirable for rapid testing. In either case, these prior art systems are further susceptible to compounded inaccuracy due to the aforementioned distortions associated with the parallel line scanning pattern.

SUMMARY OF THE INVENTION

It is an object of this invention to determine one or more geometrical properties of at least one object by utilizing a radial scanning pattern.

It is another object of this invention to provide apparatus, which utilizes the aforementioned radial scanning pattern, that is highly accurate, reliable and/or adaptable to mass production techniques.

Another object of this invention is to provide apparatus, which utilizes the aforementioned radial scanning pattern, for determining the size and/or location of the object(s).

Still another object of this invention is to provide apparatus for determining one or more geometrical properties, such as diameter size, eccentricity, and/or freedom from debris therein, of holes drilled through a workpiece, and particularly a printed circuit card and the like.

Still another object of this invention is to provide apparatus for determining the respective locations of the holes drilled through a workpiece such as a printed circuit card and the like.

Still another object of this invention is to provide an optical-electronic scanner utilizing a radial scanning pattern for determining one or more geometrical properties of plural objects which is automated and digitally controlled.

According to one aspect of the invention, there is provided apparatus for determining at least one geometrical property of at least one object having at least one spatial characteristic. A reference member is provided which has at least one indicium. A scanning element, which is generated by a scanner means, scans the object and the reference member simultaneously in a radial scanning pattern having at least one scan. The respective traversements by the scanning element of the spatial characteristic of the object and the indicium of the reference member are detected by detector means which provides an output signal proportional to the geometric property.

According to another aspect of the invention, the object and the reference member are so positioned that the traversements occur within the center portion of the scanning element's path.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 3 is a perspective view of the positioning table of FIG. 1;

FIG. 4 is a plan view of a certain portion of the positioning table of FIG. 3 in which the workpiece W has been inserted and locked into position by the associated V-shaped latching members;

FIG. 5 is a partially schematic view of a typical actuating solenoid utilized to control one of the twin-operated V-shaped latching members;

FIG. 6 is an elevation view of the linkage mechanism utilized in conjunction with one of the V-shaped latching members;

FIG. 7 is a partial view of a sensor associated with one of the V-shaped latching members;

FIG. 8 is a perspective view of the card support assembly utilized in the embodiment of FIG. 1;

FIG. 9 is an enlarged partial view of certain elements of the card support assembly of FIG. 8;

FIG. 10 is still a further enlarged view of certain elements of the card support assembly of FIG. 8;

FIG. 11 is a schematic view of a typical actuating solenoid for operating a single actuating ram utilized in the embodiment of FIG. 1;

FIG. 12 is a partial view of the optical encoder of the sensor 120 of FIG. 2;

FIGS. 14a–14b are schematic diagrams in block form of the clock 130 and deflection control 102 of FIG. 2;

FIG. 15 are waveforms of various signals associated with the circuitry of the preferred embodiment;

FIG. 16 is a schematic diagram in block form of the sweep cycle signal generator 250 of FIG. 14a;

FIGS. 17–18 are waveforms of various signals associated with the circuitry of the preferred embodiment;

FIG. 19 is a schematic view of the CRT face of the radial scanner utilized in the embodiment of FIG. 1;

FIG. 20 is a schematic diagram in block form of the unblanking control 101 of FIG. 2;

FIG. 25 are waveforms of various signals associated with the circuitry of the preferred embodiment;

FIGS. 26a–26g are schematic diagrams in block form of the comparator 505 of FIG. 24b;

FIGS. 28 and 29 are waveforms of various signals associated with the circuitry of the preferred embodiment;

In the figures, like elements are designated with similar reference numbers.

DESCRIPTION OF THE PREFERRED EMBODIMENTS

For purposes of explanation, the principles of the invention are described in a preferred embodiment referred to hereinafter as a drilled hole tester and which is illustrated generally in FIG. 1. This tester performs the diameter and/or location measurement of one or more holes, e.g. hole H, drilled in a workpiece W such as the substrate used for manufacturing printed circuit cards or the like. As is well known to those skilled in the art, these holes are subsequently plated so as to perform a conductive link between the lower and upper surfaces of the board and/or its intermediary layers, if any. As such, these cards require a high degree of freedom from eccentricity, and accuracy in the size and location of the holes. The preferred embodiment of the present invention provides the means for ascertaining this freedom and accuracy on a reliable and rapid basis.

Figure 2:
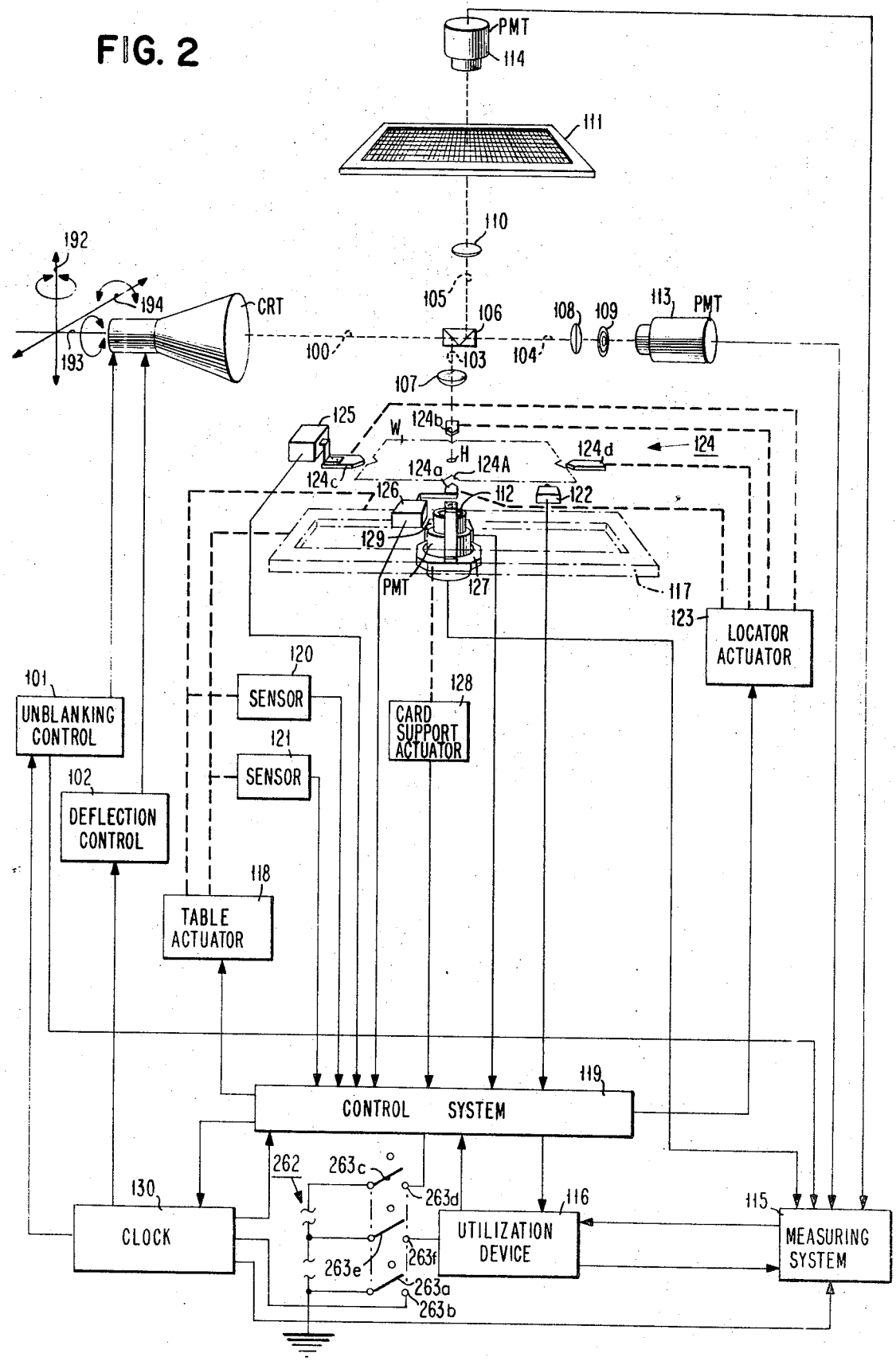
FIG. 2 is a schematic view of the embodiment of FIG. 1.
Figure 31A:
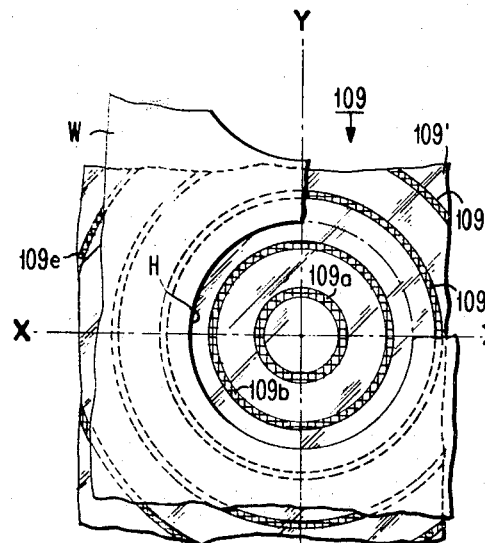
FIGS. 31a–31f are superimposed planar views of various embodiments of the reference members and objects and are utilized to illustrate certain principles of the invention.
Figure 31B:
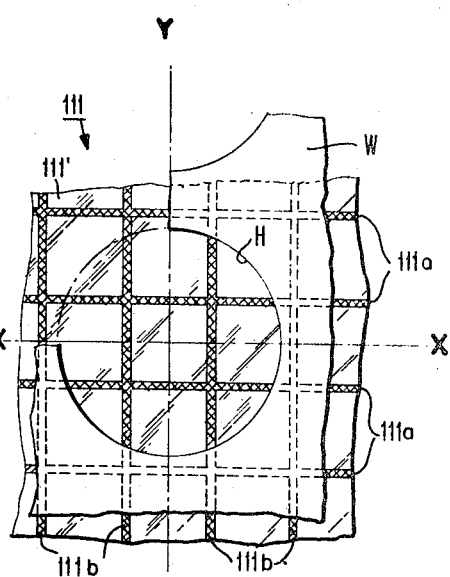

As is shown schematically in FIG. 2, a light beam 100 is utilized as the scanning element and is provided by a suitable light source, which in the preferred embodiment is a flying spot scanner having a cathode ray tube CRT and associated unblanking and radial sweep deflection control systems 101, 102, respectively. The light beam 100 emanating from the CRT is divided into three channels 103 to 105, respectively, by a beam splitter 106. Channel 103 is focused by lens system 107 onto the surface of the workpiece W under test. Channel 104 is focused by lens system 108 onto a member 109 having reference indicia. In the particular embodiment, the indicia are optically discriminative from their background and are arranged in an array comprising, for example, a plurality of concentric opaque rings 109a–109e, c.f. FIG. 31a. The rings are located on a transparency such as, for example, a glass plate 109' or the like by a photo-resist technique or may be mounted with respect to each other by any other suitable manner. The alignment of the beam with respect to member 109 is such that the initiation of each of its radial sweeps commences at or near the origin, i.e. center, of the rings. Each of the diameters of the rings is proportionally related to a different one of the predetermined standard diameter sizes of the various holes drilled in the card W and are utilized in the diameter size measurements of the holes under test. Lens system 110 focuses channel 105 onto the surface of a second reference member 111. The indicia of member 111 in the particular embodiment are illustrated by way of example as being arranged in array comprising a rectangular grid network. The indicia of member 111 are optically discriminative from their background. For example, horizontal and vertical opaque lines 111a and 111b, respectively, as shown in FIG. 31b, are located on a transparency such as, for example, a glass plate 111' by a suitable technique. The indicia of member 111 are utilized in the location measurements of the holes under test. Compatible sensors 112, 113, 114, which in the preferred embodiment are optical sensors and shown for example as photo multiplier tubes PMTs, sense the energy from the scanning element or light beam channels 103, 104, 105 as they emanate from the hole H under test, member 109 and member 111, respectively. Thus, the scanning element simultaneously scans the hole under test and the reference indicia of member 109 and/or member 111.

As is obvious to those skilled in the art, the scanning element need not be divided into two or three channels if the plane of the workpiece W is judiciously aligned with the plane of member 109 and/or the plane of member 111 such that the path of the scanning element simultaneously scans the workpiece and member 109 and/or member 111. Under these circumstances, the number of sensors required would be equal to the number of scanning element channels. For example, where the planes of the workpiece W and both members 109 and 111 are aligned to be scanned commonly by a single scanning element channel only one sensor is required. If, on the other hand, the workpiece W and only one of the members 109 or 111 were to be scanned commonly by a single scanning element channel and the other reference member were to be scanned simultaneously by another scanning element channel, then under these circumstances two sensors would be required.

The PMTs 112, 113 and 114 detect the respective traversements by the scanning element of the edge of the hole and the particular indicia of members 109 and 111 which are in the path of the scanning element. The resulting output signals of the PMTs are fed to a measuring system 115 which in turn feeds data to a utilization device 116, such as a data processor, and which in the preferred embodiment is a general purpose digital computer. Data processor 116 is programmed to generate appropriate signals, hereinafter referred to as encoder ring signals #1–#5, which are utilized by the measuring system 115 to select electronically the appropriate reference diameter ring of the member 109 which is compatible to the standard diameter size of the particular hole under test.

The card W and member 111 are mounted in a fixed relationship with respect to each other and carried by an X-Y positioning table, partially shown in outline form in FIG. 2, and indicated therein by the reference number 117. Actuator 118 drives the table for each of the card positions selected for testing to the test station associated with channel 103. For this purpose, in the preferred embodiment, the data processor 116 is also programmed to provide the X-Y location addresses as reference signals that indicate the table position or positions of the one or more holes H of the card W selected to be tested. These reference signals are compared in control system 119 with the output signals of the table position sensors 120 and 121. The present or actual position of the table along the X and Y axes, as well as the respective particular directions of travel of the table along these axes, are sensed by sensors 120 and 121, respectively. System 119, in turn, provides signals to actuator 118 which drive or move the table to the particular selected position indicated by the X-Y location address reference signals. As a result, the card W is sequentially positioned with respect to channel 103, such that a different hole is tested thereat for each selected position of the table.

Furthermore, at each position of the table, the alignment of the beam with respect to member 111 is such that the initiation of a radial sweep is at or near the center of an exclusive transparent area defined by a pair of adjacent horizontal lines and the associated intersecting pair of vertical lines of member 111. Each of the radial sweeps used during the location measurements progress from a particular center and intersect the associated opaque line at right angles. Each of these centers is related to a particular pair of X and Y coordinates of the table coordinate system. The table coordinate system in turn is compatible to the X-Y coordinate system of the card W. One (or more) of the pairs of X and Y coordinates of the card coordinate system coincides with the standard or reference location (or locations) for the hole(s) or at least the hole(s) selected to be tested. Consequently, the table coordinate system and the X-Y coordinate system of the member 111 are related to the standard or reference locations for the centers of the various holes drilled in the card W which are under test when the card W is properly mounted with respect to the table. Members 111 is made interchangeable so that other reference members may be utilized which are compatible to other type cards employing a different X-Y coordinate pattern for the drilled holes.

In the preferred embodiment, other additional actuators and sensors are provided in order to automate the operation of the tester. For example, a sensor, illustrated by way of example as a limit switch 122, senses when the card W has been inserted into the drilled hole tester and generates an appropriate signal to the control system 119 which indicates this condition. The control system 119 also generates appropriate signals to the card locater actuator 123 which actuates a latching mechanism assembly indicated generally in FIG. 2 by reference numeral 124 that locks the card W into place with respect to the table 117, and consequently with respect to member 111, during the entire testing cycle of the card. In the preferred embodiment, the latching mechanism comprises four movable blunt edge V-shaped members 124a–124d, which coact in their locked positions with compatible V-shaped inserts 124A–124D, c.f. FIG. 4, provided at the four edges of the card for this purpose. Sensor means, shown as a pair of optical sensors 125, 126 provide signals which indicate when the members 124a–124d are in their locked, i.e. extended, and unlocked, i.e. retracted, positions. A card support assembly 127 is optionally provided to maintain the surface or plane of the flexible card W in the vicinity of the hole under test normal to the incident of the light beam or channel 103 emanating from lens 107. The assembly 127 is raised by actuator 128 when the table is in the desired position and a test is ready to be performed and is lowered after the performance of the test. An associated optical sensor 129 generates appropriate signals to the control system 119 indicating the supporting, i.e. upper or raised, and non-supporting, i.e. lower, positions of assembly 127. System 119 also provides a signal, hereinafter referred to as signal 334, to the clock timing generator 130 that in turn provides unblanking signals which unblank the CRT each time the assembly 127 is in its support position in a manner hereinafter described in greater detail. A signal, hereinafter referred to as signal $\overline{T378}$, is generated by unblanking control 101 which is utilized in measuring system 115 in connection with the diameter measurement test. Timing clock generator 130 also provides various timing signals to the deflection control 102, and also to the control and measuring systems 115 and 119. Control system 119 also generates command instruction signals to the data processor 116 at appropriate times in order for the latter to provide the various data associated with the holes to be tested, such as table address information, encoder ring reference information and the like.

Referring now to the various figures in greater detail and particularly to FIGS. 1–13, the drilled hole tester is preferably supported on a granite block base 131 to mitigate adverse effects due to vibrations and the like. On the upper surface of the granite base are mounted four flat bearing surface metal plates, e.g. plate 132, only three of which are shown in FIG. 1 for sake of clarity. Each plate supports a leg of the X-Y positioning table 117. Each of the legs comprises a flat disc-like member 133 which is threadedly connected to a bolt 134 and is mounted by, for example, a bracket 135 to the outer frame 136 of the positioning table. The table is leveled by adjusting the respective members 133 and bolts 134.

On the inner frame 137, shown more clearly in FIG. 3, of the positioning table 117 is mounted the guide support assembly comprising a pair of divided parallel elongated guide members 138. Each member 138 has an inner recess 138' into which one of the side edges S of the card, illustrated in its inserted and non-inserted positions, respectively, as the solid outline form W and partial outline form W' in FIG. 4, is inserted in the direction as shown by the arrow A in FIGS. 1 and 4. The two sections of each divided member 138 are spaced to allow for the operation of the associated side V-shaped members 124a and 124b with the V-shaped inserts 124A and 124B, respectively, of the card W, when it is in place as shown in FIG. 4.

Inner frame 137 also supports the latching mechanism assembly comprising the aforementioned four movable blunt edge V-shaped members 124a, 124b, 124c, 124d and their associated actuator 123, FIG. 2, comprising inter alia pneumatically operated ram cylinders 123a, 123b, 123c, and 123d, FIG. 3. As shown in greater detail in FIG. 4, cylinders 123a, 123b are twin operated by solenoid 139 and cylinders 123c and 123d are twin operated by solenoid 140.

For example, referring to FIG. 5, in the position shown for the spool 141 of solenoid 139, the intake pressure on line 142 will actuate the respective pistons 143, via line 144, of ram cylinders 123a and 123b so as to cause the members 124a and 124b, FIG. 3, to be in their locked or extended positions and thus into the card inserts 124A and 124B, the outlet pressure being returned by lines 145, 146. When the spool 141 is moved to the left of the position shown in FIG. 5, the intake pressure present on line 142 transmits to the reverse side of the pistons 143 via line 145 causing the pistons to move away from each other and thereby unlocking or retracting the members 124a and 124b from the inserts 124A and 124B of the card W. Under these conditions, the outlet pressure is returned via line 144 to the return line 146. To move the spool 141 to the right position with respect to FIG. 5, windings 147 and 148 are energized and de-energized respectively, thereby simultaneously extending each of the members 124a and 124b to their locked positions. Conversely, to move the spool to the left position as illustrated in FIG. 5, windings 147 and 148 are de-energized and energized, respectively, thereby retracting simultaneously the members 124a and 124b to their unlocked positions. Interconnection and operation of the ram cylinders 123c and 123d and solenoid 140 of FIG. 4 is accomplished in a similar manner as shown for the corresponding elements of FIG. 5.

As shown in FIG. 6, the member 124d is also depressed to a lower position by a suitable linkage mechanism, such as for example by the linkage mechanism indicated generally, by the reference numeral 149, when it is retracted by cylinder 123d in order that the card W', shown in outline form in FIG. 6 to illustrate its position prior to insertion for sake of clarity, may be passed over and inserted into and subsequently withdrawn from the inserts 138' of the guide members 138 without obstruction. For this purpose, the member 124d is pivotally connected to the link member 150 by the pivot 151. Piston rod 152 of cylinder 123d is connected to a bracket 152'. Link 150 is provided with a pivot 150', such that link 150 radially rotates in a counter clockwise direction as viewed from FIG. 6 about the lower pivot 153 when the rod 152 of cylinder 123d is actuated to its extended position. Affixed on two sides of the member 124d are pins, e.g. pin 154, each of which is inserted into one of the cam surfaces 155, 156 located on brackets 157, 158, respectively, cf. FIG. 3. Cam surface 155 is shown in outline form for purposes of clarity in FIG. 6. As is obvious to those skilled in the art, when the piston rod 152 is extended, the cam action will cause the member 124d to assume the position indicated in outline form in FIG. 6 thereby locking the member 124d in the V-shaped insert 124D of card W, partially shown in cross-section in FIG. 6.

The inner frame 137, FIG. 3, also carries the sensors 125, 126 associated with the latching mechanism assembly, the sensor 125 being shown in FIG. 4 in outline form for purposes of clarity.

Referring to FIG. 7, there is shown by way of example the sensor 125. It comprises a shutter member 159 which is connected at one end to the member 124c. The other end, shown partially in cross-section, has an aperture 160. This end of the shutter 159 is juxtaposed between the upper lamps 161, 162 and a pair of lower photo sensor diodes 163, 164, FIG. 7 being partially broken away thereat and illustrated in cross-section for sake of explanation. The lamp 161 is in exclusive optical alignment via the aperture 160 with the diode 163 when the member 124c is in the retracted position. Similarly, the lamp 162 is in exclusive optical alignment via the aperture 160 with the diode 164 when the member 124c is in the extended or locked position, as shown in FIG. 7. The optical sensor 126 FIG. 4, is similarly constructed and operated as the optical sensor 125 shown in FIG. 7.

The actuator 118 of FIG. 2 comprises two identical apparatus 165, 166, FIG. 3, for driving the table in the X and Y directions, respectively. For sake of clarity, only the apparatus 165, which is shown schematically and in partially broken away form in FIG. 3, is illustrated, it being understood that the apparatus 166, ilustrated in block form in FIG. 3, has corresponding elements similar to those of the apparatus 165. Accordingly, attached to table 117 are orthogonally mounted tracks or rails 167, 168, FIG. 3, of apparatus 165, 166, respectively. Apparatus 165 includes a ram cylinder 169 having a piston ratus 170. Its piston rod 171 is connected to bracket 172. A similar partially illustrated bracket 172' is connected to the piston rod, indicated schematically by the dash line 171', of apparatus 166. Each of the brackets 172, 172' has a hollow extended sleeve member 173. The inner configurations of the walls of the members 173 are compatibly contoured to the outer configurations of the tracks 167, 168, which are slidably mounted in their respective associated members 173. Suitable elongated roller bearings, e.g. bearing 174, are aligned within the inner walls of the members 173 in recesses, e.g. recess 174', provided for this purpose. Flat bearing surface members, e.g. member 175, are affixed to the rails 167, 168 so as to be in intimate contact relationship with the associated roller bearings, e.g. bearing 174. The bidirectional movements of piston rod 171 cause the table to move in a corresponding direction, as indicated by the bidirectional arrow 176 shown in FIG. 3, along the X axis with the rail 167 being slidably moved within the bracket 172' when this occurs. A similar action takes place between the bracket 172 and the rail 168 when the table is driven in one of the Y directions indicated by the bidirectional arrow 177, by the appropriate movement of piston rod 171'. The direction of movement of the piston 170 in the cylinder 169 and consequently the direction of movement of the table along the X axis is controlled by the sign solenoid 178 and the rate of speed at which the table moves in the X direction is controlled by the magnitude solenoid 179 as will become apparent from the discussion hereinafter. Apparatus 166 has similar elements, not shown as aforementioned for sake of clarity, corresponding to the elements 169, 178, 179 of apparatus 167. The table 117 may be driven in one of the X and one of the Y directions simultaneously.

Included in apparatus 165 is a locking mechanism, generally indicated by the reference numeral 180, as shown in FIG. 3. Attached to the bracket 172 is an elongated rod-like member 180' having grooves 180a recessed on a flat face thereof, and member 180' forms part of the locking mechanism 180. A ram cylinder 181, which is actuated by solenoid 182, has a member 183 attached to its piston rod 181' having a compatibily grooved face 184. Cylinder 181 is mounted by means, not shown, to the granite block base 131 and is thus in a fixed position relative to the movable table and consequently also to the member 180' carried thereby. Thus, when the table is in the desired X position, actuation of the locking mechanism's ram cylinder 181 causes the grooves of face 184 to engage the grooves 180a of the member 180' thereby locking the table in the desired X position. A locking mechanism, not shown, is provided in the actuator 166 similar to the mechanism 180 of apparatus 165 and hereinafter these two respective locking mechanisms for locking the table in the X and Y positions are generally referred to as the X and Y detents, respectively.

Figure 1:
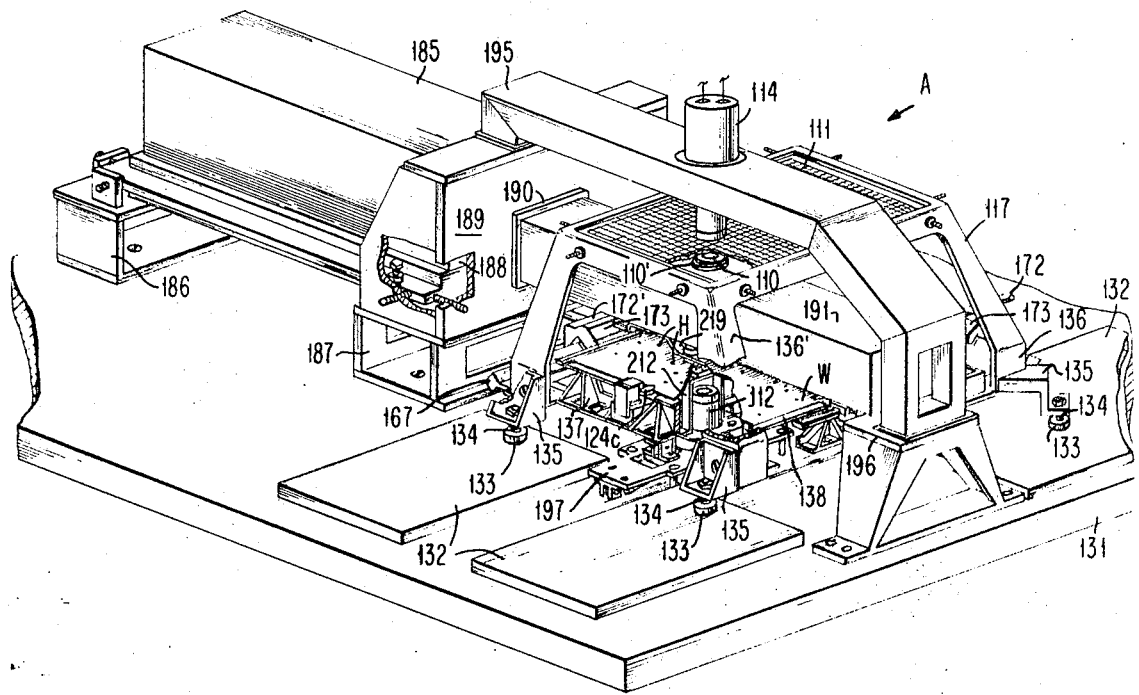
FIG. 1 is a perspective view of the preferred embodiment of the invention.

As shown in FIG. 1, an enclosure 185 is mounted to a pair of frame-like members 186, 187 which are affixed to the plate 131. Enclosure 185 has a front end plate 188, partially shown through the broken away portion of supporting bracket 189. The rear side of the bracket 189 is in abutment with the outer surface of plate 188. Aligned openings, not shown, are provided in the plate 188 and bracket 189, respectively, and are outlined by the rectangular frame-like member 190 to which is connected another enclosure 191 having an opening thereat, not shown, which is in alignment and in abutment with the aforementioned other openings of the plate 188 and bracket 189, respectively. Enclosure 185 houses the CRT and its associated electronic circuitry, suitable access means such as for example a sliding panel, not shown, being provided in enclosure 185 for access thereto. The CRT is adjustably mounted by suitable means, not shown, within the enclosure 185 and such that its face or screen will be in abutment with the opening, not shown, of the plate 188. The adjustable mounting means allows the CRT to be adjusted in bidirectional manners about and along each of the orthogonal axes 192, 193, 194, FIG. 2, for optical alignment purposes. Within enclosure 191 are mounted the beam splitter 106, lens system 108, member 109 and PMT 113 in the optical alignment shown in FIG. 2, suitable access means, not shown, for access thereto also being provided. On the upper surface of the rectangular enclosure 191 is mounted the lens system 110 such that the lens system 110 is in the optical alignment indicated in FIG. 2 with the beam splitter 106 and PMT 114, an appropriate aperture 110' being provided in the upper surface for this purpose. PMT 114 is supported by the overhead frame-like beam member 195. Lens system 107, FIG. 2, is similarly mounted on the lower surface, not shown, of the rectangular enclosure 191 and such that it is in the optical alignment indicated in FIG. 2 with the beam splitter 106 and PMT 112, an appropriate aperture, not shown, being provided in the lower surface for this purpose. PMT 112 is mounted in a recess, not shown, provided in the base 131. Bracket 189 and the member 190 affixed thereto support one end of the enclosure 191. The other end of the enclosure 191 is supported by the frame 196 which is carried by base 131. Enclosure 191 extends through the upright extensions, e.g. extension 136', of table 117 with sufficient spacing being provided so as not to interfere with the full movement of the table 117 in either the X or Y directions. The top of the table 117 carries the member 111, the latter being partially broken away so as to illustrate the lens system 110 which is carried by the upper surface of enclosure 191. In the foregoing arrangement, the CRT's optical axis, i.e. the geometrical axis of origin of the CRT's radial sweeps, is positioned with respect to the beam splitter 106 such that the light beam at initiation of each scan is as aforementioned at the origin of the concentric rings 109a–109e of member 109 and the particular one of the centers of the transparent areas of member 111 which are associated with the various locations of the holes being tested. However, this alignment is not critical and the beam may even be displaced from these two points, i.e. the origin of the rings and the center(s) of the transparent area(s). As will become apparent hereinafter, as long as the light beam at the initiation of each of the scans utilized for hole size measurement intercepts the member 109 within an area bounded by the particular concentric ring associated with the standard size for the hole being tested, and as long as the light beam at the initiation of each of the scans utilized for hole location measurements intercepts the member 111 within the particular transparent area thereof associated with the location of the hole being tested, the system performs the respective measurements reliably and accurately. Moreover, the workpiece W and members 109 and 111 are positioned with respect to each other such that the path of the scanning element traverses the edge of the hole and the particular one of the indicia concerned with the center portion of the scan as will be explained in greater detail hereinafter.

Referring now to FIGS. 8 to 10, the card support assembly 127 has a plate 197 which is mounted to the base 131, cf. FIG. 1, in an elevated manner. Plate 197 has an opening, not shown, which is concentrically disposed about PMT 112. The upper surface 198 of plate 197 supports the upper pivot and bracket assembly 199 of the linkage assembly, indicated generally by the reference numeral 200 in FIG. 8. A pivot 201 is disposed beneath the plate 197 and pivotally connects the lower end of the link member 202 to a ram piston rod 203 of ram cylinder 204 which is part of the card support actuator 128, FIG. 2, and which is pivotally mounted by the pivot and bracket assembly 205 to the base 131. The upper end of member 202, FIG. 8, is connected to the pivot pin of assembly 199 and is also affixed to a U-shaped member or yoke 206. An extended or elongated open-ended groove 207, 208 is provided at the ends of yoke 206 and these grooves pivotally coact with respective pivot pins, e.g. pin 209, located along the sides of the supporting bracket 210. Bracket 210 has an opening 211 which is concentrically disposed about the upper end of PMT 112 and supports the inverted U-shaped bracket 212. The upper portion 213 of bracket 212 is provided with a pair of recesses 214, FIG. 10, in each of which is mounted a normally extended spring 215. Mounted on the top of the springs 215, FIG. 10, is a member 216, FIG. 10, which has openings 216a having a truncated conical cross-section for this purpose. Attached to the upper surface of member 216, FIG. 10, is a cover plate 217 which has a plurality of truncated conical openings 217a containing ball bearings, e.g. bearing 218, which are adapted to contact the workpiece W when the bracket 212 is actuated by the cylinder 204 into an upward position, the springs 215 being compressed when this occurs. Juxtaposed to the member 216 is a second bearing carrying member 216', FIG. 9, which is affixed to a bracket 219 that is supported by the lower surface, not shown, of enclosure 191, FIG. 1. The bracket 219 and the member 216' have aligned openings, indicated generally in phantom outline in FIG. 9 by the respective reference numbers 220 and 220' which allow the light beam 103 emanating from the lens system 107 to pass therethrough so as to scan the hole H of the card W. The light beam emanating from the hole H of card W passes through the aligned openings 221 of members 216 and 217. The upper portion 213 of member 212 is also provided with an aligned opening, indicated in phantom outline in FIG. 9 by the reference numeral 221', so that the light beam channel 103 is in optical communication with the viewing or sensing area 222, FIG. 8, of PMT 112.

Affixed to the bracket 210 is a shutter 223, FIG. 8, which is a part of the optical sensor 129. Shutter 223 is juxtaposed between a pair of vertically aligned light cells and a pair of vertically aligned photosensor diodes which are also comprised in sensor 129. For sake of clarity, only the upper photocell 224 and the upper photodiode 225 are illustrated in FIG. 9. As shown schematically in FIG. 24a, another cell 244' and photodiode 225', with the shutter member 223 operably disposed therebetween, are located beneath the light cell 224 and photodiode 225, respectively. Shutter 223 has an opening 466, cf. FIG. 24a, which places the upper and lower light cells in exclusive optical communication with the upper and lower photosensor diodes, respectively, when the card support assembly 127 is in its respective upper or aforementioned supporting position and in its respective lower position or aforementioned non-supporting position, respectively, which will now be described.

Figure 24A:
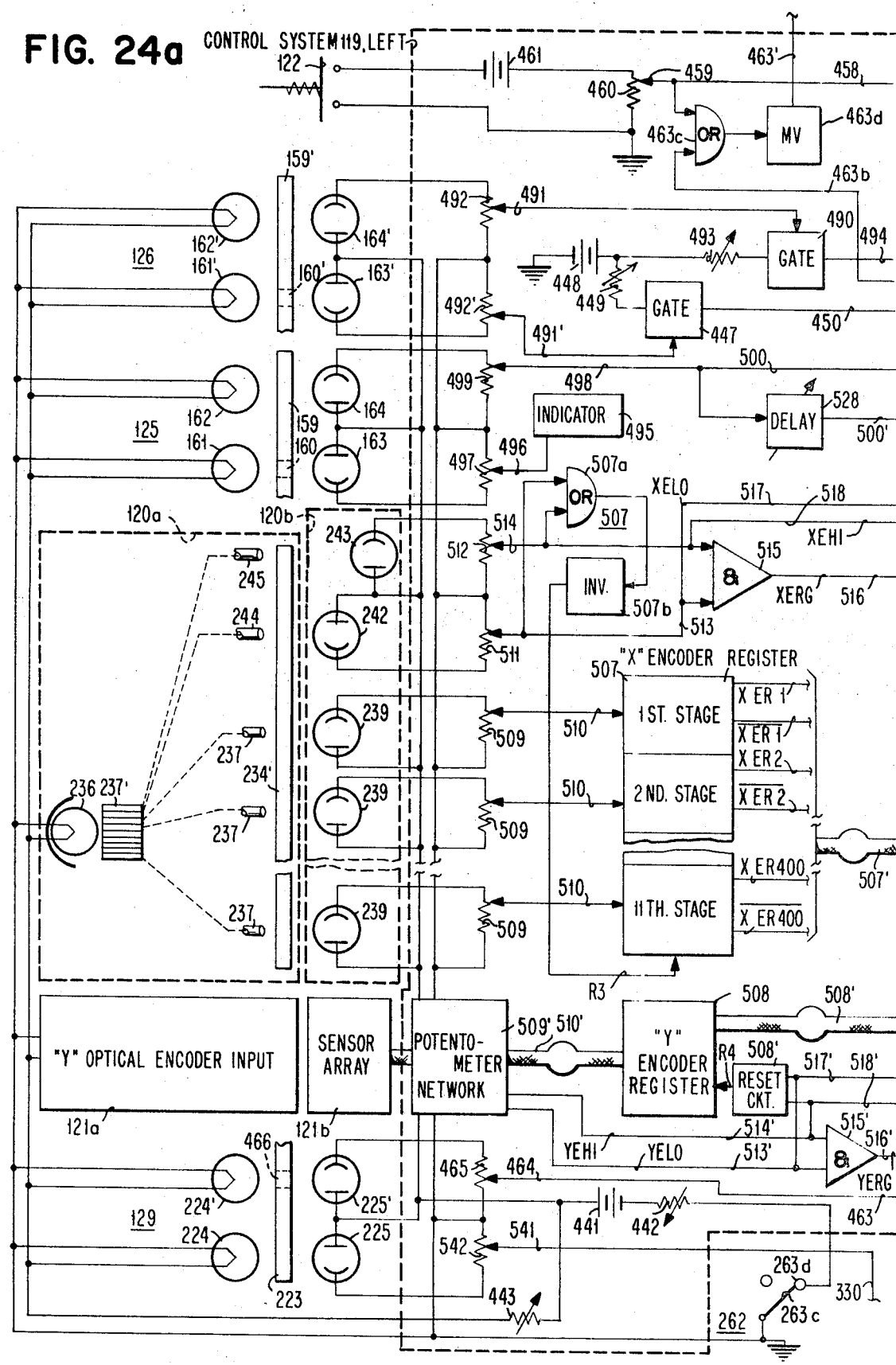
FIGS. 24a–24b are schematic diagrams in block form of the control system 119 of FIG. 2.

As shown in FIGS. 9 and 24a, the card support assembly 127 is in its lower position. Under these conditions, the spring 215 is extended and maintains the bearing support member 216 in an upward position. Actuation of the ram cylinder 204 causes the linkage assembly 200 to elevate the member 216 upwardly causing the bearings of the members 216 and 216' to be placed in intimate contacting relationship with the lower and upper surfaces, respectively, of the card W so as to maintain the plane of the card W in proximity to the hole H under test normal to the axis of the light beam channel 103. Under these conditions, the springs 215 are compressed. The member 216 has two pair of guide pins, only the pair of pins 226 and one pin 227 of the other pair being illustrated in FIG. 10 for sake of clarity, which are adapted to be slidably movable within the sleeves 228, which are imbedded in and through the upper surface 213 of the member 212. Each of the four pins, e.g. pin 227, is terminated by an enlarged member 229 threaded thereto so as to maintain the particular pin within its respective sleeve 228. Associated with the ram cylinder 204 is a solenoid, not shown in FIG. 8, for actuating the movement of the cylinder's piston and hereinafter referred to by the reference number 534, cf. FIG. 24b.

Referring to FIG. 11, there is shown a typical arrangement of a suitable solenoid 230 and single ram cylinder 231 which may be utilized for actuating any of the solenoid and single ram cylinder arrangements associated with the X and Y detent actuators and/or the card support actuator 127.

The solenoids of the various actuators are preferably located at a common site, not shown, remote from their associated ram cylinders and the interconnection between the ram cylinders and solenoids is provided by flexible pneumatic lines, in a manner well known to those skilled in the art.

By way of example, the sensors 120 and 121 of FIG. 2 are illustrated as comprising identical optical encoders such as, for example, an optical encoder partially shown and generally indicated by the reference numeral 232, FIG. 12. The optical encoder is embodied for sake of explanation in a 1-2-4-8 binary code having a capacity of 600 decimal positions. Consequently, in this example, the table is capable of being positioned to 600 different positions along both its X and Y directions and preferably in discrete equal increments. As is well known to those skilled in the art, the optical indicia representing the binary bits, e.g. bit 233, are provided on an opaque flat plate 234' such as by a photoresist or other apropriate techniques. For sake of clarity, the 1 binary bits are represented by shaded areas in FIG. 12 and the 0 binary bits are represented by the absence of shaded areas, it being understood that the 1 binary bits in the preferred embodiment are optically transparent and the 0 binary bits are optically opaque. The binary bits are arranged in vertical columns, e.g., column 234, each column of which represents one of the binary positions corresponding to successive decimal positions commencing at the 0 decimal position and ending at the 599 decimal position which are illustrated on the left and right ends 234L, 234R, respectively, of the plate 234' in FIG. 12. The top or 1st horizontal row 235 contains synchronizing bits utilized to lock the table 117 into position when the table is at the desired position as will be explained in further detail hereinafter. The successive 2nd to 12th horizontal rows correspond to the integers of the decimal orders represented in the aforementioned 1-2-4-8 binary code. Thus, the 2nd, 3rd, 4th and 5th rows correspond to the one, two, four and eight decimal integers, respectively, of the units decimal order. The 6th, 7th, 8th and 9th rows correspond to the ten, twenty, forty and eighty decimal integers, respectively, of the tens decimal order. The 10th, 11th, and 12th rows correspond to the one hundred, two hundred, and four hundred integers, respectively, of the hundredths decimal order. By way of example, the 599th position is represented by the appearance of a 1 bit in the extreme right column of the encoder 232 shown in FIG. 12 at each of the rows, as indicated in Table I, as follows:

TABLE I

| Row | Binary | Decimal |
| --- | --- | --- |
| 2nd | $2^0 \times 1$ | 1 |
| 5th | $2^3 \times 1$ | 8 |
| 6th | $2^0 \times 10$ | 10 |
| 9th | $2^3 \times 10$ | 80 |
| 10th | $2^0 \times 100$ | 100 |
| 12th | $2^2 \times 100$ | 400 |
| Total | | 599 |

Each of the rows are illuminated by a discrete light source such as the light source comprising the light cell 236 and one of the elements 237 of the fiber optic bundle shown schematically in FIG. 24a. The fiber optic elements are mounted in front of the optical encoder 232 as viewed from FIG. 12 and a single such element is utilized for illuminating exclusively one of the 2nd to 12th rows. The fiber optic elements utilized to illuminate these last-mentioned rows are vertically aligned so as to illuminate one column at a time. As shown in FIG. 24a, the plate 234' is juxtaposed between the array of fiber optic elements and a vertical array 238 of photo sensor diodes, e.g. diode 239, cf. FIG. 12, each of which is adapted to exclusively sense the light emanating from an exclusive one of the fiber optic elements whenever a 1 bit is present on the plate 234' in the particular row of the column being illuminated by the particular fiber optic element associated with that row. The frame 240 of plate 234' is affixed to the ram piston which is connected to the table 117, as aforedescribed. As shown in FIG. 3, for example, frame 240 of the plate 234' of sensor 120 is affixed to the ram piston 171 by suitable bracket 241. Similarly, the plate 234' of optical sensor 121 is attached to the ram piston rod 171' as is shown schematically in FIG. 3 via its associated frame and bracket. Thus, as the table is moved in its X and Y directions, each of the plates 234' moves between its associated fiber optic elements and array of sensor diodes which optically sense the respective X and Y positions of the table, as well as the particular directions of movement along the X and Y axes.

As shown in FIGS. 12 and 13a-13c, the synchronizing 1 bits of the upper row are sensed by a pair of horizontally aligned photo sensor diodes 242 and 243 of the array 238 which are symmetrically disposed about the vertical alignment of diodes 239. Each of the diodes 242 and 243 is in optical alignment with an exclusive one of the pair of horizontally aligned fiber optic elements 244, 245 as is shown schematically in FIG. 24a. Consequently, when the table is in a position such that a synchronizing bit 246 causes both of the fiber optic elements 244 and 245 to be in optical communication with their associated photo sensor diodes 242 and 243, respectively, an alignment signal, which is derived from both of these diodes is generated which indicates that the table is at the decimal position corresponding to the column of binary address bits with which the particular synchronizing bit is associated, cf. FIG. 13b. However, when the table is displaced such that the synchronizing bit places only one of the fiber optic elements 244, 245 in exclusive optical communication with its associated sensor diode 242 or 243, as the case might be, cf. FIGS. 13a or 13c, then the aforementioned alignment signal is not generated. Likewise, when both of the photo diodes 242, 243 are not in optical alignment with their associated fiber optic elements 244, 245 due to the absence of the synchronizing bit 246, the alignment signal is also not generated. The alignment signal is referred to hereinafter as signals XERG and YERG in the cases of the respective encoders 232 utilized in the sensors 120 and 121, respectively.

Figure 13A:
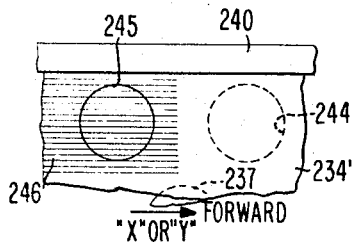
FIGS. 13a–13c are partial schematic views of a synchronizing bit associated with different positions of the optical encoder of FIG. 12.

Illumination of the diode 242 by its associated fiber optic element 244, cf. FIGS. 13a and 13b, causes the signal to be generated indicative of this condition, which signal is referred to hereinafter as signal XELO in the case of the encoder 232 utilized in sensor 120 and as signal YELO in the case of the encoder 232 utilized in sensor 121. On the other hand, illumination of diode 243 by element 245, cf. FIGS. 13b and 13c, causes another signal to be generated indicative of this latter condition, which signal is referred to hereinafter as signal XEHI and YEHI in the case of sensors 120 and 121, respectively. With the table moving in the forward direction, e.g. FORWARD (X), along a particular one of the X and Y axes, the table and consequently the associated encoder 232 goes from the lower decimal number position(s) to the higher one(s) along the particular axis, and the converse is true when the table moves in the reverse direction, e.g. REVERSE(X), along the particular axis. Thus, movement of the encoder in a forward direction will produce the following sequential action: first, at the beginning of each binary column of the encoder 232, both of the diodes 242 and 243 are not illuminated due to the immediate absence of a synchronizing bit; next, only diode 243 is exclusively illuminated by element 245, per FIG. 13a; then, simultaneously diodes 242 and 243 are exclusively illuminated by elements 244 and 245, respectively, per FIG. 13b; then, only diode 242 is exclusively illuminated by element 244, per FIG. 13c; and finally at the end of the column neither of the diodes 242 and 243 are illuminated due again to the immediate absence of the synchronizing bit, with the sequence repeating itself when the next higher numbered adjacent binary column comes into the sensing position. An analogous action occurs when the encoder 232 moves in the reverse direction except that the aforedescribed sequence is now reversed.

The remainder of the apparatus and the circuitry associated with the drilled hole tester will be discussed in connection with the following descriptions of the blocks 101, 102, 115, 119 and 130 of FIG. 2, these descriptions being captioned with appropriate headings for sake of clarity.

Clock Timing Generator

Figure 14A:
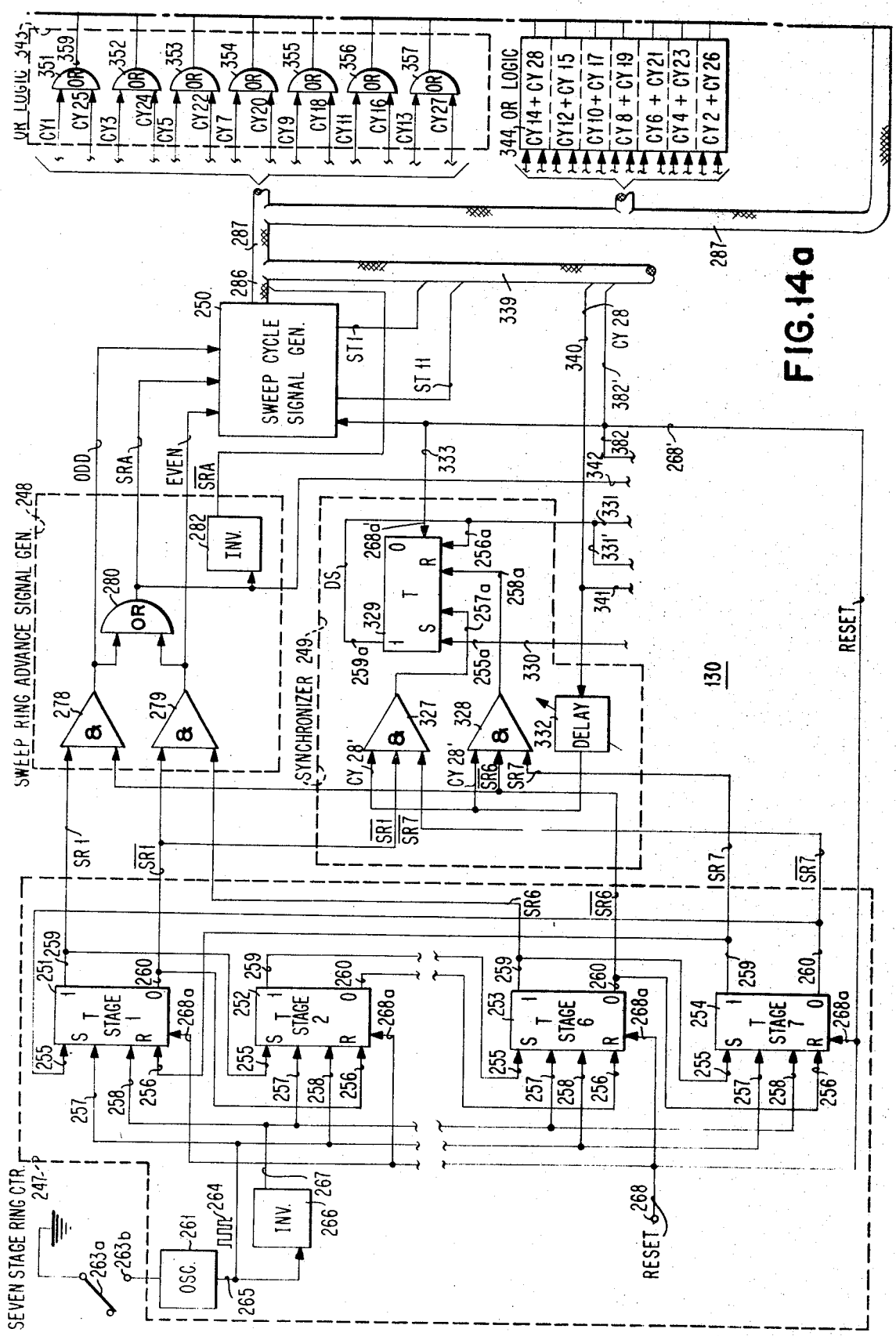

Referring to FIG. 14a, the clock timing generator 130 of FIG. 2 is illustrated in greater detail as comprising ring counter 247, sweep ring advance signal generator 248, synchronizer 249 and sweep cycle signal generator 250. Counter 247 includes seven trigger stages or triggers T. Only the first, second, sixth, and last trigger stages 251, 252, 253 and 254, respectively, of counter 247 are shown for sake of simplicity. Each of the seven triggers T includes set and reset gate inputs, 255 and 256, respectively, and associated set and reset trigger inputs 257 and 258, respectively. Each of the triggers have a pair of outputs designated the 1 output 259 and the 0 output 260, respectively. The 1 output 259 of a preceding stage, e.g. first trigger 251, is connected to the set gate input 255 of the next adjacent stage, e.g. second trigger 252, with the exception of the last stage 254. The 1 output 259 of trigger 254 is connected to the reset gate input 256 of the first stage 252. Also, the 0 output 260 of each stage, e.g. trigger 251, is coupled to the reset gate input 256 of the next adjacent stage, e.g. trigger 252, with the exception of the last stage 254. The 0 output 260 of trigger 254 is connected to the set gate input 255 of the first stage 251. An oscillator 261 is actuated by the triple ganged switch 262 of FIG. 2, only part of which is shown in FIG. 14a for sake of clarity, when its armature 263a is positioned to the contact 263b. Oscillator 261 provides at its output 265 a pulse train output signal which is indicated by the waveform 264 shown in FIG. 15 and has a half-cycle period Ta. The output of oscillator 261 is commonly connected to each of the set trigger inputs 257 of the first, third, fifth and seventh trigger stages, i.e. the odd trigger stages, and to the reset trigger inputs 258 of the second, fourth and sixth stages, i.e. the even trigger stages. The input of an inverter 266 is also connected to the output 265 of oscillator 261. The inverter's output 267 is commonly connected to the reset trigger inputs 258 of the aforementioned odd trigger stages and to the set trigger inputs 257 of the aforementioned even trigger stages. The oscillator 261 and inverter 266 provide the means for stepping the counter 247. Also provided is a reset input terminal 268 which is commonly connected to the respective force reset terminals 268a of each of the seven trigger stages.

Briefly, the operation of the counter 247 is as follows: for any one of its triggers, if a 1 state or condition is present at the set gate input 255 associated with the particular trigger, then a positive rise at its set trigger input 257 will cause the trigger to switch to a 1 state at its 1 output 259 and, consequently, to a complementary 0 state at its 0 output 260, providing its two outputs 259 and 260 are in 0 and 1 states, respectively, when the particular set trigger input 257 is so triggered. Similarly, if a 1 state is present at the reset gate input 256, then a positive rise at the reset trigger input 258 will cause the trigger to switch to a 1 state at the 0 output 260 with a corresponding switch to a 0 state at the 1 output 259, providing its outputs 259 and 260 are in 1 and 0 states, respectively, when the reset trigger input 258 is so triggered. A positive rise at the set trigger input 257 will not actuate, i.e. switch, the trigger unless a 1 state exists coincidentally at its associated set gate input 255. Likewise, a positive rise at the reset trigger input 258 will not switch the trigger unless a 1 state exists coincidentally at its associated reset gate input 256. Furthermore, if the 1 output 259 is already in a 1 state (and consequently the 0 output 260 is in the complementary 0 state) and the set gate input 255 is in a 1 state, a positive rise at the set trigger input 257 will not switch, i.e. change, the state of the trigger. Similarly, if the 0 output 260 is already in a 1 state (and consequently the 1 output is in the complementary 0 state) and the reset gate input 256 is in a 1 state, a positive rise at the reset trigger input 258 will not change the state of the trigger. A reset signal RESET applied at its terminal 268a will reset the 1 output 259 of the trigger to a 0 state and the 0 output 260 to 1 state. However, if the 1 output 259 of the particular trigger is already at the 0 state when the reset signal RESET is applied to its terminal 268a, the 1 and 0 outputs of the trigger remain in their 0 and 1 states, respectively.

Thus, assume that the seven trigger stages are initially reset prior to time T1 by a reset signal RESET, which is generated by an appropriate source, not shown, that is connected to the terminal 268. Accordingly, at time T1, cf. FIG. 15, all the 1 outputs 259 are at a 0 state and all the 0 outputs 260 are at a 1 state. When the signal oscillator 261 is initiated at time T1, the positive rise 269 of the first pulse of its output signal, cf. waveform 264, FIG. 15, which is applied to the set trigger input 257 of the first stage 251 switches the 1 output 259 to a 1 state, and consequently the 0 output 260 to a complementary 0 state, due to the presence of the 1 state at the set gate input 255 that is derived from the 0 output 260 of the last stage 254. The initial positive rise 269 will not trigger the set trigger inputs 257 of the third, fifth and seventh trigger stages because their respective set gate inputs 255 are at a 0 state due to their respective connections to the 1 outputs 259 of the second, fourth and sixth stages which are in 0 states. Neither will the initial rise 269 trigger the respective reset trigger inputs 258 of the second, fourth and sixth trigger stages because their associated 0 outputs 260 are already at a 1 state. As is obvious, the output signal 270, FIG. 15, of inverter 266 at time T1 has no effect on the trigger set or reset inputs 257 or 258, as the case might be, of the triggers to which it is connected as the inverter output signal 270 is rising negatively at time T1 and consequently cannot switch the triggers. Waveforms 271 through 277 represent the signals, designated signals SR1 through SR7, respectively, present at the 1 outputs 259 of the first, second, third, fourth, fifth, sixth and seventh stages, respectively. At the time T2, the positive rise 270' of the first pulse of the signal 270 of inverter 266 causes the second trigger 252 to switch states, as shown by the waveform 272 of FIG. 15. As is obvious to those skilled in the art and from the waveforms of FIG. 15, the odd stages are triggered in sequence by the positive rises of the pulses of oscillator 261 in an alternate and sequential manner with the even stages which are sequentially triggered by the positive rises of the pulses of inverter 266 so as to sequentially initiate the first pulses of the signals SR1–SR7 as illustrated by the waveforms 271–277 in FIG. 15. At time T3, the positive rise 270a of a pulse of signal 270 of the inverter 266 is applied to the reset trigger input 258 of the first trigger 251, whose 1 and 0 outputs 259 and 260 are at the 1 and 0 states, respectively, cf. signal 271, FIG. 15, for example. Due to the 1 condition which is present at the 1 output 259 of the seventh or last trigger 254 as shown by the waveform 277, FIG. 15, reset gate input 256 of trigger 251 is enabled so that trigger 251 switches at time T3 when the positive rise 270a of signal 270 is applied to its reset trigger input 258, as indicated by the complementary change of state from a 1 state to a 0 state of signal SR1 in waveform 271, FIG. 15. At time T4, the second trigger 252 switches state when a positive pulse rise 269′ of signal 264 of the oscillator 261 is applied to the set trigger input 257 of trigger 252. This is due to the 1 state now present at the 0 output 260 of the first trigger 251 which is coupled to and enables the set gate input 255 of trigger 252 and because the 1 output 259 of trigger 252 is at the 1 state when the positive pulse rise 269′ is applied to trigger 252's set trigger input 257. Thus, signal SR2 associated with the 1 output 259 of trigger 252 changes from a 1 state to a 0 state at T4 as shown by waveform 272 in FIG. 15. As is apparent to those skilled in the art, the remaining trigger stages will also change states successively so as to provide the termination of the respective first pulses of the signals SR3 through SR7 in the manner illustrated by their associated waveforms 273–277 in FIG. 15. At time T5, FIG. 15, the seven stage counter 247 is recycled by the positive pulse rise 269a of the signal 264 of oscillator 261 as shown in FIG. 15. As shown in FIG. 15, the 1 outputs 259 of each of the triggers, e.g. trigger 251, remains in the 1 condition, when initiated, for a duration equal to seven half-cycle periods Ta of the signal 264 of pulse oscillator 261 and in the 0 condition for a duration equal to seven successive half-cycle periods Ta, whereupon the 1 output signal cycle of each trigger repeats itself.

Included in the sweep ring advance signal generator 248 are a pair of AND circuits 278 and 279, FIG. 14a. The respective outputs of circuits 278 and 279 are ORed by OR circuit 280 which generates at its output the signal SRA having the waveform 281 illustrated in detail in FIG. 15. As seen in FIG. 15, each cycle of the signal SRA has a period $T'=7Ta$. An inverter 282, which is coupled to the output of OR circuit 280, provides the complementary or NOT counterpart output signal $\overline{SRA}$, illustrated in FIG. 15 as waveform 283, of output signal SRA. The signal at the 1 output 259 of the first trigger 251 and the signal at the 0 output 260 of the sixth trigger 253 are ANDed by AND circuit 278. These two signals are in a 1 condition coincidence during the first portion $Tb=5Ta$ of the odd periods T′ and thus provide the pulses of the output signal ODD as illustrated by waveform 284 in FIG. 15. The signal at a 0 output 260 of the first trigger 251 and the signal at the 1 output 259 of the sixth trigger 253 are ANDed by AND circuit 279. These two signals are in a 1 condition coincidence during the first portion Tb of the even periods T′ and thus provide the pulses of the output signal EVEN, as illustrated by waveform 285 in FIG. 15. As a result, when signals ODD and EVEN are ORed by OR circuit 280, the output of OR circuit 280 provides the signal SRA which has a pulse commencing at the beginning of each cycle period T′, the pulse width of which are equal to the time of the aforementioned portion Tb.

Figure 16:
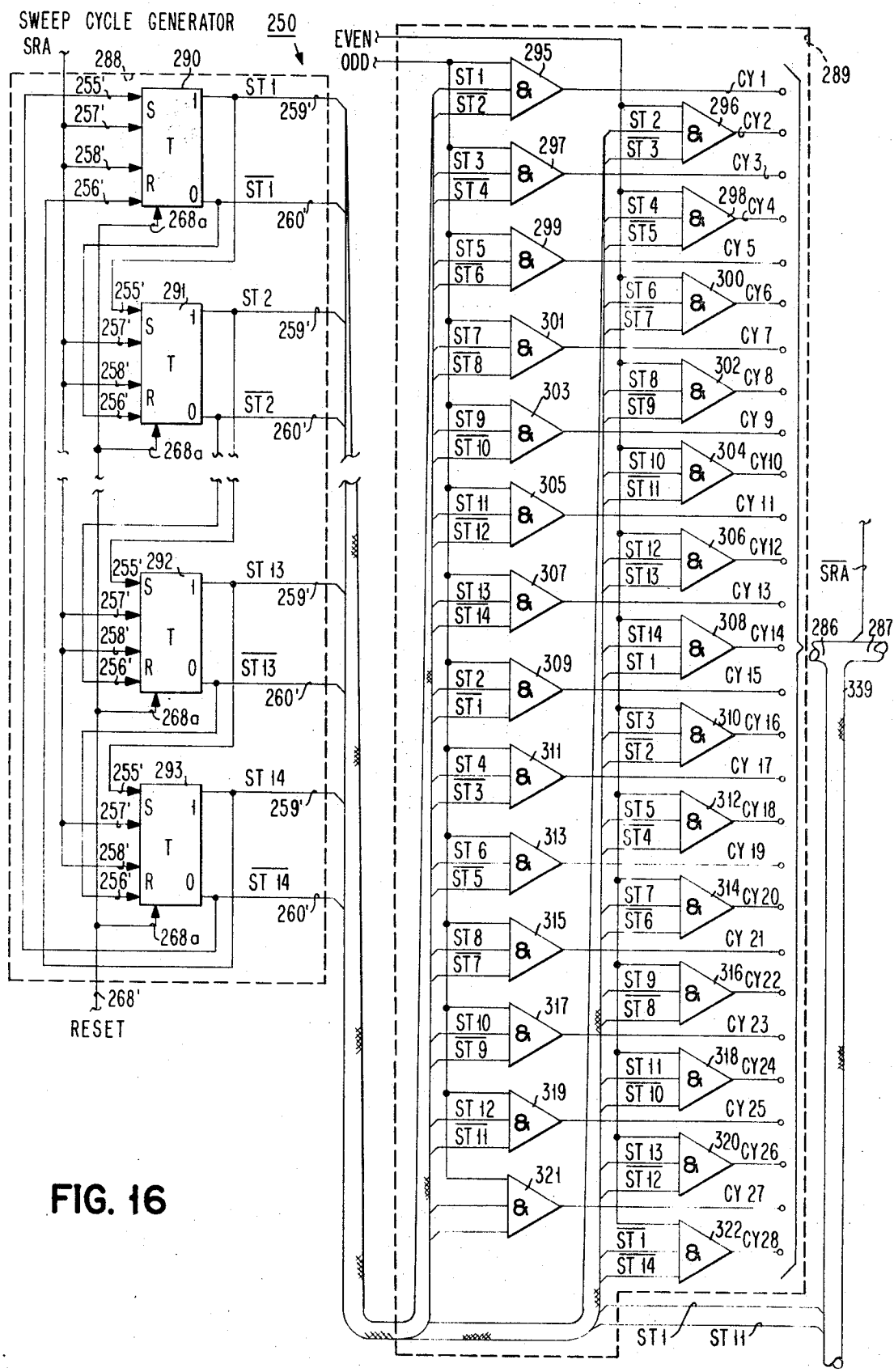

The signals SRA, ODD, EVEN are utilized by the sweep cycle signal generator 250 to generate twenty-eight output signals CY1 to CY28, incl., at its output which is illustrated as a multi-conductor cable 286–287 for sake of clarity. As shown in greater detail in FIG. 16, the sweep cycle generator 250 comprises a fourteen stage ring counter 288 and associated logic circuitry 289 to which it is coupled. For sake of simplicity, only the first, second, thirteenth and fourteenth trigger stages 290, 291, 292 and 293, respectively, of counter 288 are illustrated in FIG. 16. The counter 288 and its associated trigger stages are constructed and operate on the same principle of the aforedescribed seven stage counter 247. Thus in counter 288, the 1 outputs 259′ of the respective triggers are coupled to the set gate input 255′ of the next adjacent, i.e. successive, stage and the 0 output 260′ is coupled to the reset gate input 256′ of the next adjacent stage with the exception of the last stage 293 wherein the 1 output 259′ of stage 293 is connected to the reset gate input 256′ of the first stage 290 and the 0 output 260′ of stage 293 is connected to the set gate input 255′ of the first stage 290. Signal SRA from the signal generator 248 is commonly connected to both the set and reset trigger inputs 257′ and 258′, respectively, of each of the fourteen trigger stages. As shown by waveform 281 in FIG. 17, the positive rise of each of the pulses, e.g. positive pulse rise 294, of the signal SRA steps the ring counter 288. The output signals generated as a result at the respective 1 outputs 259′ of the fourteen trigger stages are illustrated in FIG. 17 by the waveforms ST1 through ST14, respectively. More specifically, signals ST1, ST2 . . . and ST14 are generated by the first, second . . . and fourteenth triggers, respectively, of the counter 288. The NOT counterparts $\overline{ST1}$, etc. of signals ST1, etc. are generated at the respective 0 outputs 260′ of the fourteen trigger stages. As is obvious to those skilled in the art, each trigger stage T of counter 288 has a finite inherent delay so that when a preceding stage is being switched at its 1 output from a 0 to a 1 state by the application of the positive rise of the appropriate pulse of the triggering signal SRA, the succeeding stages are not simultaneously switched by the positive rise of the same triggering pulse because of the inherent delay associated with the preceding stage. Stated in other words, the time period associated with the positive rise of the pulses of the triggering signal SRA is relatively much faster than the respective time period associated with the rising part of the output signal present at the 1 output of the particular trigger stage being switched from a 0 to a 1 state by the triggering positive pulse rise applied to the particular trigger stage's input. Consequently, there is insufficient time coincidence between the rise of the triggering pulse and the rise of the pulse of the 1 output signal of the trigger being switched to switch the succeeding trigger stages. For purposes of explanation, in the waveforms of FIG. 17, the rises of the respective pulses of the SRA signal are shown in idealized form as being instantaneous whereas the rises of the output signals ST1–ST14 of the trigger are indicated as having a finite rise time indicated, for example, by time period P associated with the positive rise of the signal ST6. The 1 and 0 outputs 259′ of the respective fourteen trigger stages of counter 288 are initially placed in the 0 and 1 states by application of the signal RESET to terminal 268 and its transmission via conductor 268′ to the trigger's respective terminals 268a, cf. FIGS. 14a and 16.

In the associated logic circuitry 289, signals EVEN, ODD, ST1 through ST14 and $\overline{ST1}$ through $\overline{ST14}$ are ANDed in the particular manner shown in FIG. 16 in the appropriate AND circuits 295–322, the latter providing staggered pulse signals CY1–CY28, respectively. More particularly, as shown in FIG. 16, signal CY1 is generated by ANDing signals ST1, $\overline{ST2}$ and ODD in AND circuit 295, signal CY2 is generated by ANDing signals ST2, $\overline{ST3}$ and EVEN in AND circuit 296, . . . and signal CY28 is generated by ANDing signals $\overline{ST1}$, $\overline{ST14}$, and EVEN in AND circuit 322. For the sake of simplicity only the waveforms 323, 324, 325 of signals CY1, CY2 and CY28, respectively, are illustrated in FIG. 17. As is obvious, signals CY1 through CY28 present respective pulses, such as for example, the pulse 326 of signal CY1, which appear in exclusive sequential time intervals. Upon the termination of the 28th cycle of waveform 281, the respective pulses of signals CY1 through CY28 are recycled.

Synchronizer 249, FIG. 14a comprises a pair of AND circuits 327, 328 and a trigger 329, the latter having set gate and reset gate inputs 252a, 256a respectively, and set and reset trigger inputs 257a and 258a, respectively. The set gate input 255a is connected via conductor 330 to the control system 119 which provides an enabling signal 334 to the set gate input 255a of the trigger 329 as will be explained in greater detail hereinafter. As is obvious, signal DS is generated only when the enabling signal 334 is present at the set gate input 255a of trigger 329. The 1 output 259a of trigger 329 is fed back to its reset gate input 256a and in addition provides an unblanking signal DS via conductor 331 to the unblanking control 101 utilized in displaying the radial sweeps on the screen of the CRT. In addition, the signal DS, via conductor 331', is connected to the control system 119 as will be explained in greater detail hereinafter. Signal CY28 is provided with an appropriate delay by delay circuit 332. The delayed signal CY28' and the signals $\overline{SR1}$ and $\overline{SR7}$ present on the respective 0 outputs 260 of the first trigger 251 and last trigger 254, respectively, of counter 247 are ANDed by AND circuit 327 which triggers the set trigger input 257a of trigger 329. Signal CY28' and the signals SR7 and $\overline{SR6}$ present at the 1 output 259 of the last trigger 254 and the 0 output 260, respectively, of the sixth trigger 253 of counter 247 are ANDed by AND circuit 328 which triggers the reset trigger input 258a of trigger 329. The set and reset trigger inputs 257a and 258a, respectively, of trigger 329 are adapted to operate on the positive rising portions of the pulses applied by AND circuits 327 and 328, respectively.

In operation, the trigger 329 of synchronizer 249 is cleared prior to time T1 by the signal RESET applied via terminal 268, conductors 268', 333 to its reset terminal 268a'. As is obvious from the waveforms 271 and 277 in FIG. 15, coincidence between the signals $\overline{SR1}$ and $\overline{SR7}$, which appear at the respective 0 outputs 260 of the first and last triggers 251 and 254, occurs only during the even numbered cycles 2, 4 . . . 28, cf. FIG. 17, of the signal SRA in time intervals, each of which is designated by the reference numeral $TX = (Ta)$, cf. cycle 2 of signal SRA in FIG. 15. At the end of each time interval TX, the succeeding odd numbered cycle of the signal SRA commences. Likewise, as is obvious from the waveforms 276 and 277, FIG. 15, coincidence between the signal SR7 appearing at the 1 output 259 of the last trigger 254 and the signal $\overline{SR6}$ appearing at the 0 output 260 of the sixth trigger 253 also occurs only during the aforementioned even numbered cycles 2, 4 . . . 28 of the signal SRA in time intervals, each of which is designated by the reference character $TY(=Ta)$, cf. cycle 1 of signal SRA in FIG. 15. As shown in FIG. 15, a time interval TY is immediately followed by a time interval TX.

Figure 18:
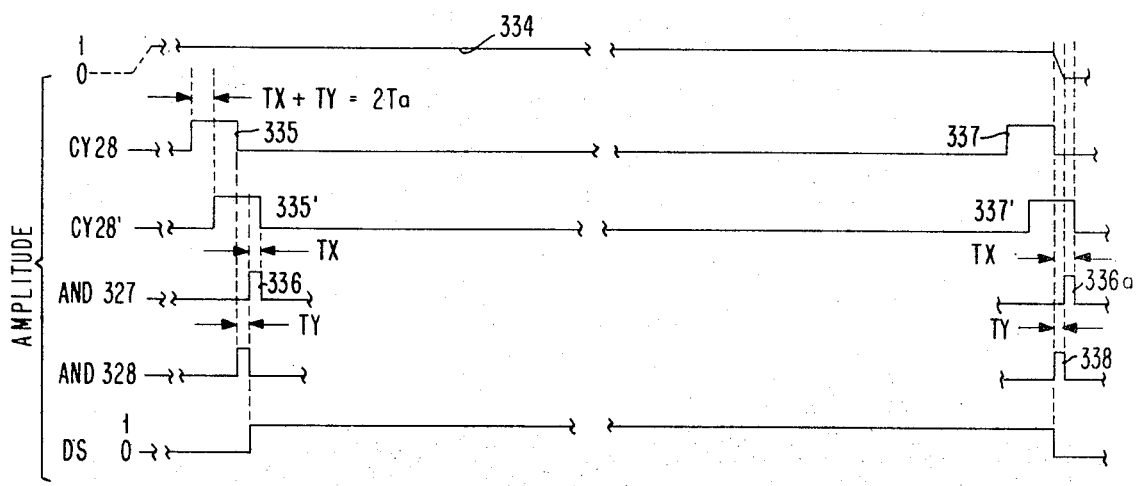

Consequently, as shown by the waveforms of FIG. 18, when an enabling signal 334 from the control system 119 is present at the set gate input 255a of trigger 329, the first pulse 335 thereafter of the signal CY28 is delayed by circuit 332 for a period 2Ta as indicated by the delayed pulse 335' of the delayed signal CY28'. AND circuit 327 generates an output pulse 336 due to the coincidence of the signals $\overline{SR1}$, $\overline{SR7}$, CY28' at its inputs. The positive rise of pulse 336 switches the signal DS at the 1 output 259a of the trigger 329 from a 0 to a 1 state. Signal DS remains in the 1 state until the next succeeding delayed pulse 337' of signal CY28, whereupon due to the coincidence of signals $\overline{SR6}$, SR7 and CY28' the positive rise of output pulse 338 of AND circuit 328 resets the 0 output if trigger 329 to a 1 condition and consequently the signal DS at the 1 output 259a is reset to the 0 condition. Signal DS is thus in a 1 condition or state for an entire twenty-eight cycle sequence of signals CY1 to CY28 commencing and terminating with the first and last signal CY1 and CY28, respectively. As will be discussed hereinafter, during the interval TY associated with pulse 338, enabling signal 334 returns to the 0 level and consequently pulse 336a of the output signal of AND circuit 327 is not able to switch the trigger 329 until there is again coincidence between the enabling signal 334 and signals $\overline{SR1}$, $\overline{SR7}$, and CY28'.

As shown in FIGS. 14a, the signals CY1 to CY28, incl., and signal SRA of the clock 130 are transmitted via the multi-conductor cable 286, 287 to deflection control 102. The even numbered signals CY2, CY4 . . . CY28, signals CY25, CY27, and signals ST1, ST11, $\overline{SRA}$ are transmitted via the multi-conductor cable 339 to the measuring system 115. The particular conductor, not shown, of cable 339 transmitting signal CY28 to measuring system 115 is also connected to conductor 340 which in turn is connected to the delay circuit 332 of synchronizer 249 as shown in FIG. 14a. Conductor 331', which as aforementioned is connected to conductor 331, and conductor 341, which is connected to conductor 340, transmits the signals DS and CY28, respectively, of clock 130 to the control system 119. Conductor 342, which is connected to the output of OR circuit 280, and conductor 331 transmit the signals SRA and DS, respectively, of clock 130 to the unblanking control 101. Conductors 382 and 382' are connected to conductor 268' for transmitting the signal RESET to the unblanking control 101 and measuring system 115, respectively.

Deflection control

The signals CY1 to CY28, incl., are transmitted as aforementioned to the deflection control 102 where they are decoded by the logic circuit 343, 344, FIG. 14a and 345, 346, FIG. 14b of control 102. The output signals of circuitry 343–346 are used to control energizer circuitry 347 and 348, FIG. 14b of control 102. The X and Y deflection coil systems 349 and 350, FIG. 19, of the CRT are shown schematically in FIG. 14b and coupled respectively to energizer circuits 347 and 348, respectively. Each of the logic circuits 343–346 comprises seven individual stages of OR circuits, such as for example, OR circuits 351–357 of logic circuit 343, FIG. 14a. Predetermined pairs of the clock signals CY1 to CY28 transmitted by cable 287 are ORed by each OR circuit in the manner illustrated in FIGS. 14a and 14b. For sake of simplicity, the OR circuits of circuits 344–346 are represented in block form, with appropriate horizontal dash lines, e.g. line 358, being utilized to separate the respective individual OR stages contained therein and the particular clock signals being ORed thereby being designated in conventional Boolean form, e.g. $CY1+CY25$, in the OR stages so represented by these blocks.

The output, e.g. output 359, of each OR circuit controls an exclusive one of the normally open switching or gate circuits, for example, gate circuits 360a–360g and 360a'–360g', included in the respective energizer circuits 347 and 348, the latter circuit 348 being shown in block form for sake of simplicity. It is to be understood, however, that the energizer 348 has similar elements corresponding to those shown in detail for the energizer 347 in FIG. 14b. Each of the gate circuits 360a–360g controlled by logic circuit 343 is connected at one side through an adjustable current limiting resistor, e.g. resistor 361, to the positive terminal 362 of a grounded center tapped power supply such as the battery 363. Each of the other sides of each of the gates 360a–360g is connected by the common conductor 364 to the X-deflection coil system 349 of the CRT via the output circuitry comprising resistor 365, capacitor 366, operational amplifier 367, gate 368 and deflection amplifier 369. Each of the gate circuits 360a'–360g' controlled by the logic circuit 344 is connected at one side via a current limiting resistor, e.g. resistor 361', to the negative terminal 370 of the battery 363 and its other side is commonly coupled to the conductor 364 and consequently to the deflection coil system 349 via the aforementioned output circuitry 365–369.

The gate circuits of the energizers 347 and 348 are normally open in the absence of a signal at the output terminal of the particular OR circuit to which it is connected. The presence of a signal, however, at the output of the OR circuit closes the gate providing a closed circuit from the power supply, e.g. battery 363, to the particular deflection coil system to which it is connected. In all, twenty-eight radial electron beam sweeps are generated in the CRT of the preferred embodiment of the invention. For the particular embodiment, the sweeps are arranged in fourteen pairs with the radial sweeps of a pair being displaced at one-hundred and eighty degrees with respect to each other. The first twenty-four sweeps, when in the unblanked condition, are utilized for the hole diameter measuring test and the last four sweeps, when in the unblanked condition, are used for the hole location measuring test. By judiciously adjusting the values of each of the current limiting resistors, e.g. resistor 361, and appropriate selection of the gate circuits of energizers 346 and 347, the deflection currents $Ix$ and $Iy$ are fed to the X and Y deflection coil systems 349 and 350, respectively, to provide the radial sweeps at the angular positions 0°, 30°, etc. of the CRT face as shown by the arrows in FIG. 19. The angular position of each of the sweeps associated with the sequence of the signals CY1–CY28, and the relative idealized magnitude and direction of the current $Ix$ and $Iy$ for producing the sweep at these angular positions, are indicated in Table II below, as follows:

TABLE II

| Signal | Angle, degrees | $Ix$ | $Iy$ |
|---|---|---|---|
| CY1 | 0 | I max. | 0 |
| CY2 | 180 | −I max. | 0 |
| CY3 | 15 | +.97 I max. | +.26 I max. |
| CY4 | 195 | −.97 I max. | −.26 I max. |
| CY5 | 30 | +.87 I max. | +.50 I max. |
| CY6 | 210 | −.87 I max. | −.50 I max. |
| CY7 | 45 | +.71 I max. | +.71 I max. |
| CY8 | 225 | −.71 I max. | −.71 I max. |
| CY9 | 60 | +.50 I max. | +.87 I max. |
| CY10 | 240 | −.50 I max. | −.87 I max. |
| CY11 | 75 | +.26 I max. | +.97 I max. |
| CY12 | 255 | −.26 I max. | −.97 I max. |
| CY13 | 90 | +0 | +I max. |
| CY14 | 270 | −0 | −I max. |
| CY15 | 105 | −.26 I max. | +.97 I max. |
| CY16 | 285 | +.26 I max. | −.97 I max. |
| CY17 | 120 | −.50 I max. | +.87 I max. |
| CY18 | 300 | +.50 I max. | −.87 I max. |
| HY19 | 135 | −.71 I max. | +.71 I max. |
| CY20 | 315 | +.71 I max. | −.71 I max. |
| CY21 | 150 | −.87 I max. | +.50 I max. |
| CY22 | 330 | +.87 I max. | −.50 I max. |
| CY23 | 165 | −.97 I max. | +.26 I max. |
| CY24 | 345 | +.97 I max. | −.26 I max. |
| CY25 | 0 | I max. | 0 |
| CY26 | 180 | −I max. | 0 |
| CY27 | 90 | 0 | I max. |
| CY28 | 270 | 0 | −I max. |

It should be understood that the foregoing Table II indicates idealized currents $Ix$, $Iy$ for generating magnetic fields in their respective coil deflection systems 349, 350 which fields when added in phase relationship causes the beam to sweep radially across the face of the CRT at the different positions 0°, 15°, 30°, etc. as shown in FIG. 19. In practice, however, when the radial sweeps are initially calibrated with respect to the angular positions of the face of the CRT, it may be necessary to adjust the magnitude(s) and/or direction(s) of the currents $Ix$ and/or $Iy$ to align one or more particular sweeps with respect to the actual angular position with which it is to be associated.

For example, assuming for purposes of explanation in a first hypothetical case, if in utilizing the magnitude and direction of the currents $Ix=+I$ max and $Iy=0$ designated in Table II above for the angular position 0°, the radial scan is displaced an angular increment K below the actual angular position 0°. The displaced sweep in this case is illustrated by the dash-dot line arrow 370 in FIG. 19. To align the displaced sweep 370 with the actual angular position 0°, the adjustable resistor, not shown, of the energizer circuit 348 (which resistor is connected to the gate circuit, not shown, controlled by the OR circuit associated with the signals CY1 and CY25 in circuit 345) is adjusted so that a positive current $Iy$ of sufficient magnitude is applied to the Y deflection coil system when the last mentioned gate is enabled and the resistor 361 is also adjusted so that the magnitude of the current $Ix$ in the deflection coil system 349 is of a sufficient magnitude when gate 360a is enabled such that the phase addition of the magnetic fields produced by the so adjusted currents $Ix$ and $Iy$ provide the resultant radial sweep along, i.e. coincidence with, the angular position 0°.

If, in another hypothetical case a sweep, not shown, which has a corresponding angular displacement K above the angular position 0° is produced when the currents $Ix=I$ max. and $Iy=0$ are utilized, then in addition the direction of the adjusted current $Iy$ would be reversed, i.e. made negative. One way for accomplishing the alignment of the radial scan in this last mentioned case is to connect the aforementioned adjustable resistor of the gate circuit, not shown, which is controlled by the OR circuit of circuit 345 that OR's signals CY1 and CY25, to the negative terminal, not shown, of the battery, not shown, of the Y deflection coil energizer circuit 348 in lieu of its connection to the positive terminal and to adjust this resistor along with the other resistor 361 of circuit 347 so that the phase relationship of the magnetic fields produced by the so adjusted currents $Ix$, $Iy$ provide the radial sweep along the angular position 0°.

The CRT and guide member 138 are positioned with respect to each other such that when the card W is inserted and locked into members 138, the sweeps associated with the angular positions 0° and 180° of the CRT will be aligned with the X direction of table 117 and consequently with the direction of the X diameter axis, indicated by the line X—X in FIGS. 31a and 31b, of each of the holes H. The orthogonal CRT sweep coinciding with the angular positions 90° and 270° is consequently in alignment with the Y direction of the table 117 and the Y diameter axis indicated by the line Y—Y in FIGS. 31a and 31b of each of the holes. Each of the X—X axes of the respective holes are parallel to the horizontal lines 111a of the member 111 and each of the Y—Y axes are parallel to the vertical lines 111b of the member 111. In this manner, the radial beam scans generated by the respective sweeps associated with the angular positions 0° and 180° will intersect the respective vertical lines 111b at right angles and the radial beam scans associated with the angular positions 90° and 270° will intersect the respective horizontal lines 111a at right angles during the location measurement test associated with the last four signal cycles CY25–CY28.

The output which appears on conductor 364 each time one of the gates 360a–360g' of the energizer 347 is closed, is integrated by the RC circuit comprising resistor 365 and capacitor 366. The RC circuit provides in turn a ramp voltage input signal to the deflection coil system 349. Operational amplifier 367 is connected in a feedback relationship to the RC circuit in a manner well known to those skilled in the art so as to enhance the linearity of the ramp signals, one of which signals is illustrated by waveform 371 in FIG. 21. During the period 372, FIG. 21, the ramp signal drives the coil system 349 which coacts with a ramp signal, not shown, that is driving coil system 350 to generate a radial sweep in the CRT. To retrace the CRT beam, the normally open gate 368, which is controlled by the pulses of signal $\overline{SRA}$, is closed after each radial sweep which causes the short circuiting and discharging of capacitor 366 to ground, not shown. As a result, the slope of the ramp signal is reversed, as shown for example by waveform 371 during the period 373, FIG. 21, causing the electron beam to be retraced to the optical axis of the CRT. Amplifier 369 feeds the driving and retracing portions of the ramp signals, cf. the driving and retracing portions of signals 371 associated with the periods 372 and 373, respectively, shown in FIG. 21, to the deflection coil system 349. When the pulse of signal $\overline{\text{SRA}}$ terminates at the end of the period T', FIG. 21, the gate 368 is opened and the next ramp signal cycle occurs during the next adjacent period T'. In a similar manner, driving and retracing portions of appropriate ramp signals are provided to the Y deflection coil system 350 by energizer 348. The ramp signals of the X and Y deflection coils, as is obvious, are synchronized by virtue of their common derivation from the SRA, $\overline{\text{SRA}}$ signals. The signals SRA, $\overline{\text{SRA}}$ generated by the clock 130 causes the deflection control 102 to operate in a free running manner, i.e. the radial sweeps are continuously being generated in the angular sequence indicated in Table II above. The radial sweeps are kept, however, in a blanked condition whenever a test is not being made on a hole H of the workpiece or card W. When a test is being made, each radial sweep is unblanked during a predetermined period 374 of the driving portion period 372, such as is indicated by the solid line portion 371' of the signal 371 shown in FIG. 21, in a manner which will now be described in connection with the following description of the unblanking control.

Unblanking Control

Referring now to FIG. 20, the unblanking control 101 includes an AND gate 375 whose output is fed to a pair of single shot multivibrators MV 376, 377. The respective outputs of the multivibrators 376 and 377 are coupled to the set and reset trigger inputs 275b and 258b, respectively, of trigger 378. The set gate input 255b of trigger 378 is connected to its 0 output 260b, and the reset gate input 256b is connected to its 1 output 259b. The 1 output 259b is also connected to and controls the action of normally open gate circuit 379. A voltage source, not shown, provides a control grid voltage Eg at the terminal 380 of the gate circuit 379 and is connected to the control grid 381 of the CRT shown schematically in FIG. 20, when gate 379 is closed. When the signal RESET is applied via conductor 382 to reset terminal 268b of trigger 378, it sets the 1 output 259b to the 0 state. Signal DS and signal SRA from clock 130, which appear on conductor 331 and 342, respectively, are ANDed by AND circuit 375. As is readily seen from the waveforms of FIG. 18 and the explanation hereinabove, the commencement of signal DS is synchronized with the commencement of signal CY1 and is maintained during the occurrence of the sequence of the twenty-eight consecutive signals CY1 to CY28. Upon the termination of the signal CY28, the signal DS also terminates, cf. FIG. 18. Thus, the action of unblanking control 101 also occurs during the occurrence of the sequence of the twenty-eight consecutive signals CY1 to CY28, commencing with the first signal CY1 and terminating with the last signal CY28. Signal DS on the other hand is generated only if the aforementioned signal 334 is present, as will be explained in greater detail hereinafter. Signal 334 is generated by control system 119 only after the card W is locked into position in the guide member 138, the table 119 is at the desired position of the hole to be tested, and the card support assembly 127 is in its upper position. As a result, the hole under test is radially scanned during the period beginning with the first signal CY1 and ending with the last signal CY28, inc., of the aforementioned sequence of the twenty-eight signals CY1-CY28, inc. The operating principles of trigger 378 is similar to those of any of the individual trigger stages of the counter 247 or 288 previously described.

Figure 21:
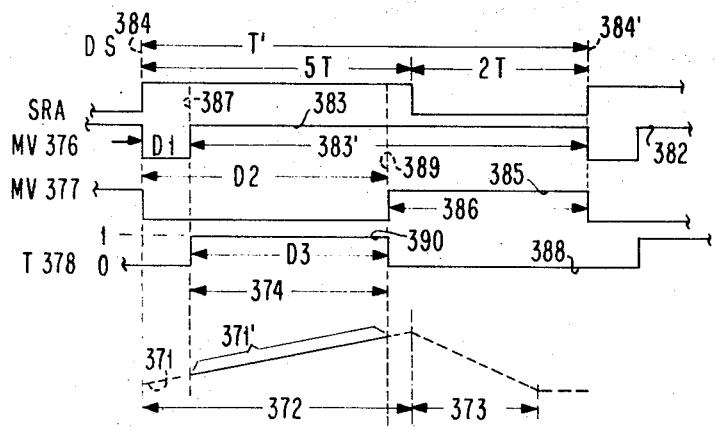
FIG. 21 are waveforms of various signals associated with the circuitry of the preferred embodiment.

In operation and after application of a signal RESET, during each cycle period T', cf. FIG. 21, of the signal SRA and upon coincidence with the signal DS, multivibrator 376 provides an output pulse 383 having a duration 383'. The initiation of pulse 383 is delayed for a finite time delay interval D1 from the commencement of the signal SRA cycle indicated by the vertical dash line 384, FIG. 21, and terminates at the end of the signal SRA cycle as indicated by the vertical dash line 384', FIG. 21. In addition, multivibrator 377 provides in each signal SRA cycle period T' and upon coincidence with a signal DS, an output pulse 385 having a shorter duration 386 and the initiation of pulse 385 which is delayed after a longer finite time delay interval D2 from the start 384 of each signal SRA cycle. Pulse 385 also terminates at the end 384' of the signal SRA cycle. The time delays D1 and D2 may be inherently built into the respective multivibrators 376 and 377 or alternatively suitable delay means, not shown, may be provided.

The positive rise of the pulse 383 which occurs at the time indicated by the dash line 387 in FIG. 21 triggers the set trigger input 257b of trigger 378. At the time corresponding to the time 387 of the initial signal SRA cycle, the 1 output 259b of trigger 387 will be in the 0 state due to the application of the previously mentioned signal RESET. Consequently, the positive rise of the corresponding pulse 383 from the multivibrator 376 will cause the trigger 378 to switch as indicated by the change in condition from the 0 state to the 1 state, respectively, of the signal waveform 388, FIG. 21, appearing at its 1 output 259b at time 387. Subsequently, when the positive rise of the corresponding pulse 385 associated with the first signal SRA cycle occurs at the time corresponding to and indicated by the dash line 389 in FIG. 21, the multivibrator 377 triggers the reset trigger input 260b causing trigger 378 to switch, as indicated by the change of state from the 1 to the 0 state at the 1 output 259b by the waveform 388 at time 389 in FIG. 21. As is readily apparent from the waveforms of FIG. 21, the trigger 378 generates a pulse train waveform 388 having a pulse, e.g. pulse 390, during each signal SRA cycle period T'.

During the period D3, FIG. 21, gate 379 is closed by the pulse 390 generated at the 1 output 259b of trigger 378. As a result, the grid voltage Eg is applied to the control grid of the CRT. In turn, the CRT is unblanked during the aforementioned time period 374 causing an increase in the intensity of the electron beam, which is being traced across the face of the CRT and resulting excitation of the CRT screen. Consequently, the light beam 100 is generated and placed in optical communication with the beam splitter 106. Delay of the unblanking of the CRT at the initiation of each sweep prevents burn-out of the CRT's screen in the area which is in the immediate vicinity of its optical axis, and which area is encompassed within the dash line circle 391, FIG. 19. Furthermore, by unblanking the CRT in each radial sweep only during the period 374, the test measurements are made only in the highly linearized center part, illustrated in FIG. 21, for example, by the solid line portion 371' of waveform 371, of the respective driving portions of the X and Y deflection coil ramp signals. This not only enhances the accuracy of the test measurements by limiting the unblanking to the highly linearized portion of the sweep, but it also eliminates any adverse effects to the measurements by mounting the associated non-linear terminal parts of the driving ramp in a blanked condition. In addition, any distortions of the electron and/or light beam associated with the initiation and termination terminal parts of the sweep, such as for example, face plate distortions, etc., are mitigated by maintaining the CRT in a blanked condition until time 387 when the electron beam reaches the dash line circle 391, FIG. 19, on the face of the CRT whereupon the CRT is unblanked in the linearized portion 371' so that the light beam 100 is generated, and thereafter maintaining the CRT in this unblanked condition until the electron beam and the resulting light beam reaches the outer dash line circle 392, FIG. 19, at time 389 whereupon the CRT is maintained in a blanked condition until the corresponding time 387 of the next signal SRA cycle in which the CRT is to be unblanked and prior to which time the electron beam is retraced. As the CRT is unblanked, the radial sweep provides a moving light beam 100 which emanates from the face of the CRT, the beam having a generally small circular cross-section and the screen of the CRT having a very short persistence characteristic. The scanning light beam is utilized in the test being performed by the measuring system 115 which is now to be described.

Measuring system

The first twenty-four radial beam sweeps of the CRT, as aforementioned, are arranged in successive pairs and are utilized in the diameter measurement of the hole H under test when the CRT is in an unblanked condition. Because the two radial sweeps of a pair are displaced 180° with respect to each other, at the end of each even numbered signal CY2, CY4, etc., the hole H is scanned along one of its diameter axes by the resulting light beam 103. At the end of the signal CY24, the hole is scanned and measured at twelve different diameter axes which are symmetrically spaced at 15° intervals. The first diameter measurement coincides with the X—X diameter axis of the hole, the first pair of sweeps being generated along the radial angular positions 0° and 180° of the CRT by the signals CY1 and CY2, respectively, as aforementioned. The last of the twelve diameter measurements occurs along the diameter axis of the hole which is scanned by the twelfth pair of sweeps generated along the radial angular positions 165° and 345° of the CRT by the signals CY23 and CY24, respectively.

Figure 22:
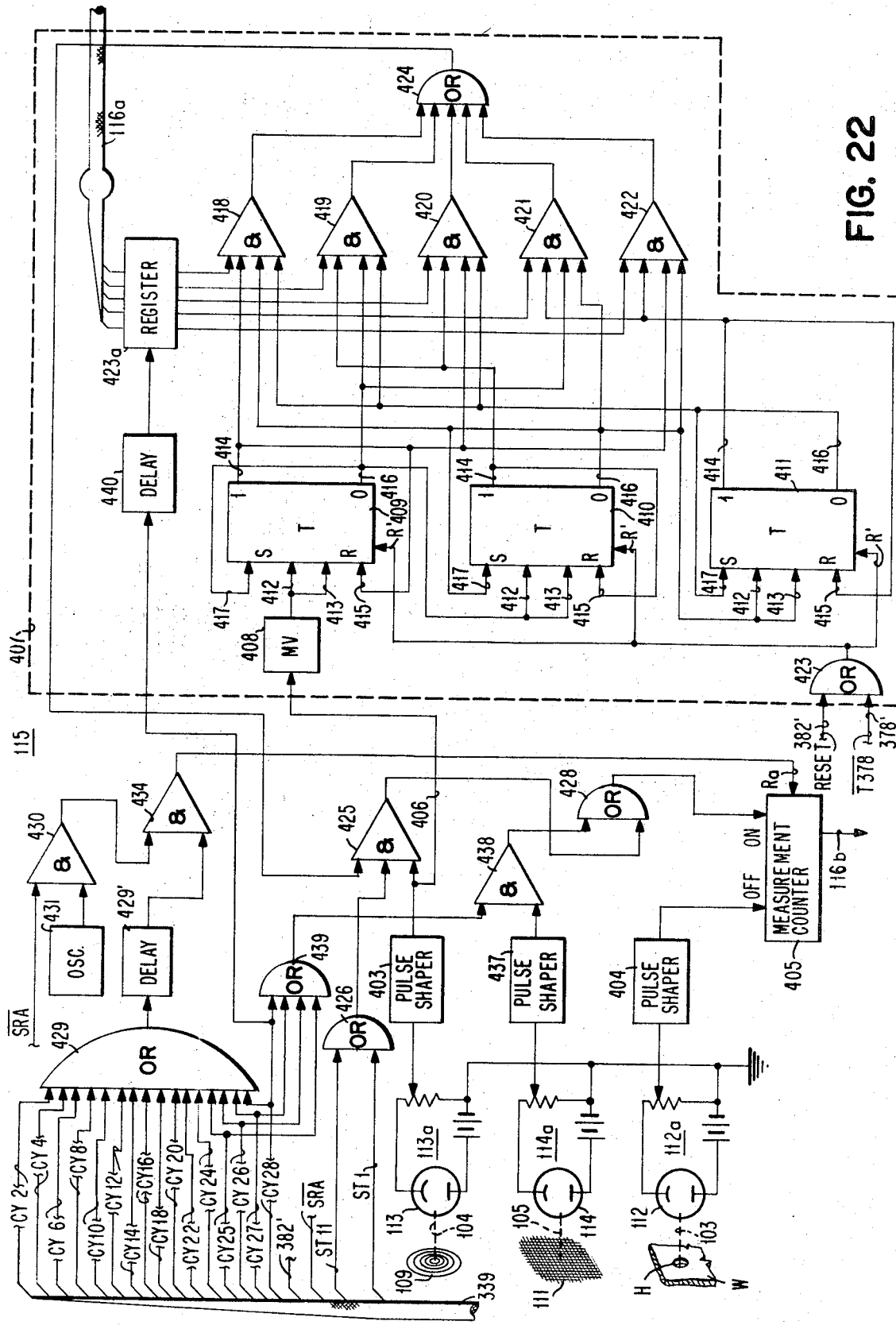
FIG. 22 is a schematic diagram in block form of the measuring system 115 of FIG. 2.
Figure 23:
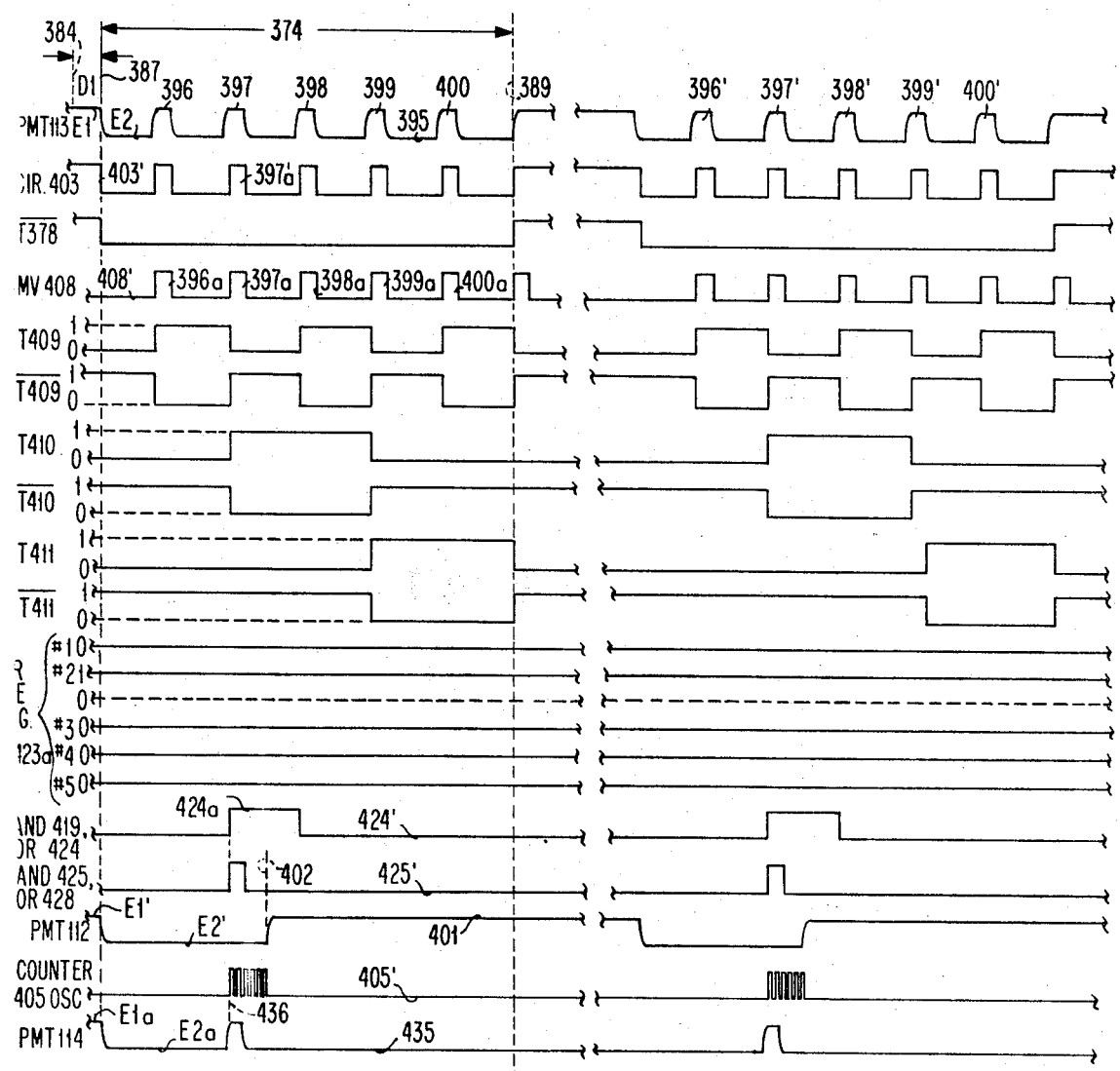
FIG. 23 are waveforms of various signals associated with the circuitry of the preferred embodiment.

Turning now to FIG. 22, the output of PMT 113, which is part of sensor circuit 113a, is at the time 384, c.f. FIGS. 21 and 23, of initiation of the driving portion of each of the ramp signals at its OFF level E1 as a result of the CRT being maintained in a blanked condition during the interval D1. The output of PMT 113 is represented by the waveform 395 in FIG. 23. At time 387, c.f. FIGS. 21 and 23, the CRT is unblanked thereby generating light beam channel 104 which actuates PMT 113 switching the output level of signal 395 to its ON level E2, FIG. 23. As the light beam of channel 104 scans member 109, it traverses and is intercepted successively by the five diameter rings 109a, 109b, etc. of member 109. Consequently, the output of the PMT 113 is sequentially turned off and on as shown by the five consecutive pulses indicated as 396, 397, 398, 399, 400, respectively. At time 389, c.f. FIGS. 21 and 23, the CRT is again blanked and the output of the PMT 113 is turned off, i.e. returns to its OFF level E1.

During the interval that the diameter ring member 109 is being scanned by the light beam channel 104, the hole H under test is also being simultaneously scanned by the light beam of channel 103. The output of PMT 112, which is part of the sensor circuit 112a, is also turned on at the initiation of the unblanked condition of the CRT at time 387 as indicated by the output signal 401 in FIG. 23. PMT 112's output remains at the ON level E2' until the light beam of channel 103 is intercepted by the edge of the hole H under test at the time indicated by the dash line 402 in FIG. 23, whereupon it returns to its OFF level E1'.

The respective outputs of circuits 113a and 112a are coupled to circuits 403 and 404, respectively, each of which comprises suitable amplifier and pulse shaping stages. The output of circuit 404 is coupled to the OFF input of a measurement counter 405 and turns the latter off at time 402. The output of circuit 403 is coupled via conductor 406 to a decoding network 407.

The output signal 403', FIG. 23, from circuit 403 is fed to a single shot multivibrator 408 which in turn is coupled to the set and reset trigger inputs 412, 413, respectively, of the first trigger stage 409 of a three-stage counter, the second and third trigger stages being indicated respectively by the reference numbers 410 and 411. Each of the trigger stages 409–411 operate on the same principles as each of the triggers associated with counter 247 and counter 288 of clock 130, previously discussed. The 1 output 414 of each of the trigger stages 409–411 is connected back to its own respective reset gate input 415 and the 0 output 416 of each of the triggers is connected back to its own set gate input 417. In addition, the 0 output 416 of the first and second stages 409 and 410 are connected to the set and reset trigger inputs 412, 413 of the next trigger stage, i.e. of the second and third stages 410, 411, respectively.

AND circuits 418–422 decode the respective outputs 414, 416 of the triggers 409–411 in a 1–2–4–8 binary code. In FIG. 23, signals T409, T410, and T411 represent the output signals at the respective 1 output terminals 414 of triggers 409, 410 and 411, respectively, and their NOT counterparts or complementary signals $\overline{T409}$, $\overline{T410}$ and $\overline{T411}$ represent the output signals at the respective 0 output terminals 416 of the triggers 409, 410 and 411, respectively. Initially, each of the 1 outputs 414 of the triggers 409–411 is set to a 0 state by the application of the signal RESET to the respective reset terminals R' of the triggers 409–411 via conductor 382' and OR circuit 423. Accordingly, by virtue of the inter and intra-connections of the inputs and outputs of the triggers 409–411, each of the set gate inputs 417 will be in a 1 condition, each of the reset gate inputs 415 will be in a 0 condition, and both the set and reset trigger inputs 412 and 413 of triggers 410 and 411 will be in a 1 condition. The set and reset trigger inputs 412 and 413 of trigger 409 are in a 0 condition due to the absence of a pulse from the multivibrator 408.

The positive rise of the first pulse 396a of the output signal 408', FIG. 23, of multivibrator 408, which is derived from the output pulse 396 of PMT 113, triggers the set trigger input 412 of trigger 409 causing the signal T409 to change from a 0 to a 1 state. Because of the finite delay inherent in the triggers, there is insufficient time coincidence between the positive rise of the first pulse 396a, which is also present at the reset trigger input 413 of trigger 409, and the subsequently present 1 condition of the output signal T409 applied from its 1 output 414 to its reset gate input 415 to cause an effect in trigger 409. However, upon application of the positive rise of the second pulse 397a to the reset trigger input 413 of trigger 409, the reset gate input 415 of which is now enabled in a 1 condition, causes its 0 output 416 to switch to a 1 state and consequently its 1 output 414 to a complementary 0 state as shown by the waveforms $\overline{T409}$ and T409, respectively. The now present 1 condition at the set trigger input 412 of trigger 410, the set gate input 417 of which is at a 1 state, triggers or switches the 1 output 414 of trigger 410 from a 0 to a 1 condition, as shown by the waveforms T410.

It can be demonstrated that the positive rise of the next pulse 398a causes the 1 output 414 of trigger 409 to switch to a 1 state without changing the condition of the other triggers 410 and 411. Likewise, it can be demonstrated that the positive rise of the next pulse 399a causes the 1 outputs 414 of triggers 409 and 410 to switch to a 0 state and the 1 output 414 of trigger 411 to switch to a 1 state; and that the positive rise of the next pulse 400a will cause the 1 output 414 of trigger 409 to switch to a 1 state without affecting the condition or state of the other triggers 410 and 411. At time 389, the signal $\overline{T378}$, which is obtained from the 0 output 260b of trigger 378 of the unblanking control 101 via conductor 378' and OR circuit 423, resets each of the 1 outputs 414 of triggers 409–411 to a 0 condition so as to ready them for the next radial scan.

AND circuits 418–422 have an input which is connected to an exclusive one of the outputs of a register 423a which includes five individual stages, not shown. Each stage of the register 423a is connected to the aforementioned data processor 116 via multiconductor cable 116a which provides an appropriate signal to the register 423a that allows the selection of one of the diameter rings of the member 109 whose size is compatible to the particular standard hole diameter size for the hole H under test. The standard hole diameter sizes are known for each of the locations of the various holes and types of card W being tested. As such, the output signals of each stage of register 423a represent a particular ring size and these signals are designated ring encoder signals #1, #2, #3, #4, #5, respectively.

AND circuit 418 ANDs signal #1 with the signals T409, $\overline{T410}$, $\overline{T411}$, which latter signals collectively correspond to the first or inner ring diameter 109a in the 1-2-4-8 binary code; AND circuit 419 ANDs signal #2 with signals T410, $\overline{T409}$, $\overline{T411}$, which latter signals collectively correspond to the second ring diameter 109b; AND circuit 420 ANDs signal #3 with signals T409, T410, $\overline{T411}$, which latter signals collectively correspond to the third diameter ring 109c; AND circuit 421 ANDs signal #4 with signals T411, $\overline{T409}$, $\overline{T410}$, which latter signals collectively correspond to the fourth diameter ring 109d; and AND circuit 422 ANDs signal #5 with signal T409, T411, $\overline{T410}$, which latter signals collectively correspond to the fifth or outer ring diameter 109e. During each radial scan only one of the AND circuits 418–422 will be enabled by a signal from the register 423a and thus only one of these AND circuits will provide an output signal at the OR circuit 424. For purposes of explanation, it will be assumed that for the standard diameter size of the hole H being measured in connection with the waveform 401 utilized in FIG. 23, AND circuit 419 would be exclusively enabled by the signal #2 from the second stage of register 423a. An output signal 424', FIG. 23, is thus provided at the output of AND circuit 419 and consequently OR circuit 424 having a pulse 424a which is in time coincidence with the pulse 397 of PMT 113 and the pulse 397a' of circuit 403. OR circuit 424 is coupled to one of the three inputs of AND circuit 425. Signals ST1 and ST11 from counter 288, FIG. 16, of clock generator 130 are ORed by OR circuit 426, FIG. 22, the output of the latter being coupled to another input of AND circuit 425. As shown by the waveform 427 in FIG. 17, OR circuit 426 provides an output signal that is present during the first twenty-four cycles, 1, 2 . . . 24 of the signal SRA. The other input of AND circuit 425 is coupled to the output of circuit 403. The output of AND circuit 425 is ORed by OR circuit 428, the output of the latter being coupled to the the termnal ON of counter 405. The outputs of circuits 425 and 428 are shown by the common waveform 425' in FIG. 23. Counter 405 is thus turned on by the presence of a signal at the output of OR circuit 428. Thus, during each scan of the first twenty-four cycles and when the CRT is unblanked, the measurement counter 405 will be turned on exclusively when there is coincidence between the pulse of the signal 403' derived from the selected encoder ring and the pulse of signal 424' generated by the decoder circuit 407 which corresponds to the particular selected encoder ring. The counter is subsequently turned off during each scan by the PMT 112 when the edge of the hole H under test is traversed by and intercepts the light beam of channel 103, as aforementioned.

Counter 405 is preferably a suitable binary counter well known in the art. As is customary, these counters generally include gating means, not shown, for turning on and off a pulse oscillator, not shown, which is also part of the counter and which oscillator provides clock pulses, c.f. waveform 405', FIG. 23, for example, having a given prf. The oscillator pulses step the associated counter stages of the counter 405, the output of which represents the number of input pulses fed to the counter stages. The output signals of circuit 428 and 404 close and open, respectively, the aforementioned gating means of counter 405 so as to turn on and off, respectively, the counter's aforementioned pulse oscillator.

During each pair of radial unblanked scans, the counter will indicate a number which represents the actual diameter of the hole under test along a particular hole diameter axis. The indicated number is observed and compared with a reference number indicative of the desired diameter to determine if the indicated number is within predetermined tolerances. In the preferred embodiment, this is done automatically, the output of the counter 405 being coupled to the data processor 116 via conductor 116b where it is compared with a reference number stored in the data processor's memory unit and which generates an error signal if it is not within the predetermined tolerances.

In order to reset the counter 405 after each diameter and location measurement, OR circuit 429 ORs the even signals CY2, CY4, etc., as well as the two odd signals CY25 and CY27. AND circuit 430 ANDs the signal $\overline{SRA}$ from generator 248, FIG. 14a, and the output of the pulse oscillator 431, which is synchronized with oscillator 261 by means, not shown. The output signal of oscillator 431 is indicated by the waveform 432 in FIG. 15. AND circuit 430 provides an output signal indicated by the waveform 433, FIG. 15, which is ANDed by AND circuit 434 with the output signal 429a of OR circuit 429. The output signal 434', FIG. 15, of of delay circuit 429' which is connected to the output AND circuit 434 is coupled to the reset terminal Ra of measurement counter 405. Consequently, counter 405 is reset to its 0 position at the end of each even cycle and the two odd cycles associated with signals CY25 and CY27 by the presence of a pulse, e.g. pulse 434a, FIG. 15, in the output signal of AND circuit 434.

To make the location measurement for the hole H, the last four unblanked radial beam scans of the CRT which are associated with signals CY25–CY28 are utilized, as aforementioned. Again, these last four radial scans are arranged in pairs such that the scans of the pair are displaced with respect to each other by a 180°. Furthermore, as mentioned above, and indicated by Table II, the first pair of radial scans associated with the location measurement are generated along the angular position 0° and 180° of the CRT by signals CY25 and CY26, respectively, causing the resulting light beam to scan the hole H under test along its X—X diameter axis. The second pair of radial scans associated with the location measurement are generated along the angular positions 90° and 270° of the CRT by signals CY27 and CY28, respectively, causing the resulting light beam to scan the hole H under test along its Y—Y diameter axis, which is orthoganol to the X—X diameter axis.

Referring again to FIG. 22, the output of PMT 114, which is part of sensor circuit 114a, is at the time 384 of initiation of the driving portion of each of the ramp signals at its OFF level E1a, as shown by waveform 435, FIG. 23. At time 387, the CRT is unblanked thereby generating the light beam 105 which actuates PMT 114 switching it to its ON level E2a, FIG. 23. As the light beam 105 scans the member 111 during each of the radial scans associated with the location measurement, it commences within the area defined by the intersection of a pair of two horizontal adjacent parallel grid lines 111b and a pair of two vertical adjacent parallel grid lines 111a, the center of which defines the standard X–Y location coordinates of the table and consequently of the card and hole. On the first scan associated with the location measurement, the light beam 105 intercepts one of the two adjacent vertical grid lines 111b which are associated with the standard X location on the hole under test. On the next scan, the light beam 105 intercepts the other one of the two adjacent vertical optical grid lines 111b. Similarly, during the third of the last four scans, the light beam 105 will traverse one of the two horizontal adjacent grid lines 111a, and on the following scan, the beam 105 will intercept the other one of the adjacent grid lines 111a. As shown by the waveform 435, FIG. 23, when the light beam 105 intercepts a grid line, the output signal of the PMT 114 is temporarily switched to its OFF level E1a, as indicated by the time, such as at the time indicated by the dash line 436. During the time that the member 111 is being scanned by light beam 105, the hole H under test is simultaneously being scanned by the light beam 103 and the PMT 112 generates an output signal in a manner similar to that described above. For sake of simplicity and explanation, the waveform 401 of FIG. 23 will be utilized along with the waveform 435 in connection with the description of the location measurement. The output of sensor circuit 114a is connected to a circuit 437 which is similar to the circuits 403 and 404 previously described. AND circuit 438 ANDs the signal of circuit 437 with the signals CY25–CY28 which are ORed by OR circuit 439. The output signal of AND circuit 438 thus provides an output pulse each time one of the optical indicia lines 111a, 111b is traversed by the light beam 105 during each of the radial scans associated with the signals CY25–CY28, respectively. The output pulse provided by AND circuit 438 is utilized to turn on the measurement counter 405 once during each radial scan associated with the location measurement, counter 405 being subsequently turned off during each of these scans by the coaction of the light beam 103, edge of the hole H under test, and sensor circuit 112a. After the hole H has been scanned in one direction along its X—X diameter axis, the signal from AND circuit 434 resets the counter 405, and the hole is next scanned in the opposite direction along its X—X diameter axis, with another signal from AND circuit 434 subsequently resetting the counter 405. The hole H under test is next scanned in first one direction and then in the other direction along its Y—Y diameter axis, in a similar manner.

During the location measurement, the counter 405 at the end of each of the associated radial scans will indicate a number that represents the actual location of the hole under test with respect to one of the standard or reference location coordinates as defined by the particular grid line 111a or 111b which is scanned. The indicated number is observed and compared with a location reference number which is indicative or represents zero displacement of the center of the hole from the reference location at the particular one of the X or Y reference coordinates, as the case might be. Again, in the preferred embodiment, this is done automatically, the output of the counter 405 being coupled, as aforementioned, to the data processor 116 where it is compared with a location reference number stored in its memory unit and which generates an error signal if the displacement is not within certain predetermined tolerances.

The card W and the members 109 and 111 are so positioned with respect to each other, that at the testing station the scanning element path, as defined by the three channels 103, 104 and 105, traverses the edge of the hole and the optical indicia of members 109 and 111 on the center portion of the scanning path and within the unblanked time period 374, c.f. FIGS. 18 and 23, thereby enhancing the accuracy of the measurements.

At the end of the twenty-eight cycle after an appropriate delay provided by the delay circuit 440, the register 423a is reset to its 0 condition so that the appropriate one of the diameter ring encoder signals #1–#5 associated with the next hole to be tested may be entered into the register 423.

Control system

Figure 24B:
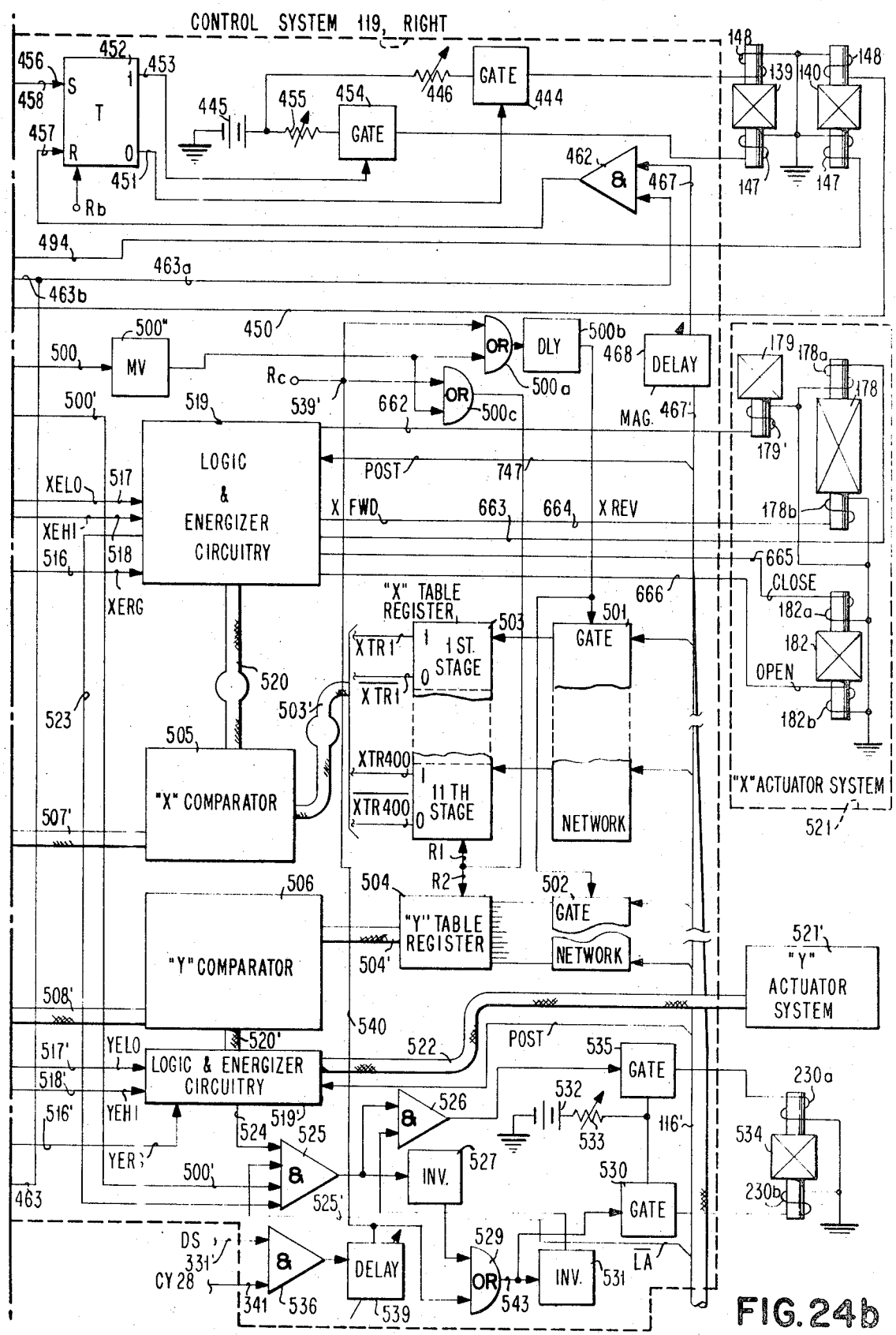

The details of the control system 119 are illustrated within the dash outline box shown in two parts in FIGS. 24a and 24b, respectively, and designated therein by the respective legends CONTROL SYSTEM 119, LEFT and CONTROL SYSTEM 119, RIGHT.

Battery 441 via resistors 442, 443 energizes the light sources, e.g. sources 161, 161', 162, 162', 224, 224', 236 which are utilized in the various optical sensors, to wit: sensors 120, 121, 125, 126 and 129, c.f. FIG. 24a. Battery 441 and resistor 442 also provide the bias voltage for the photosensing elements of these optical sensors such as, for example, elements 163, 163', 164, 164', 225, 225', 239, 242, and 243. Switch 262, partially shown, connects circuit 441–443 to the sensors by closure of its armature 263c with its contact 263d.

A normally open gate circuit 444, FIG. 24b, when closed, connects the winding 148 of solenoid 139 to the energizing circuit comprising battery 445 and adjustable resistor 446. Normally open gate 447, FIG. 24a, when closed, connects the winding 148 of solenoid 140, FIG. 24b, to the energizer circuit comprising battery 448 and adjustable resistor 449, FIG. 24a, via conductor 450. The control input of gate circuit 444 is connected to the 0 output 451 of a trigger circuit 452. The 1 output 453 of the circuit 452 is connected to the control input of another normally open gate circuit 454 which, when closed, connects winding 147 of solenoid 139 to the battery 445 via adjustable resistor 455. Normally open gate circuit 490, FIG. 24a, when closed, connects winding 147 of solenoid 140 to the energizer circuit comprising the battery 448 and adjustable resistor 493 via conductor 494.

The control inputs of gate circuits 447 and 490 are connected to the respective arms 491' and 491 of potentiometers 492' and 492, respectively. Potentiometers 492' and 492 are part of the biasing arrangements associated with the respective photo diodes 163' and 164' of sensor 126. The position of the shutter 159' shown in FIG. 24a corresponds to the retracted positions of the V-shaped members 124a–124b. In this position, diode 163' senses the light from lamp cell 161' and an output signal is generated across potentiometer 492' which exceeds the threshold level of gate circuit 447 and places the latter in the closed position. When the V-shaped members 124a, 124b are in their extended or locked positions, the aperture 160' of shutter 159' causes diode 164' to sense the light from lamp cell 162'. As a result, the control input of gate circuit 490 is enabled and the latter closes. Thus, the gate circuits 447 and 490 are operated in a complementary manner by the alternate positions of the shutter 159'. That is to say, gate circuit 490 is opened and the other circuit 447 is closed when shutter 159' is in the corresponding retracted position, as illustrated in FIG. 24a, and vice versa when the shutter 159' is in the corresponding extended position. As is obvious, gate circuits 444 and 454 are also operated in complementary manner by virtue of their respective connections to the 0 and 1 outputs, respectively, of trigger 452. Thus, when one of these gate circuits 444, 454 is in an opened position, the other is in a closed position and vice versa, it being understood that a 1 condition present at the respective control input of the gate circuits 444 or 454 will place that particular gate circuit in its closed position.

Trigger circuit 452 has set and reset trigger inputs 456 and 457, respectively. Conductor 458 connects the set input 456 to the arm 459, FIG. 24a, of the potentiometer 460. The latter is part of an energizing and sensor circuit comprising limit switch 122 and battery 461. The output of AND circuit 462, FIG. 24b, is connected to the reset trigger input 457 of trigger 452. AND circuit 462 has an input which is connected via conductors 463, 463a to the arm 464, FIG. 24a, of potentiometer 465. The latter is part of the biasing arrangement associated with the photo diode 225' of sensor 129. Photo diode 225' is in optical communication with the lamp cell 224' via aperture 466 of shutter 223 when the support assembly 127 is in its lower position which corresponds to the position of the shutter 223 shown in FIG. 24a. When shutter 223 is in the corresponding lower position of support assembly 127, potentiometer 464 generates a signal which is utilized to indicate that the card support assembly 127 is in the lower position and from which also is derived via circuit 463b–463d a command instruction fed to the data processor 116 by conductor 463' which in turn provides the address data of the next table location to which the table is to be moved, as explained in greater detail hereinafter.

Conductor 467, FIG. 24b, connects the other input of AND gate 462 to the output of delay circuit 468. The data processor 116 generates a signal HPB via conductor 467' whenever the home position addresses are read out of the memory unit of the processor 116. Conductor 467' is part of the multi-conductor cable 116' which interconnects the data processor 116 to control system 119.

The 1 output 453 of trigger 452 is switched from a 0 condition to a 1 condition by the positive rise of a signal applied to its set input 456; and the 0 output 451 is switched from a 0 condition to a 1 condition by the positive rise of a signal applied to the trigger's reset input 457. However, if the 1 output 453 is already at a 1 condition when the positive rise of a signal is applied to the set input 456, or the 0 output 451 is already at a 1 condition when the positive rise of a signal is applied to the reset input 457, the trigger 452 does not change state.

The aperture 160, depending on the position of shutter 159 which is attached to the V-shaped member 124c, places one of the lamp cells 161 and 162 in mutually exclusive optical communication with the respective one of the photo diodes 163 and 164. A suitable indicator 495, FIG. 24a, is connected to the arm 496 of a potentiometer 497 which is associated with the photo diode 163 of diode sensor 125. It indicates when the twin operated position and, conversely, not in their extended position. The position of shutter 159, illustrated in FIG. 24a, corresponds to the retracted position of V-shaped members 124c, 124d. When shutter 159 is in the position such that the diode 164 senses the light from lamp 162 via aperture 160, the V-shaped members 124c, 124d are in their extended position.

The arm 498, FIG. 24a, of potentiometer 499 which is associated with the photo diode 164 is connected via conductor 500 to the input of single shot multivibrator circuit 500", FIG. 24b. The output of the latter is connected to the input of series connected OR circuit 500a and delay circuit 500b. The output of circuit 500b is connected to the control inputs of normally open gate networks 501 and 502. When the photo diode 164 is actuated by the lamp 162 via the aperture 160, a signal is generated-at and which exceeds the threshold levels-of the control inputs of the gate networks 501 and 502 and thereby closes them. Gate networks 501 and 502 connect the programmed X and Y location address information of the table location being read out of the data processor 116, via multiconductor cable 116', to the table registers 503 and 504, respectively. Table registers 503 and 504 each have eleven individual stages, only the first and eleventh stage of register 503 being illustrated for sake of clarity. Each stage of these registers 503 and 504 corresponds to one of the respective eleven binary bit positions of the 1–2–4–8 code utilized in the optical encoder of sensor units 120 and 121 with which it is associated, the X–Y location data from the data processor 116 being encoded in a compatible 1–2–4–8 code for this purpose. The respective outputs of registers 503 and 504 transmit via multiconductor cables 503' and 504', respectively, the information which is in the particular registers 503 and 504 to comparators 505 and 506, respectively, where it is compared with the actual X and Y table location information obtained from the optical encoder of sensor units 120 and 121, respectively. As shown in FIG. 24a, the actual table location information is contained in the respective X and Y encoder registers 507 and 508. The respective outputs of registers 507 and 508 transmit the information which they contain to comparators 505 and 506, respectively, via respective multiconductor cables 507' and 508'.

The other input of OR circuit 500a is connected to a terminal Rc. Another OR circuit 500c has a pair of inputs connected to terminal Rc and the output of circuit 500", respectively. The output of OR circuit 500c is connected to the reset terminals R1 and R2 of registers 503 and 504, respectively. A signal is applied to terminal Rc at the initiation of the operation of the drilled hole tester as will be explained hereinafter. Circuits 500a–500c are arranged such that a signal from circuit 500" or at terminal Rc will cause registers 503, 504 to be cleared prior to the signal closing the gate networks 501, 502.

For sake of clarity, each of the sensors 120 and 121 are arbitrarily illustrated in FIG. 24a as comprising input and output portions which are designated by respective reference numerals 120a and 120b for sensor 120 and 121a and 121b for sensor 121. Included in the portions 120b and 121b are their aforementioned respective vertical arrays of photo diode sensors, e.g. the vertical array 238 of the eleven photo diodes 239 of sensor 120, c.f. FIG. 12. Each of the diode sensors of the arrays is connected to a potentiometer, e.g. potentiometers 509. The arm, e.g. arms 510, of each potentiometer is connected exclusively to the input of one of the individual stages of the encoder registers 507 and 508. For sake of clarity, only the diodes 239 associated with the first, second, and eleventh positions of the 1–2–4–8 binary code employed by the optical sensor 120 and corresponding to the second, third and twelfth rows, respectively, of encoder 232 of FIG. 12 are illustrated in FIG. 24a. Correspondingly, only the associated fiber optic elements 237 of the input portion 120a and potentiometers 509 associated with the particular illustrated diodes 239 are shown in FIG. 24a. Furthermore, only the first, second and the eleventh stages of register 507 are illustrated in FIG. 24a, it being understood that each of the registers 507 and 508 contain eleven stages, each of which stages is exclusively associated with one of the binary bit positions of the 1–2–4–8 code utilized by the particular optical encoder of the sensor units 120, 121 with which it is associated. The input and output portions 121a and 121b of the optical encoder of sensor unit 121 are shown in block form for sake of simplicity. For the same reason, the respective potentiometers associated with portion 121b are illustrated in block form in FIG. 24a and which block is designated by the reference numeral 509'. Multiconductor 510' connects the respective arms of the potentiometers contained in network 509' to the appropriate inputs of the individual stages of register 508, also shown in block form.

Included in the output portion 120b is a pair of photo diode sensors which sense the synchronizing bits in the respective first rows of the optical encoder of sensor unit 120. As shown in FIG. 24a, the pair comprises the low position photo diode 242 and the high position photo diode 243. These diodes 242 and 243 are connected to potentiometers 511 and 512, respectively. Also included in the input portion 120a are the fiber elements 244, 245, which are part of the bundle 237'. In the manner previously described, elements 244 and 245 are placed in mutually exclusive optical alignment with the diodes 242 and 243, respectively, by the synchronizing bits carried by member 234', which is shown in block form in FIG. 24a. A corresponding pair of sensors, not shown, and potentiometers, not shown, for sensing the synchronizing bits of the optical encoder of sensor unit 121 are provided in the output portion 121b and associated potentiometer network 509', respectively. In addition, input portion 121a also includes a fiber optic element bundle, lamp cell and encoder member arrangement corresponding to the arrangement of the similar elements 237', 236 and 234' of portion 120a.

Figure 13B:
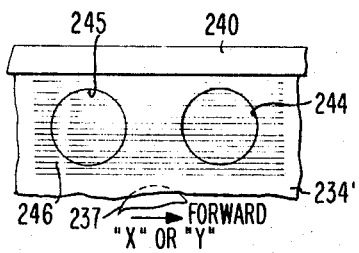
Figure 13C:
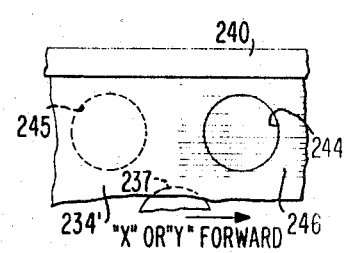

As shown in FIG. 24a, the arms 513 and 514 of potentiometers 511 and 512 are connected to the inputs of an AND circuit 515 which provides output signal XERG on conductor 516 whenever a synchronizing bit, e.g. bit 246, causes both of the excited fiber optic elements 244, 245 to be in simultaneous optical communication with their associated photo diodes 242 and 243, respectively, cf. FIG. 13b. The arms 513 and 514 are also connected via conductors 517 and 518, respectively, to the logic and energizing circuitry illustrated in block form in FIG. 24b and designated by the reference numeral 519. Signal XELO is generated on conductor 517 whenever a synchronizing bit causes the fiber optic element 244 to be in optical communication with the photo diode 242, cf. FIGS. 13b and 13c. Signal XEHI is generated on conductor 518 whenever a synchronizing bit causes the fiber optic element 245 to be in optical communication with the associated photo diode 243, cf. FIGS. 13a and 13b. Also connected to circuitry 519 is the conductor 516, as well as the multiconductor cable 520 from the output of X comparator 505. The circuitry 519 provides control signals for the actuator system 521 which contains the magnitude solenoid 178 and sign solenoid 179 used for driving and positioning table 117 in the X directions. In addition, circuitry 519 provides control signals for controllng the X detent solenoid 182 which is included in the X actuator system 521.

The arms of the appropriate potentiometers, not shown, which are included in the network 509' and which are associated with the synchronizing bit sensors, not shown, included in the sensor array 121b, are connected via conductors 513' and 514' to the respective inputs of an AND circuit 515'. AND circuit 515' generates output signal YERG on conductor 516' when a synchronizing bit of the Y encoder sensor unit 121 causes both Y synchronizer bit sensors to be illuminated by their respective excited associated fiber optic elements, not shown, included in portion 121a. Conductors 517' and 518' are connected to conductors 513' and 514', respectively, and as such are connected respectively to the last mentioned potentiometers associated with the low and high position synchronizing bit last mentioned sensors, respectively. Signals YELO and YEHI are thus generated on conductors 517' and 518', respectively, whenever a synchronizing bit of the Y encoder causes the respective excited fiber optic element, not shown, with which the particular diode sensor is associated to be in optical communication with that particular sensor diode. Conductors 516' to 518' are connected to logic and energizing circuitry 519', to which is also connected the output of Y comparator 506 via multiconductor cable 520'. Logic circuitry 519' provides various control signals via the multiconductor cable 522 to the Y actuator system 521', shown in block form in FIG. 24b for sake of clarity and which includes solenoids for driving the positioning table 117 in the Y direction and for actuating the Y detent similar to those shown in the X actuator system 521. The X and Y actuator systems 521 and 521' shown in FIG. 24b include the apparatus 165 and 166, respectively, of FIG. 3 and are represented collectively by the block 118 of FIG. 2.

Circuitry 519 and 519' also generate control signals via conductors 523 and 524, respectively, to inputs of AND circuit 525, FIG. 24a, the output of which is connected to the inputs of another AND circuit 526 and to an inverter 527. These control signals indicate when the table has been positioned in the X and Y directions, respectively, and are ANDed by AND circuit 525 with a signal derived via conductor 500' from the photo diode 164 after an appropriate delay provided by the delay circuit 528, FIG. 24a. The delayed signal from photo diode 164 represents that the card W has been inserted into the members 138 and locked therein by all of the V-shaped members. Also ANDed in AND circuit 525 is an enabling signal $\overline{LA}$ which is generated by the data processor 116 via conductor 525'. Signal $\overline{LA}$ is normally at a binary 1 level. Only after all the measurements have been performed for the programmed holes of the card W and the table 117 is returned to the home position whereupon the measurement cycle is performed and completed, is the signal $\overline{LA}$ changed to a 0 binary level as will be explained in greater detail hereinafter. The output of inverter 527, FIG. 24b, is ORed by OR circuit 529, the output of which is connected to the control input of a normally open gate circuit 530 and also to the input of an inverter 531. Gate circuit 530, when in the closed position, connects the energizing circuit comprising battery 532 and variable resistor 533 to the energizing winding 230b of solenoid 534. Ram cylinder 204, which actuates the card support assembly 127, is controlled by solenoid 534 and energization of the winding 230b maintains the card support assembly 127 in its aforedescribed lower position. The output of inverter 531 is ANDed by AND circuit 526 with the output of AND circuit 525. The output of AND circuit 526 is connected to the control input of normally open gate circuit 535. Gate circuit 535, when in the closed position, causes the energizing circuit 532–533 to be connected to the winding 230a which actuates the ram cylinder 204 and drives the card support assembly 127 to its upper position. Gate circuits 530 and 535 operate in a complementary manner. In the absence of an energizing current in either of the windings 230a, 230b card support assembly 127 is gravity operated so as to remain in its lower position. The clock signals DS and CY28, which are transmitted from generator 130 via conductors 331' and 341, respectively, cf. FIG. 14a, are ANDed by AND circuit 536 and provided with an appropriate delay by delay circuit 539. The output of delay circuit 539 is ORed by the OR circuit 529 with the signal from inverter 527. The output of delay circuit 539 also clears the table registers 503 and 504 via conductor 540 which is connected to the junction 539' and consequently to an input of OR circuit 500c and these registers' respective reset terminals R1 and R2. After the application of this signal to terminals R1, R2, it is fed to the control inputs of gate networks 501, 502 via OR circuit 500a and delay circuit 500b. This allows the registers 503, 504 to be cleared at the conclusion of the measurements of each hole prior to the insertion of the address information for the next location for which the data processor 116 is programmed.

Referring now to the operation of the control system 119 and with reference to the idealized waveforms illustrated in FIG. 25, prior to time 469 it is assumed that the table 117 is not in the home position and no card is in the members 138, which might be the circumstances just prior to the initial operation of the drilled hole tester. Under these circumstances, switches 122 and 262 are open and sensors 120, 121, 125, 126 and 129 are inoperative. Also, card support assembly 127 is in its lower position due to the effects of gravity.

At time 469, a reset pulse 470 is applied to the terminal Rb of trigger 452, setting or maintaining the 1 and 0 output terminals 451 at 0 and 1 levels, respectively, cf. respective waveforms 471 and 472, FIG. 25. As a result, gate circuits 444 and 454 are placed or maintained in closed and opened positions, respectively, as indicated by the respective waveforms 473 and 474, FIG. 25. Windings 147 and 148 of solenoid 139 are accordingly de-energized and energized, respectively, and the V-shaped members 124a and 124b together with shutter 159' are placed or maintained in their retracted position.

At time 475, switch 262 is closed and the operation of the data processor 116, clock 130, and sensors 120, 121, 125, 126 and 129 is initiated. As a result, due to the position of shutter 159', gate circuits 447 and 490 are closed and opened, respectively, causing the de-energization and energization of windings 147 and 148, respectively, of solenoid 140. Accordingly, V-shaped members 124c and 124d, together with shutter 159, are placed or maintained in their retracted position. To allow for the condition wherein the members 124c and 124d are in the extended position when switch 262 is closed at time 475, a short, i.e. rapid, response time is provided for moving the members 124c and 124d from their extended position to their retracted one. As a result, the pulse signal which is momentarily present at the output of potentiometer 499 when the shutter 159 is in the extended position and the switch 262 is closed is of insufficient time duration to trigger multivibrator circuit 500″ or to enable the AND circuit 525, both of which circuits 500″ and 525 are provided with relatively slower response times for this purpose.

As a result, the output signal of AND circuit 525 is at a 0 level and is inverted to a 1 level by the inverter circuit 527. The output signal of inverter 527 is transmitted by OR circuit 529 to the control input of gate circuit 530 thereby causing the latter to close and energize the winding 230b of solenoid 534. The output of OR circuit 529 is also inverted by inverter circuit 531 to a 0 level and as a consequence the output of AND circuit 526 is likewise at a 0 level thereby maintaining gate circuit 535 in its normally opened position and winding 230a of solenoid 534 unenergized. Thus, the card support assembly 127 is maintained in the lower position. As a consequence, shutter 466 is in the position illustrated in FIG. 24a, i.e. the lower position associated with the card support assembly 127, and an output signal is generated at the output of potentiometer 465 from which the aforementioned command instruction pulse is derived and fed to the data processor 116 via conductor 463′ and which output signal also acts as a control signal for one of the inputs of AND circuit 462 via conductor 463. More specifically, the output signal is ORed by OR circuit 463c, the output of which is coupled to the input of a single shot multivibrator circuit 463d. Multivibrator circuit 463d provides a single output pulse upon application of a positive pulse to its input. The other input of OR circuit 463c is connected to the arm 459 of potentiometer 460. Consequently, multivibrator 463d provides an output pulse whenever switch 122 is closed or whenever card support assembly is in the lower position. The command instruction causes the data processor 116 to provide the address of the table position programmed therein to the gate networks 501 and 502. The data processor 116 is programmed at the initiation of its operation to provide the home position address information and the signal HPB, the latter being illustrated in FIG. 25. Signal $\overline{LS}$ is also generated at this time and is at binary 1 level. Signal HPB is provided with a suitable time delay DA by delay circuit 468 and the delayed signal, cf. waveform 476, is ANDed with the signal, cf. waveform 477, from the output of potentiometer 465 by AND circuit 462 at time 478. However, the coincidence of signals 476 and 477 and resulting output signal, cf. waveform 479, present at the output of AND circuit 462 does not switch trigger 452 when the resulting output signal 479 is applied to the reset trigger input 457 because the 0 output 451 of trigger 452 is already in a 0 condition. The input signal to input 457 is illustrated by waveform 479′ in FIG. 25.

At time 475 a signal from a suitable synchronized source, not shown, is applied to terminal Rc which is fed to the reset terminals R1 and R2 of registers 503 and 504, respectively, thus clearing the registers. This same signal, after a very brief time delay provided by delay circuit 500b, is transmitted to the control inputs of gate networks 501 and 502, respectively, causing the X and Y home position address information from the data processor 116 to be transferred to the X and Y table registers 503 and 504, respectively.

Also, at time 475, the actual X and Y table position information as sensed by the sensors 120 and 121 respectively is transferred into the X and Y encoder registers 507 and 508, respectively. As will be discussed in further detail hereinafter, due to the difference between the information stored in the encoder registers and that stored in the table registers, the associated logic circuits 519 and 519′ generate signals which cause one or both of the X and Y detents to retract, e.g. signal OPEN generated by logic circuit 519 which is applied to winding 182b or solenoid 182. One or both of the logic circuits 519, 519′, in addition, generate appropriate signals depending on the respective numbers stored in the encoder registers and table registers which cause the table to move to the home position at a predetermined rate or rates and direction along one or both of the reference X and Y axes of the positioning table, e.g. signals MAG, XFWD or XREV of circuit 519. As the table 117 moves in a given direction, the associated encoder register is continually updated with the information being senses by the particular one of the sensors 120, 121 with which it is associated. Automatic reset circuitry 507′ and 508′ provide reset signals to the reset terminals R3 and R4, respectively, of the respective encoder registers 507 and 508 prior to each updating of the information in the particular encoder register with which it is associated. Each of the reset circuits, as shown in detail with respect to the circuits 507′ comprises a logic stage having a series connected OR circuit, e.g. circuit 507a, and inverter circuit, e.g. circuit 507b. The inputs of the OR circuit are connected to the outputs of the synchronizing bit sensor diodes 242, 243 and consequently a reset signal is produced only when diodes 242, 243 are not simultaneously sensing the light emanating from their respective elements 244, 245. As is obvious, if the table at time 475 had been in the home position, or had been in only one of the X or Y position corrdinates associated with the home position, then the table would not be moved or would be moved only in the corresponding direction toward the other home position coordinate. When the table reaches the home position, the logic circuits 519, 519′ generate appropriate signals which cause the respective X and Y detents to be placed in their extended positions thereby locking the table into position, e.g. signal CLOSE of circuit 519 which energizes winding 182a of solenoid 182, winding 182b being de-energized simultaneeously in a complementary manner. If the table at time 475 had been in the home position then the X and Y detents would not have been retracted and subsequently extended; if the table had been in only one of the X or Y position coordinates associated with the home position, only the particular detent which was associated with the other home position coordinate would have been retracted and subsequently extended when the table was located at the last mentioned coordinate of the home position.

At time 480, the table has been locked in the home position and the first card W is inserted into members 138 by the automatic feeding means, not shown. As a result, the leading edge of the card W closes the limit switch 122 and potentiometer 460 provides an output signal having a positive rise. The positive rise causes the multivibrator circuit 463d to generate an instruction pulse to the data processor 116 which in turn transmits the next X and Y table location address information for which it is programmed and which in this particular case corresponds to the location of the first hole of the card to be tested. The information is fed to the gate networks 501, 502, which are presently in their opened condition, via cable 116′. Simultaneously, the positive rise of the output signal from potentiometer 460 is fed to the set input 456 of trigger 452, cf. waveform 481, FIG. 25. Thus, at time 480 the trigger 452 switches with the 1 output 453 going from 0 to a 1 condition and the 0 output going from a 1 to a 0 condition, cf. waveforms 471 and 472. In turn, the gate circuits 444 and 454 are opened and closed, respectively, resulting in the operational sequence wherein the side V-shaped members 124a, 124b are first extended and then the end V-shaped members 124c, 124d are next extended, thereby locking the card W in place in the table 117. When the shutter 159 is placed into the extended position, a signal is generated at the output of potentiometer 499 which via the circuitry 500″, 500a–500c clears registers 503 and 504 and subsequently briefly closes the gate networks 501, 502 to allow the data from the data processor 116 to be transferred to the registers 503, 504.

Also at time 480, when the instruction pulse is generated and the new address information, which is for the sake of explanation assumed to be different than the home position information, is transmitted by the data processor 116, the signal HPB returns to its 0 level as shown in FIG. 25. As a result, the signal 476 at the output of delay circuit 468 returns to a 0 level at time 482 causing a corresponding return to the 0 level in the output signal 479 from AND circuit 462 thereby removing the signal 479' from the reset input terminal 457 of trigger 452.

During the time period 480–483 and depending upon whether one or both of the actual X and Y coordinate positions of the table 117 is or are different from the programmed X and Y positions in the registers 503, 504, one or both of the logic circuits 519, 519' will generate signals which will open one or both of the X and Y detents. In addition, one or both logic circuits generate signals which will drive the table to the programmed location, whereupon at time 483 one or both of the detents are placed into their extended position thereby locking the table in the programmed location. As a result, AND circuit 525, at time 483, will have all of its inputs at a 1 level causing gate circuits 530 and 535 to open and close, respectively, thereby placing the card support assembly 127 in its upper or supporting position as well as the attached shutter 223. The aperture 466 of shutter 223 now causes the diode 225 to sense the light from cell 224. Consequently, at time 483, the output signal across potentiometer 465 goes to the 0 level and an output signal, which is the aforementioned signal 334, is produced across potentiometer 542 which is transmitted via conductor 330 to the set gate input 255a of trigger 329 of the synchronizer 249, c.f. FIG. 14a. As previously explained, synchronizer 249 generates the signal DS when enabling signal 334 is present and there is coincidence between the signals $\overline{SR1}$, $\overline{SR7}$ and CY28'. The signal DS, in conjunction with the signal SRA and the circuitry of unblanking control 101, FIG. 20, causes the CRT to be unblanked in the manner previously described beginning at the 0 degree radial sweep, it being recalled that the beam of the CRT is continually producing a radial scan pattern in a blanked condition until such time as the signals DS, SRA and unblanking control 101 becomes effective. As a result, the CRT scans the hole under test with the aforementioned twenty-eight radial scans and the test data is provided to the measuring system 115 accordingly. When the signal CY28, which is associated with the last radial unblanked scan, is generated, an output signal is thus produced at the output of AND circuit 536. This last mentioned output signal is delayed by circuit 539 a sufficient time interval to allow the test measurement associated with that scan to be performed and then causes the gate circuits 530 and 535 to close and open, respectively, thereby placing the card support assembly 127a in its lower position and resulting inter alia in the removal of the enabling signal 334 and consequently blanking the CRT. Simultaneously, the output of delay circuit 539 clears registers 503 and 504, via its connection to junction 539'. At time 484, when the shutter 223 is placed in its lower position by the foregoing actions, the diode 225' senses the light from the cell 224' and produces an output signal at potentiometer 465 which causes an instruction pulse to be generated on conductor 463' and which is fed to the data processor 116 whereby the address data of the next programmed hole to be tested is presented to the gate networks 501 and 502. Shortly thereafter the delay circuit 500b generates a signal at the control inputs of the gate networks 501, 502 which allows the new data to be transferred to the table registers 503, 504 whereupon the operation of the system continues according to the following sequence for each hole to be tested, as follows:

one or both of the X and Y detents are retracted; the table moves to the new position; the X and Y detents are extended; the card support assembly 127 is raised to its upper position; the CRT is unblanked in the aforedescribed manner and the measurements taken; at the conclusion of the measurements card support assembly 127 is lowered and the CRT is blanked; the address data of the next location is generated by the data processor and thereafter fed to the previously cleared registers 503, 504; the X and Y detents are retracted, the table moved to the next location; the X and Y detents are extended; etc.

Each of the subsequent holes associated with the intervening programmed locations, i.e. those locations commencing from the programmed location, which immediately follows the programmed location of the first hole, and ending with the penultimate programmed location, inc., are tested during the interval DB.

At time 485, the card support assembly is lowered to its lower position, the measurement of the hole associated with the penultimate location having just been concluded. As a result, signal 477 is placed at a binary 1 level. The table is programmed so that the last programmed location coincides with the home position. As a result, at time 485 signal HPB is placed at a binary 1 level and the home position information is transferred to the inputs of gates 501, 502. Shortly thereafter, the home position information is entered into the registers 503, 504 and as a consequence one or both of the X and Y detents are retracted and the table is moved to the home position whereupon the X and Y detents are placed in their extended positions and the card support assembly 127 is placed in its upper position. The card W is scanned at this location whether or not a hole is present. If no hole is present, the test data is disregarded by the data processor 116. At the conclusion of the last scan at time 486 the card support assembly 127 is placed in lower position along with its shutter 223 as indicated by the change from the 0 to the 1 level of the output signal 477. The data processor 116 is programmed so that the instruction pulse generated at this time will continue to provide the home position information and consequenly the signal HPB. In addition, at this time the signal $\overline{LA}$ returns to a binary 0 level and consequently the card support assembly 127 is maintained in its lower position. Signal HPB, after being delayed by the time interval DA provided by delay circuit 468, at time 487 presents an output signal 476 which is in time coincidence with the output signal 477 obtained from potentiometer 465. As a result, the positive rise of output signal 479 of AND circuit 462 at time 487, resets the trigger 452 by its applicatian to the reset input 457, cf. waveform 479'. This action in turn causes the 0 output 451 and 1 output 453 of trigger 452 to be switched to 1 and 0 levels, respectively, causing gate circuits 444 and 454 to close and open, respectively, and the V-shaped locators 124a, 124b to be placed in their retracted positions and thereafter resulting in the V-shaped members 124c, 124d being placed in their retracted positions.

At time 488, the card W is withdrawn by the automatic feeding means, not shown, from the members 138 thereby removing the enabling signal 481 from the set input 456 of trigger 452.

At time 489, the next card W is inserted into the members 138 by the automatic feeding means and the operational cycle is repeated. The time delay DA provided by delay circuit 468 is of sufficient duration to allow the hole, if present at the home position, to be measured during the period DC.

The comparator circuits 505, 506 and circuitry 519, 519' will now be described under appropriately captioned headings.

Referring now to FIGS. 26a–26g, there is shown in

Comparator detail the arrangement of logic components for the X comparator 505 of FIG. 24b which compares the data or information in the X encoder register 507 with the data of the X table register 503 so as to provide the X control signals for the circuitry 519. For sake of simplicity, the details of the Y comparator 506 of FIG. 24b are not shown, it being understood that the Y comparator 506 has a corresponding arrangement of similar components which compares the data of the Y encoder register 508 and Y table register 504 so as to generate analogous Y control signals for controlling the circuitry 519'.

Figure 26A:
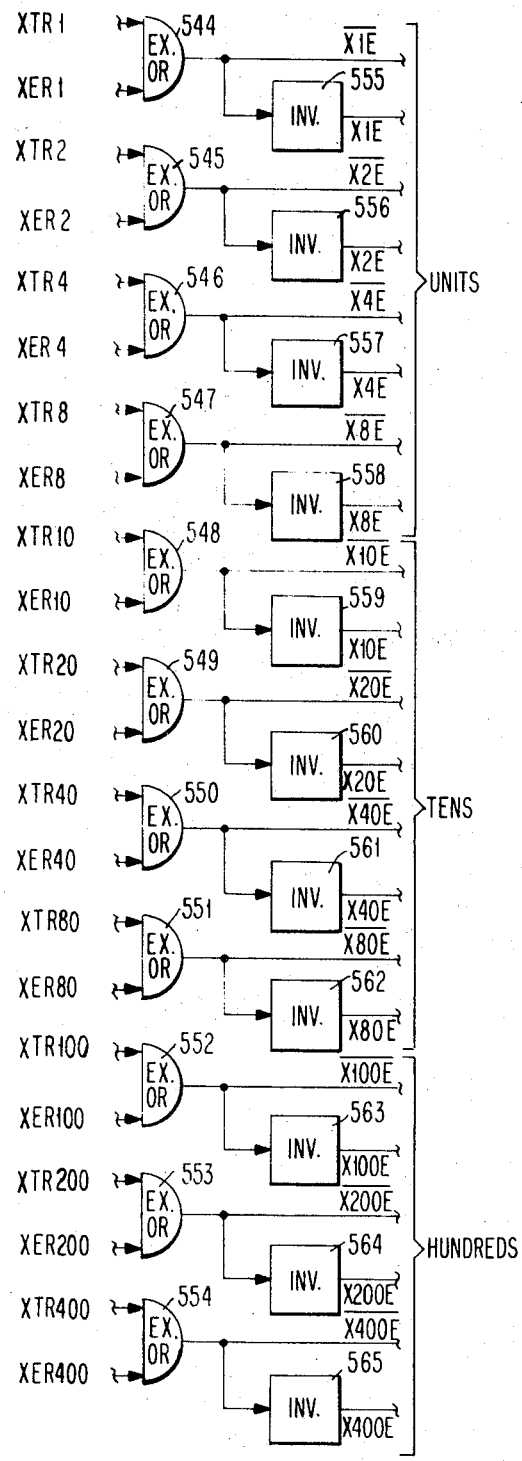

As shown in FIG. 26a, there is illustrated the first group of eleven logic stages wherein each of the signals XTR1, XTR2 . . . XTR400 from the register eleven stages of the X table register 503, FIG. 24b, is ORed in an exclusive one of the exclusive OR circuits 544–554 with the corresponding one of the signals XER1, XER2 . . . XER400 from the respective eleven stages of the X encoder register 507, FIG. 24a. As is well known to those skilled in the art, each of the two input exclusive OR circuits 544–554 will provide an output signal only when there is one of the signals present at its input; and whenever both inputs are present, or whenever both inputs are not present, the exlusive OR circuit does not provide an output signal. Consequently, when an output signal is present, i.e. is a binary 1 level, at the output of a particular one of the OR circuit 544–554, the output signal will thus represent that one of the input signals is not present, i.e., the signals from the respective corresponding stages of registers 503 and 507, which are ORed by the particular exclusive OR circuit, are not equal. For sake of explanation, the output signals of the exclusive OR circuits 544–554 are designated by the reference character $\overline{X1E}$, $\overline{X2E}$, etc., respectively. Inverters 555–565 are respectively connected to the outputs of the OR circuits 544–554 and generate the complementary output signals X1E, X2E, etc., of signals $\overline{X1E}$, $\overline{X2E}$, etc., respectively. Each of the signals X1E, X2E, etc., if present, thus signifies that the input signals to the particular exclusive OR circuit with which the particular inverter is associated are either both present, i.e. at 1 levels or both absent, i.e at 0 levels. In other words, that the signals from the respective corresponding stages of registers 503 and 507, which are ORed by the particular exclusive OR circuit, are equal.

Figure 26C:
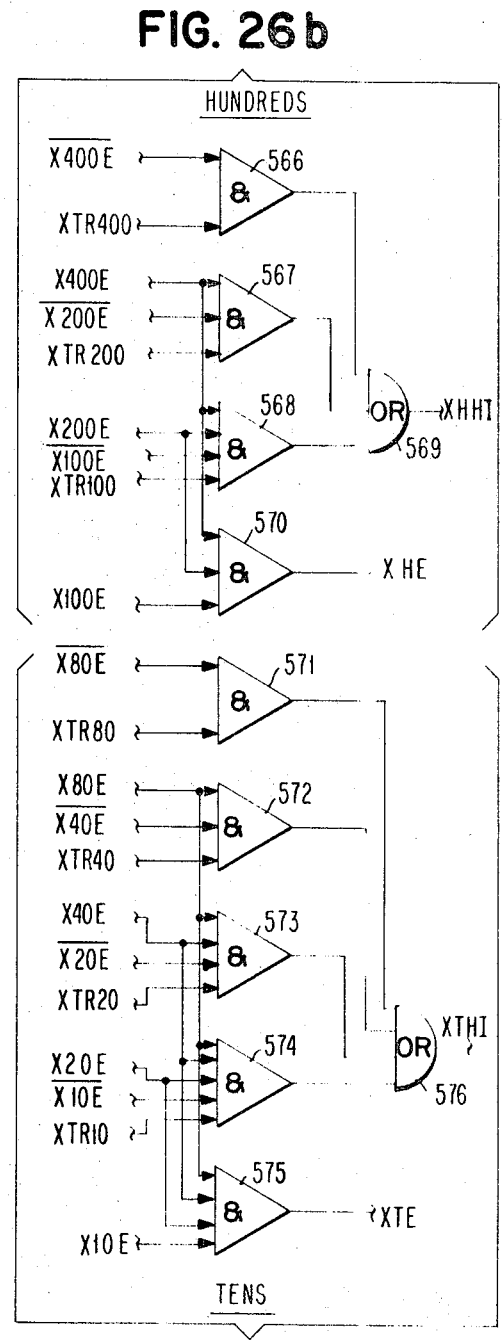
Figure 26E:
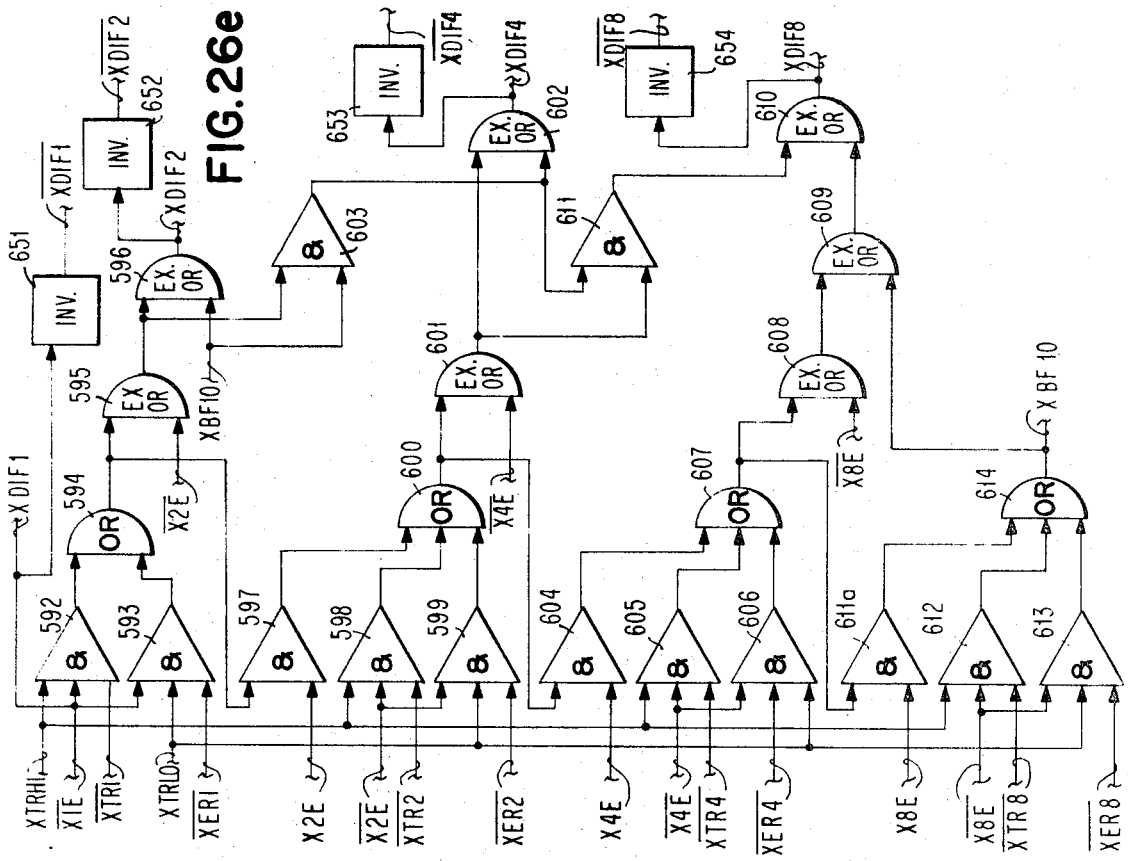
Figure 26D:
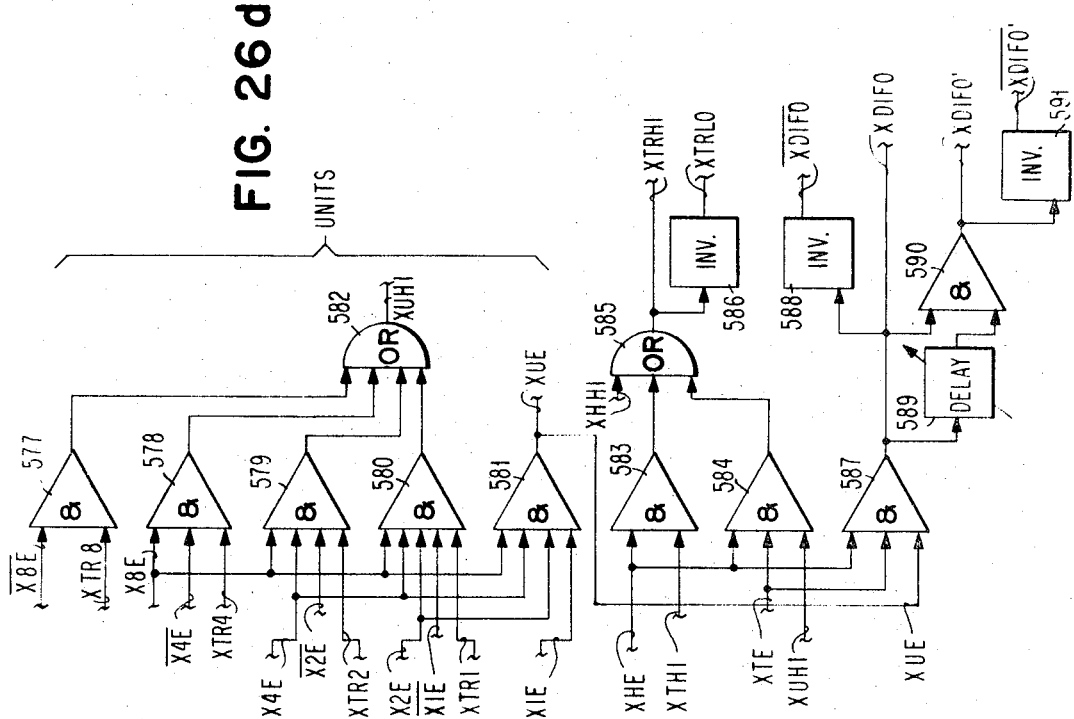

In FIGS. 26b–26d there is illustrated additional logic stages for generating signals XHHI and XHE, XTHI and XTE, and XUHI and XUE, respectively. In the logic stage illustrated in FIG. 26b, AND circuit 566 ANDs the signal $\overline{X400E}$ obtained from the exclusive OR circuit 554 of FIG. 26a with the signal XTR400 obtained from table register 503; AND circuit 567 ANDs the signals X400E, $\overline{X200E}$, XTR200; and AND circuit 568 ANDs the signals X400E, X200E, $\overline{X100E}$, and XTR100. The outputs of AND circuit 566–568 are ORed by OR circuit 569, and AND circuit 570 ANDs the signals X400E, X200E, and X100E. As is obvious to those skilled in the art, if the hundred's order of the decimal number contained in the 1–2–4–8 binary encoded form in the corresponding stages of table register 503 is greater than that in the corresponding stages of register 507, signal XHHI will be at a binary 1 level and signal XHE will be at a binary 0 level. On the other hand, if the hundred's order of the decimal number stored in table register 503 is less than that in the encoder register 507, then signals XHHI and signal XHE are both at binary 0 levels. However, if the decimal orders of the numbers in the respective registers 503 and 507 are equal, then signals XHHI and signal XHE are at binary 0 and 1 levels, respectively. The logic stage comprising the arrangement of AND circuits 571–575 and OR circuit 576 shown in FIG. 26c generate analogous signals XTHI and XTE for the tens decimal orders. Likewise, the logic stage comprising the arrangement of AND circuits 577–581 and OR circuit 582, FIG. 26d, generate analogous signals XUHI and XUE for the units decimal orders.

The next logic stage 583–586 generates the signals XTRHI and XTRLO which indicate if the binary encoded decimal number in the table register 503 is higher and lower, respectively, than the binary encoded decimal number in the encoder register 507. Accordingly, AND circuit 583 ANDs the signals XHE, XTHI which were obtained from the AND circuit 570, FIG. 26b, and OR circuit 576, FIG. 26c, respectively. AND circuit 584, FIG. 26d, ANDs the signals XTE and XUHI obtained from AND circuit 575, FIG. 26c, and OR circuit 582, FIG. 26d, respectively, with the signal XHE. The outputs of AND circuits 583 and 584 are ORed by OR circuit 585 with the signal XHHI, which is obtained from the OR circuit 569, FIG. 26b. OR circuit 585 generates the output signal XTRHI. Inverter 586 inverts the output of OR circuit 585 to provide the complementary signal XTRLO of signal XTRHI.

In the logic stage 587–588, AND circuit 587 ANDs the signals XHE, XTE and the signal XUE, which is derived from AND circuit 581, and provides an output signal XDIF0. Inverter 588 provides its complementary signal $\overline{XDIF0}$. The conditions that the numbers in the table register 503 and encoder register 507 are equal and not equal are represented by the signals XDIF0 and $\overline{XDIF0}$, respectively. The logic stage 589–591 generate the delayed signal XDIF0' and $\overline{XDIF0'}$. Accordingly, the output of AND circuit 587 is also connected to the input of a delay circuit 589 and also to the input of an AND circuit 590. The other input of AND circuit 590 is connected to the output of delay circuit 589. AND circuit 590 provides the output signal XDIF0', and the not counterpart or complementary signal $\overline{XDIF0'}$ is generated at the output of inverter 591, the input of which is connected to the output of AND circuit 590.

Figures 26F, 26G:
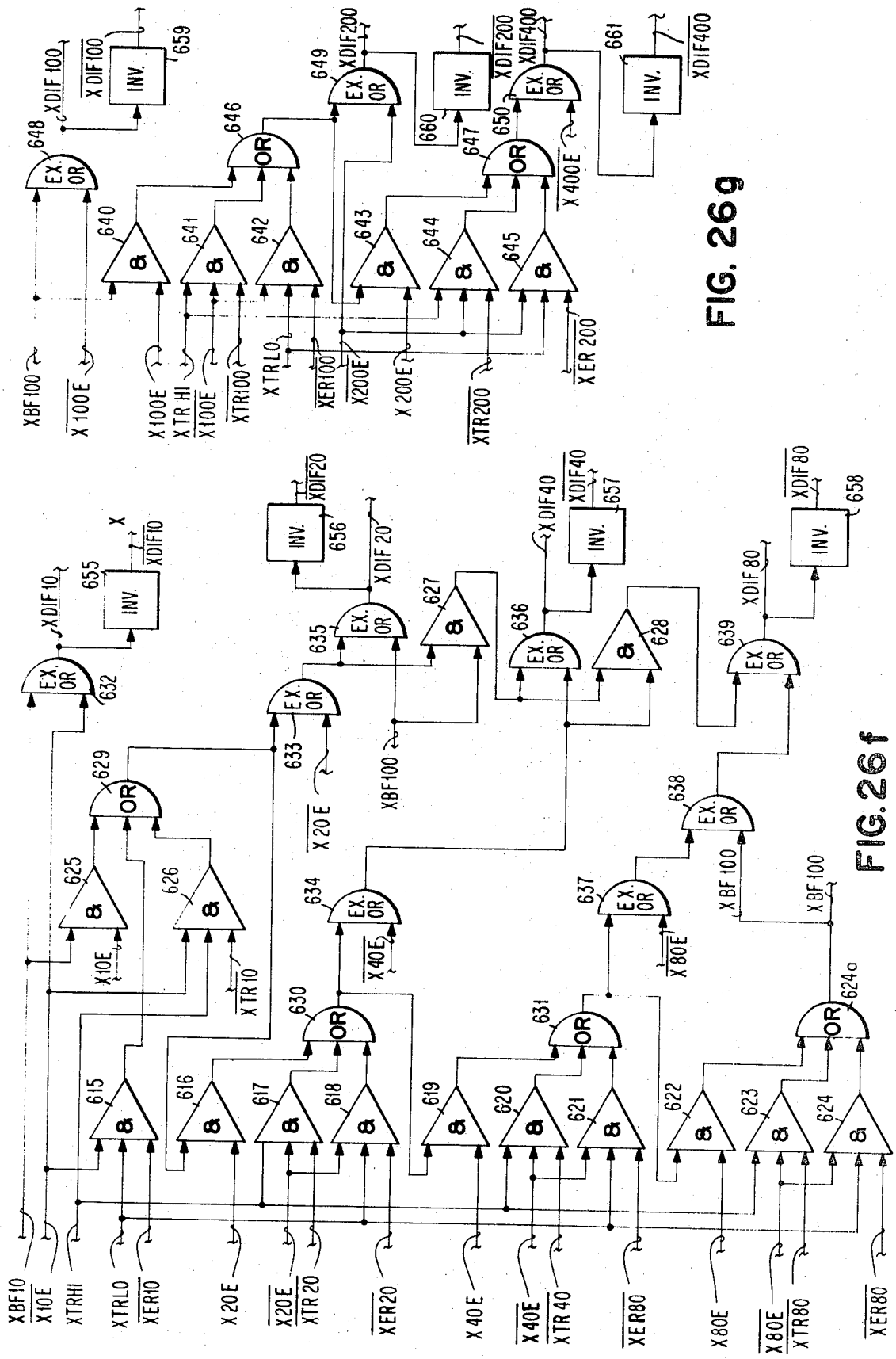

The logic stages shown in FIGS. 26e–26g generates the signals XDIF1–XDIF400 which collectively represent on a 1–2–4–8 binary code the difference between the decimal numbers contained in the registers 503 and 507, respectively.

For example, in the logic stage shown in FIG. 26e, AND circuit 592 ANDs the signals XTRHI, $\overline{X1E}$, $\overline{XTR1}$; and AND circuit 593 ANDs the signal XTRHI, XTRLO, $\overline{XER1}$. The outputs of AND circuits 592 and 593 are ORed by OR circuit 594, the output of which is connected to an input of the exclusive OR circuit 595. The other input of exclusive OR circuit 595 is fed by the signal $\overline{X2E}$. Exclusive OR circuit 596 ORs the output of exclusive OR circuit 595 with the borrow signal XBF10 hereinafter referred to. The output of exclusive OR circuit 596 provides the signal EDIF2. The signal XDIF1 is provided by the signal $\overline{X1E}$. The output of OR circuit 594 is also ANDed by AND circuit 597 with the signal X2E. The signals XTRHI, $\overline{X2E}$, $\overline{XTR2}$ are ANDed by AND circuit 598. AND circuit 599 ANDs the signals $\overline{X2E}$, XTRLO and $\overline{XER2}$. The outputs of AND circuits 597 and 598 and 599 are ORed by OR circuit 600, the output of which is connected to an input of the exclusive OR circuit 601. The other input of the exclusive OR circuit 601 is fed by the signal $\overline{X4E}$. The output of exclusive OR circuit 601 is connected to an input of exclusive OR circuit 602. The output of AND circuit 595 and the signal SBF10 are also ANDed by AND circuit 603. The output of AND circuit 603 is coupled to the other input of exclusive OR circuit 602, the latter providing the signal XDIF4. The output of OR circuit 600 is also ANDed with the signal X4E by AND circuit 604. Signals XTRHI, $\overline{X4E}$, and $\overline{XTR4}$ are ANDed by AND circuit 605, and signals $\overline{X4E}$, $\overline{XER4}$, XTRLO are ANDed by AND circuit 606. The outputs of AND circuits 604–606 are ORed by OR circuit 607, the output of which is connected to an input of the exclusive OR circuit 608. The other input of the OR circuit 608 is fed by signal $\overline{X8E}$. The output of exclusive OR circuit 608 is coupled to an input of the exclusive OR circuit 609. The other input of exclusive OR circuit 609 is fed by the signal XBF10. The output of exclusive OR circuit 609 is connected to an input of the exclusive OR circuit 610. The other input of exclusive OR circuit 610 is connected to the output of AND circuit 611. The signals from the respective outputs of exclusive OR circuit 601 and AND circuit 603 are also ANDed by AND circuit 608. The output of OR circuit 607 is ANDed by AND circuit 611a with the signal X8E. Signals XTRHI, $\overline{X8E}$ and $\overline{XTR8}$ are ANDed by AND circuit 612. Signals $\overline{X8E}$, XTRLO, and XER8 are ANDed by AND circuit 613. The output of AND circuits 611a, 612 and 613 are ORed by OR circuit 614, the output of which provides the aforementioned borrow signal XBF10.

It can be demonstrated that the logic stage show in FIG. 26 comprises AND circuits 615–628, OR circuits 629–631, and exclusive OR circuits 632–639 generate the respective signals XDIF10, XDIF20, XDIF40, XDIF80 and XBF100. It can also be demonstrated that the logic stage shown in FIG. 26g comprises AND ciruits 640–645, OR circuits 646–647, and exclusive OR circuits 648–650 generate the signals XDIF100–XDIF200 and XDIF400. The not counterpart signals $\overline{XDIF1}$–$\overline{XDIF400}$, inc., are generated by the inverters 651–661, respectively, FIGS. 26e–26g.

The output signals XDIF0, XDIF1, XDIF2, etc., represent the difference between the number in the table register 503 and the number in the encoder register 507, as aforementioned. For example, let it be assumed that the table registers 503 and 507 contain the 1–2–4–8 binary encoded decimal number 563

$$(=2^2\times 100+2^0\times 100+2^2\times 10+2^1\times 10+2^1\times 1+2^0\times 1)$$

and decimal number 55

$$(=2^2\times 10+2^0\times 10+2^2\times 1+2^2\times 1)$$

respectively. It can be demonstrated that in the given example the signals associated with the comparator circuitry 519 shown in FIGS. 26a–26b will be in conformity with the binary values indicated in the following Table III.

TABLE III

| Dec. Eqv. | Reg. 503 | Reg. 507 | FIG. 26a | FIGS. 26b–26h | |
|---|---|---|---|---|---|
| 400 | XTR400=1 | XER400=0 | $\overline{X400E}$=1 | XHHI=1 | SDIF400=1 |
| 200 | XTR200=1 | XER200=0 | $\overline{X200E}$=0 | XHE=0 | SDIF200=0 |
| 100 | XTR100=1 | XER100=0 | $\overline{X100E}$=1 | XTHI=1 | XDIF100=1 |
| 80 | XTR80=0 | XER80=0 | $\overline{X80E}$=0 | XTE=0 | XDIF80=0 |
| 40 | XTR40=1 | XER40=1 | $\overline{X40E}$=0 | XUHI=0 | XDIF40=0 |
| 20 | XTR20=1 | XER20=0 | $\overline{X20E}$=0 | XUE=0 | XDIF20=0 |
| 10 | XTR10=0 | XER10=1 | $\overline{X10E}$=0 | XTRHI=1 | XDIF10=0 |
| 8 | XTR8=0 | XER8=0 | $\overline{X8E}$=0 | XTRL0=0 | XDIF8=1 |
| 4 | XTR4=0 | XER4=1 | $\overline{X4E}$=1 | XDIFO=0 | XDIF4=0 |
| 2 | XTR2=1 | XER2=0 | $\overline{X2E}$=1 | XBF10=1 | XDIF2=0 |
| 1 | XTR1=1 | XER1=1 | $\overline{X1E}$=0 | XBF100=0 | XDIF1=0 |

As is readily seen from the above tabulation, only the XDIF400, XDIF100, XDIF8 output signals derived from the circuitry of FIGS. 26a to 26g are in 1 conditions and represent in the 1–2–4–8 binary code the difference between the two decimal numbers selected in the given example to wit:

$$\text{Difference}=508=563-55=2^2\times 100+2^0\times 100+2^3\times 1$$

The X and Y control signals generated by comparators 505 and 506 are decoded by the logic stages of the respective circuits 519 and 519' now to be described.

Logic—Energizer Circuitry

The logic and energizer circuitry 519, FIG. 24b, generates the control signals MAG, XFWD, XREV, CLOSE, and OPEN. The control signal MAG energizes the winding 179' of magnitude solenoid 179, FIG. 3, via conductor 662. The magnitude of the signal MAG is utilized to control the position of the spool 179a of the solenoid 179. With the winding 179' de-energized, the intake pressure to inlet 179b is fed to both face ends of the solid cylindrical spool 179a contained in the cylinder 179c of solenoid 179. Under these conditions, the pressure exerted at the opposite ends of the spool 179a is equal. The spool is thus in a balanced condition and is maintained in a position that closes all of the partially shown plural outlet ports, e.g. port 179d, and the table 117 is maintained at rest in the X direction. Energization of the winding 179' causes the spool 179a to move to the right, as viewed from FIG. 3. Depending upon the magnitude of the energizing current, one or more of the ports, e.g. port 179d, is thus opened and the table moves in the X direction. As the number of ports increases, the rate of speed for driving the table 117 in the X direction increases and vice versa. With the spool 179a in the extreme right position, as viewed from FIG. 3, all of the outlet ports are opened and the right end of the spool 179a is in abutment with the annular stop 179e formed on the inner wall of the cylinder 179c. In the latter described position of the spool, the table 117 is driven in the X direction at its maximum speed.

Signals XREV and XFWD are fed to the windings 178a and 178b, respectively, of solenoid 178, c.f. FIG. 3, via the respective conductors 663 and 664. Energization of the winding 178a causes the spool 178c to be placed in the position illustrated in FIG. 3 and such that when one or more of the outlet ports associated with the solenoid 179 is opened, the pressure will be transmitted via the pneumatic line 178d through the cylinder 178e and pneumatic line 178f and from there to the left side of the piston 170 of ram cylinder 169. The pressure is returned by pneumatic lines 178g through the cylinder 178e and from there back to the outlet pneumatic line 178h. As a consequence, the table 117 moves in the reverse direction along the X axis, if one or more of the ports of solenoid 179 are open. Under these circumstances, the pneumatic line 178i is effectively sealed off by the chamber 178j formed by the appropriate sections of the spool 178c and the inner walls of the cylinder 178e. Energization of the winding 178b causes the spool 178c to move to the left position as viewed from FIG. 3 thereby causing the pressure from the inlet line 179b to be transmitted to the port(s), if opened, of solenoid 179 and from there through the line 178i, cylinder 178e, line 178g and from there to the right side of the piston of ram cylinder 171. Line 178f and cylinder 178e return the pressure to outlet line 178h. As a result, the table moves in the opposite or forward X direction if one or more of the ports of solenoid 179 are open. With the spool 178c in the left position, the pneumatic line 178d is effectively sealed off by a chamber formed by the appropriate spool sections 178c and inner walls of the cylinder 178e.

Signals CLOSE and OPEN are fed to the windings 182a and 182b, respectively, of solenoid 182, cf. FIGS. 3 and 24b, via the respective conductors 665 and 666 and control the position of the spool, not shown, of solenoid 182 so as to cause the grooves on the face 184 of the X detent member 183 associated with solenoid 182 to engage and disengage, respectively, the grooves 180a of the member 180'.

Figure 27A:
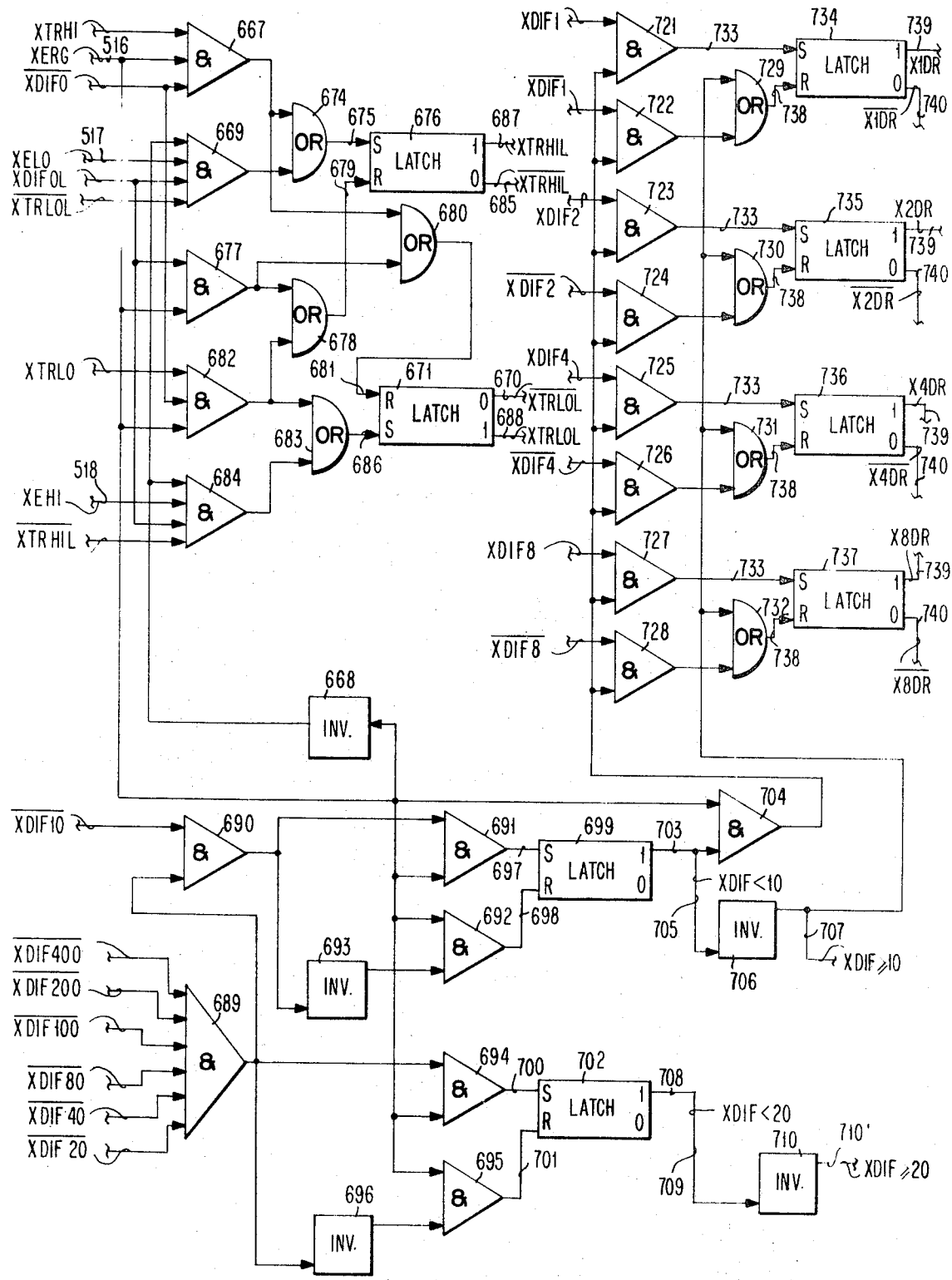
FIGS. 27a–27b are schematic diagrams in block form of the circuitry 519 of FIG. 24b.
Figure 27B:
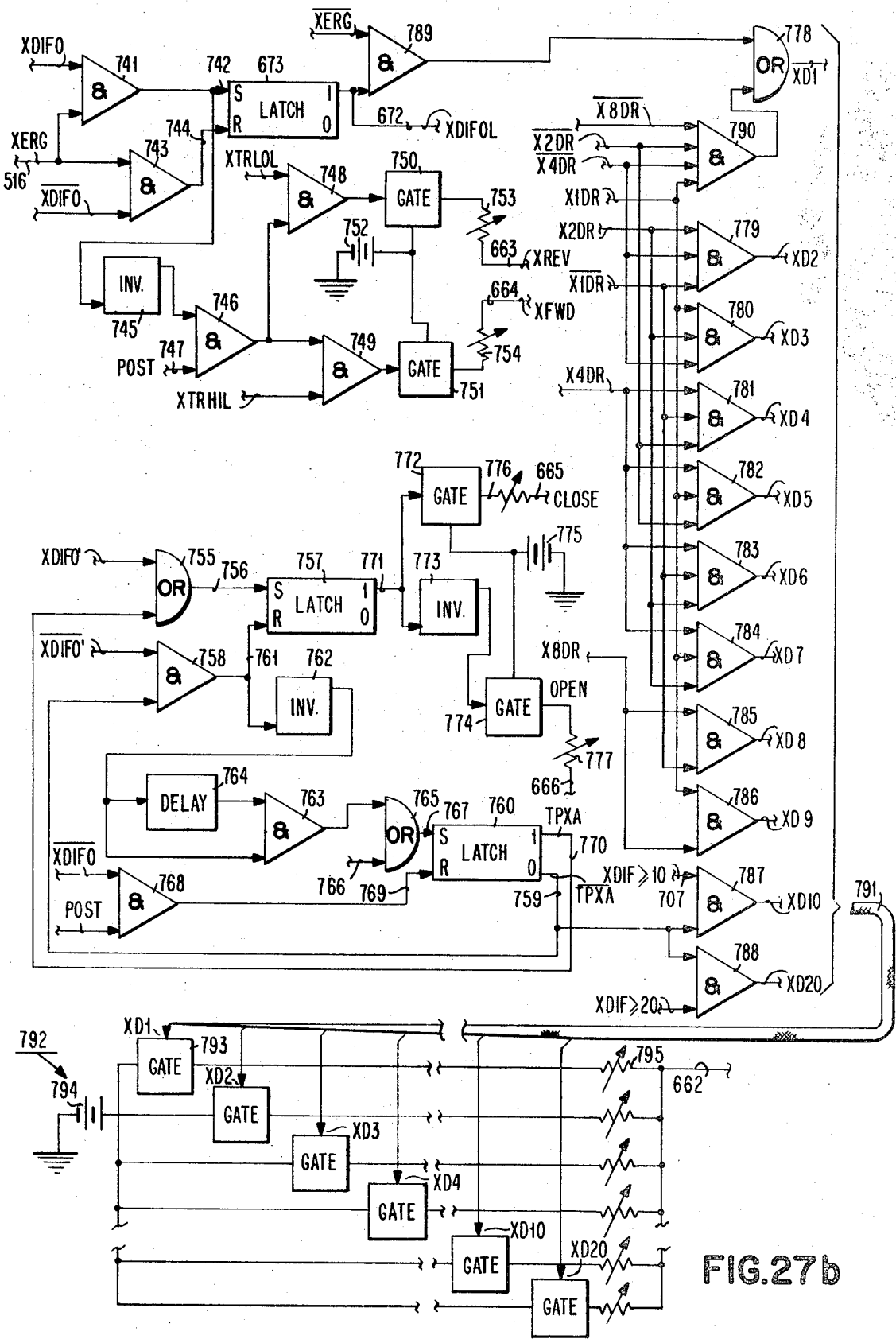

In order to provide the aforementioned control signals MAG., etc., the logic stages associated with the circuitry 519 shown in FIGS. 27a and 27b decode the output signals from comparator 505, the signals XERG, XEHI, XELO derived from the synchronizing bits of each optical encoder 232 of sensor 120, and a signal POST which is obtained from the data processor 116 via the multi-conductor cable 116'. As shown in greater detail in FIG. 27a, AND circuit 667 ANDs the signals XTRHI, XERG, and $\overline{\text{XDIF0}}$ obtained from OR circuit 585, FIG. 26d, AND circuit 515, FIG. 24a, and inverter circuits 588, FIG. 26d, respectively. An inverter 668 inverts the signal XERG and the inverted signal is ANDed by AND circuit 669 with the signals XELO, XDIFOL, and $\overline{\text{XTRLOL}}$. Signal XELO is obtained via conductor 517 from the output signal, if present, appearing at the arm 513 of potentiometer 511, cf. FIG. 24a. Signal $\overline{\text{XTRLOL}}$ is obtained from the 0 output 670 of the latch circuit 671, FIG. 27a. Signal XDIFOL is obtained from the 1 output 672 of the latch 673 of FIG. 27b. The outputs of AND circuits 667 and 669 are ORed by OR circuit 674, FIG. 27a, the output of the latter being connected to the set input 675 of latch circuit 676. AND circuit 677 ANDs the signals XDIFOL and XERG. One input of OR circuit 678 is connected to the output of AND circuit 677 and the output of circuit 678 is connected to the reset output 679 of the latch circuit 676. OR circuit 680 ORs the signals from AND circuits 667 and 677 and its output is connected to the reset input 681 of the latch 671. AND circuit 682 ANDs the signal XTRLO from inverter 586, cf. FIG. 26d, with the signals $\overline{\text{XDIFO}}$ and XERG. The output of AND circuit 682 is connected to the other input of OR circuit 678 and is also connected to an input of OR circuit 683. AND circuit 684 ANDs the signal $\overline{\text{XTRHIL}}$, which is derived from the 0 output 685 of latch 676 with the inverted signals $\overline{\text{XERG}}$ and the signals XDIFOL and XEHI, the latter being obtained via conductor 518 from the signal, if present, at the arm 514 of potentiometer 512, cf. FIG. 24a. The output of AND circuit 684 is connected to the other input of OR circuit 683, the output of the latter in turn being connected to the set input 686 of latch 671. Latch 676 and 671 generate at their respective 1 output terminals 687 and 688 the signals XTRHIL and XTRLOL, respectively, which are utilized by AND circuits hereinafter designated by the reference numbers 748 and 749, respectively, FIG. 27b, of a logic stage of circuit 519 associated with driving the table 117 in the proper X direction as hereinafter described. The not counterpart signals $\overline{\text{XTRHIL}}$ and $\overline{\text{XTRLOL}}$ are utilized to enable the AND circuits 684 and 699, respectively, as aforementioned.

Logic stage 689–710', FIG. 27a. generates signals XDIF<10, XDIF≥10, XDIF<20, and XDIF≥20 whenever the number in the table register 503 is less than 10 decimal positions, is 10 or more decimal positions, is less than 20 decimal positions, and is 20 or more decimal positions, respectively, than the number stored in the encoder register 507. Accordingly, signals $\overline{\text{XDIF20}}$, $\overline{\text{XDIF40}}$, $\overline{\text{XDIF80}}$, $\overline{\text{XDIF100}}$, $\overline{\text{XDIF200}}$, $\overline{\text{XDIF400}}$ from comparator 505 are ANDed by AND circuit 689. AND circuit 690 ANDs the signal $\overline{\text{XDIF10}}$ with the output of AND circuit 689. Signal XERG is ANDed with the output of AND circuit 690 by AND circuit 691. AND circuit 692 ANDs the signal XERG with the inverted signal of AND circuit 690 provided by inverter 693. AND circuit 694 ANDs the output of AND circuit 689 with the signal XERG; and AND circuit 695 ANDs the output of signal XERG with the inverted output of AND circuit 689 provided by inverter 696. The outputs of AND circuits 691 and 692 are utilized to control the respective set and reset input 697 and 698, respectively, of the latch 669. AND circuits 694 and 695 are utilized to control the respective set and reset input 700 and 701, respectively, of the latch 702. The 1 output 703 of the latch 699 is ANDed with the signal XERG by the AND circuit 704. The 1 output 703 provides the signal XDIF<10 and is also connected via conductor 705 to the input of an inverter 706. Consequently, the output of inverter 706 provides the signal XDIF≥10 at the conductor 707. The 1 output 708 of latch 702 provides the signal XDIF<20 and is connected via conductor 709 to the input of inverter 710. The output of the latter, in turn, provides the output signal XDIF<20 on conductor 710'. Initially, the 1 output 703 of latch 699 is set or maintained, as the case might be, in the 1 condition if the decimal difference of the numbers in the registers 503 and 507 is less than 10 via an application of the input signal from AND circuit 691 to the set terminal 697. However, if the decimal difference is 10 or more, the latch 699 is reset or maintained, as the case might be, in its 0 condition when a signal is applied to its reset terminal 698 from AND circuit 692. Latch 702 has a similar operation when the decimal difference between the numbers in the registers 503 and 507 is less than 20 with the 1 output 708 being placed in a 1 condition by the application of a signal to its set input 700 from AND circuit 694 under these circumstances. If the decimal difference is 20 or greater, then the 1 output of latch 702 is reset or maintained at the 0 condition by the application of an input signal to its reset input 702 from AND circuit 695. Accordingly, if the difference between the numbers is 20 or more, an output signal appears on conductor 710' as well as conductor 707. Signals XDIF≥10 and XDIF≥20 are utilized by the AND circuit, hereinafter designated by the reference numbers 787 and 788, respectively, FIG. 27b, of a logic state of circuit 519 associated with regulating the rate of speed for driving the table 117, as will be hereinafter discussed. Signal XDIF<10, when ANDed with signal XERG via AND circuit 704 and the signal XDIF≥10 are utilized in still another logic state of circuit 519 now to be described.

When the decimal difference between the numbers in the registers 503 and 507 is less than 10, the signals XDIF1, XDIF2, XDIF4, and XDIF8, as well as their respective not counterparts signals $\overline{\text{XDIF1}}$, etc., which collectively represent the particular unit decimal difference in a 1-2-4-8 binary code, and which are obtained from the comparator 505, are utilized to provide latch control signals X1DR, X2DR, X4DR, and X8DR. More specifically, signals XDIF1, XDIF2, XDIF4, and XDIF8 are ANDed with the output signal of AND circuit 704 in the AND gates 721, 723, 725, and 727, respectively, FIG. 27a. The not counterparts signals $\overline{\text{XDIF1}}$, $\overline{\text{XDIF2}}$, $\overline{\text{XDIF4}}$, and $\overline{\text{XDIF8}}$ are ANDed with the output signal of AND circuit 704 by the AND circuits 722, 724, 726, 728, respectively. OR circuits 729–732 or the outputs of AND circuits 722, 724, 726 and 728, respectively, with the signal XDIF≥10 produced at the output of inverter 706. The respective outputs of AND circuits 721, 723, 725, and 727 are connected to the respective set inputs 733 of latches 734–737, respectively. The reset inputs 738 of latches 734–737 are connected to the output of the OR circuits 729–732, respectively. The respective 1 outputs 739 of latches 734–737 provide the aforementioned signals X1DR, X2DR, X4DR, and X8DR, respectively. The outputs 740 of latches 734–737 provide the not counterpart signals $\overline{\text{X1DR}}$, $\overline{\text{X2DR}}$, $\overline{\text{X4DR}}$, and $\overline{\text{X8DR}}$, respectively.

As shown in FIG. 27b, AND circuit 741 ANDs the signal XDIFO, which is obtained from AND circuit 587, FIG. 26d, of comparator 505, and the signal XERG, which is obtained from AND circuit 515, FIG. 24a. AND circuit 741's output is connected to the set input 742 of latch 673. AND circuit 743 ANDs the signal XERG and the signal $\overline{\text{XDIFO}}$ and its output is connected to the reset input 744 of latch 673. Under these circumstances, the signal XDIFOL is set or maintained, as the case might be, at a binary 1 level whenever the number in the registers 503 and 507 are equal and the synchronizing bit, which corresponds to that number, of encoder 232 of sensor 120 causes both sensor diodes 242 and 243, FIG. 13a, to be illuminated by their respective fiber optic elements 244, 245. However, if the difference between the numbers in registers 503 and 507 are not equal, i.e. $\overline{\text{XDIFO}}=1$, and/or the signal XERG is not present, i.e. at a binary 0 level, then the signal XDIFOL is reset or maintained, as the case might be, to a binary 0 level. The output of AND circuit 741 is also connected to an inverter 745, the output of which is connected to one input of AND circuit 746. The other input of AND circuit 746 is connected to the data processor 116 which provides an enabling signal POST, via conductor 747, of multiconductor cable 116', that indicates the condition that data processor 116 is in the table positioning operational mode. The output of AND circuit 746 is connected to one of the inputs of each of the AND circuits 748 and 749. The other input of AND circuit 748 is connected to the 1 output 687 of latch 676, FIG. 27a, and its output controls the normally open gate circuit 750. The other input of AND circuit 749 is connected to the 1 output 688 of latch 671, FIG. 27a, and its output controls the normally open gate circuit 751. Gate circuit 750, when in its closed position, connects the energizing circuit comprising battery 752 and variable resistor 753 via conductor 663 to the winding 178a of sign solenoid 178 causing the table 117 to be driven in the reverse direction along the table's X axis. Gate circuit 751, when closed, connects the energizing circuit comprising battery 752 and variable resistor 754 via conductor 664 to the winding 178b of solenoid 178 causing the table to be driven in an opposite or forward direction along the table's X axis. The signals appearing on conductors 663 and 664 are the aforementioned signals XREV and XFWD, respectively.

In operation, if the number in the table register 503 is higher than the number in the encoder register 507, signal XTRHIL, which is derived from the 1 output of latch 676 is at a binary 1 level, as aforementioned. As a consequence, gate circuit 750 is closed causing the table 117 and the encoder 232 of sensor 120 to be moved from the lower numbered positions to the higher numbered position represented by the number in register 503. Conversely, if the number in the table register 503 is lower than the number in the encoder register 507, signal XTRLOL is at a binary 1 level causing gate circuit 751 to close and the table to move from its higher numbered position towards the lower numbered position as represented by the number stored in the table register 503. The complementary action of the latches 671 and 676 provide a complementary controlling action of the gate circuits 750 and 751. More specifically, let it be assumed that the number stored in the table register 503, when gate network 501 is closed, is higher than the number being sensed by the sensor 120 and stored in the encoder register 507. Under these circumstances, the 1 output 687 of latch 676 is set to a binary 1 condition, i.e. signal XTRHIL=1, via the action of the AND circuit 667, OR circuit 674, and the resulting input signal applied to the set input 675. This occurs when the associated synchronizing bit of the encoder 232 of sensor 120 causes the signal XERG to be generated. Simultaneously, the 1 output 688 of latch 671 is set to a binary 0 level, i.e. signal XTRLOL=0, due to the action of AND circuit 667, OR circuit 680 and the resulting signal applied to the reset input 681. Conversely, if the number stored in the table register 503 is lower than the number stored in the encoder register 507, when gate network 501 is closed, the 1 output 688 of latch 671 is set to a binary 1 condition, i.e. signal XTRLOL=1, due to the action of AND circuit 682, OR circuit 683 and resulting input signal applied to the set input 686 when the associated synchronizing bit causes the signal XERG to be generated. Simultaneously, under these latter conditions, the 1 output 687 of latch 676 is set to the binary 0 condition, i.e. XTRHIL=0, due to the action of AND circuit 682, OR circuit 678 and the resulting signal applied to the reset input 679. When the table first begins to approach the desired position and when the sensor unit 120 first begins to sense the address location bits of its encoder 232 which are equal to the bits of the numbers sorted in the table register 503, due to the immediate absence of a synchronizing bit the latches 671 and 676 remain in their respective conditions, as well as latch 673. Assuming that the table is traveling in the forward direction along the X axis and thus the signal XTRHIL and XTRLOL are at binary 1 and 0 levels, respectively, the encoder 232 of sensor 120 next reaches the position illustrated by FIG. 13a and signal XELO is generated. However, latch 673 continues to remain in its respective condition, i.e. XDIFOL=0, due to the absence of a signal XERG to AND circuit 741. As a result, latches 671 and 676 also remain in their respective conditions due to the 0 level of signal XDIFOL applied to AND circuit 669. Simultaneously, signal XDIFO is at a binary 1 level but the spool 179a of solenoid 179 does not close at least one of the ports, e.g. port 179d, as will be explained hereinafter. When the encoder 232 of sensor 120 attains the position illustrated in FIG. 13b, signal XERG is generated causing the latch 673 to be switched, that is signal XDIFOL goes from a binary 0 level to a binary 1 level. As a result, AND circuit 677 via OR circuit 678 and reset input 679 of latch 676 causes signal XTRHIL to go to a binary 0 level thereby opening gate 750 and de-energizing winding 178a of solenoid 178. It should be noted that signal XTRLOL remains at the binary 0 level when this occurs. Under these conditions, the spool 179a should normally close all the ports of solenoid 179 as explained hereinafter, but should the table continue to move in the reverse direction due to the effects such as momentum and/or drift of the ram piston 170, or the like, the synchronizing bit of the encoder 232 of sensor 120 would then be placed in the position illustrated by FIG. 13c and the signal XEHI would thereby be generated. As a result of the action of AND gate 684 and OR circuit 683, when this occurs the 1 output 688 of latch 671 is switched, that is signal XTRLOL goes from a binary 0 to a binary 1 level. As a result, winding 178b is energized, and the magnitude solenoid 179 will be actuated accordingly so as to allow the opening of at least one of the ports as explained hereinafter causing the table to move in the opposite or forward direction, whereupon the table is returned to the position associated with the position of the encoder 232 of sensor 120 shown in FIG. 13b. It can also be demonstrated that if the table has been traveling in a reverse direction and overshoots the desired table position, a similar action takes place which causes the table to be driven in its forward direction.

In order to prevent the table from oscillating about the desired position, the logic stage 755–777 is utilized to control the actuation of the X detent solenoid 182. Accordingly, OR circuit 755, FIG. 27b, ORs the signal XDIFO' derived from the AND circuit 590, cf. FIG. 26d, and its output is connected to the set input 756 of latch 757. AND circuit 758 ANDs signal $\overline{\text{XDIFO}'}$ which is derived from inverter 591 of FIG. 26d with the signal $\overline{\text{TPXA}}$ obtained from the 0 output 759 of latch 760. The output of AND circuit 758 is connected to the reset input 761 of latch 757 and is also connected to the input of inverter 762. AND circuit 763 ANDs the output of inverter 762 and the output of the delay circuit 764, the input of the latter being also connected to the output of inverter 762. OR circuit 765 ORs the output of AND circuit 763, the other input terminal 766 of OR circuit 765 being connected to an appropriate reset signal. The output of OR circuit 765 is connected to the set input 767 of latch 760. AND circuit 768 ANDs the signal $\overline{\text{XDIFO}}$ with the signal POST from the data processing unit 116. The output of AND circuit 768 is connected to the reset input 769 of latch 760. The 1 output 770 of latch 760 is connected to the other input of OR circuit 755. The 1 output 771 of latch 757 is connected to a normally open gate 772 and an inverter 773, the output of the latter being connected to the control input of gate circuit 774. Gate circuit 772, when in the closed position, connects the energizing circuit comprising battery 775 and variable resistor 776 via conductor 665 to the winding 182a of solenoid 182. Gate circuit 774, when in the closed position, connects the energizing circuit comprising battery 775 and variable resistor 777 via conductor 666 to the winding 182b of solenoid 182. Gate circuits 772 and 774 also operate in a complementary manner.

In operation, if the number in the table register 503 and the number in the encoder register 507 are not equal after the gate network 501 is closed, AND circuit 768 generates a signal which sets or maintains, as the case might be, the 1 output of trigger 760 to a binary 0 level, i.e. signal TPXA=0, and consequently signal $\overline{TPXA}$ is at a binary 1 level. AND circuit 758 after the time delay provided by delay circuit 589, FIG. 26d, in turn provides an input signal to the reset terminal 761 of latch 757 thereby placing the 1 output 771 in a binary 0 condition. Under these circumstances, the gate circuit 774 is closed and the energizing signal OPEN is applied to the winding 182b of X detent solenoid 182 thereby maintaining the X detent in an unlocked position. Gate 772 remains in an open position and consequently winding 182a is de-energized. Simultaneously, the output signal from AND circuit 758 is reduced to a 0 level via the action of inverter 762 and consequently has no affect on the set input 767 of latch 760. Latch 757 remains in this condition until the signal XDIF0' is generated by the output of AND circuit 590, FIG. 26d, at which time the numbers in the registers 503 and 507 are equal. As a result, AND circuit 755 generates an output signal to the set input 756 of latch 757 and causes the 1 output to switch to a binary 1 level, thereby closing and opening gates 772 and 774, respectively, the time delay of circuit 589 being such that the gate 772 closes when the synchronizing bit of the encoder 232 of sensor 120 is in the position illustrated by FIG. 13b. As a result, the winding 182a is energized and the X detent actuated into its locked position. Simultaneously, due to the now present 0 level of the signal $\overline{XDIF0'}$, the output of AND circuit 758 is at a 0 level having no affect on the set input 756 of the latch 757. However, due to the action of inverter 762, delay circuit 764 and AND circuit 763 via the OR circuit 765 and resulting input signal to the set input 767, the latch 760 switches, that is the signal TPXA goes from a binary 0 level to a binary 1 level, the latches 757 and 760 remaining in these conditions until completion of the test of the particular hole H then currently under test. When the information regarding the next table position is placed into the register 503 by closure of the gate network 501, AND circuit 768 provides an output signal which resets the trigger 760 and the cycle is repeated. The time delay of circuit 764 is of sufficient duration to prevent the switching of the latch 760 should the table temporarily overshoot the desired position in the manner aforedescribed. If under the latter conditions such an overshoot occurs, the signal $\overline{XDIF0'}$ is again returned to a binary 1 level which when ANDed by AND circuit 758 with the still present 1 level at the 0 output 759 of latch 760 causes the 1 output 771 of latch 757 to return to a binary 0 level and the gate circuits 772 and 773 to open and close, respectively, thereby de-energizing and energizing the windings 182a and 182b, respectively, so as to place the X detents in their unlocked positions and allow the direction of the table 117 to be reversed, as aforedescribed. When the table is again in the desired position such that the encoder 232 of the sensor 120 is in the position illustrated by FIG. 13b, the gate circuits 772 and 777 are subsequently closed and opened, respectively, thereby energizing and de-energizing the windings 182a and 182b, respectively, and placing the X detent into its locked position.

The logic stage for generating the signals XD1–XD10, and XD20 which control the number of the spool 179a of the magnitude solenoid 179 will now be described. Accordingly, the magnitude signal XD1 is generated by the output of OR circuit 778. The magnitude signals XD2–XD10 and XD20 are generated by the outputs of the AND circuits 779–788, respectively. AND circuit 789 ANDs the signal $\overline{XERG}$ and the signal XDIFOL which is generated at the 1 output of latch 673. The output of AND circuit 789 is coupled to an input of OR circuit 778. As such, when the encoder 232 of sensor 120 is in either of the positions illustrated in FIGS. 13a and 13c, and the numbers in the registers 503 and 507 are equal, the signal XD1 is generated and, as will be shown later, the spool 179a of solenoid 179 is in a position that maintains the extreme left port 179d as viewed from FIG. 3 in an open position. AND circuit 790 ANDs the signal X1DR from latch 734, FIG. 27a, with the not signals $\overline{X2DR}$, $\overline{X4DR}$, $\overline{X8DR}$ and its output is connected to the other input of OR circuit 778. Thus, the signal XD1 is also generated whenever the decimal difference between the numbers in registers 503 and 507 is equal to 1. AND circuit 779 ANDs the signal X2DR with the not signals $\overline{X1DR}$ and $\overline{X4DR}$. AND circuit 780 ANDs the signals X1DR, X2DR with the not signal $\overline{X4DR}$. AND circuit 781 ANDs the signals X4DR with the not signals $\overline{X2DR}$ and $\overline{X1DR}$. AND circuit 782 ANDs the signals X1DR and X4DR with the not signal $\overline{X2DR}$. AND circuit 783 ANDs the signals X2DR and X4DR with the signal $\overline{X1DR}$. AND circuit 784 ANDs the signals X1DR and X2DR and X4DR. Signal X8DR is ANDed with the signal $\overline{X1DR}$ by AND circuit 785. Signals X1DR and X8DR are ANDed by AND circuit 786. The signals XD2, XD3 . . . XD9 are generated by the respective AND circuits 779–786 when the decimal difference between the numbers in register 503 and 507 are 2, 3 . . . 9, respectively. Signal $\overline{TPXA}$, which is derived from the 0 output 759 of the latch 760, is ANDed with the signal XDIF≥10 which is obtained via conductor 707 from the inverter 706, FIG. 27a, by AND circuit 787. Signal $\overline{TPXA}$ and the signal XDIF≥20, derived from the inverter 710, FIG. 27a, via conductor 710', are ANDed by AND circuit 788. The signals XD10 and XD20 are generated, i.e. at respective binary 1 levels, when the decimal difference between the numbers in registers 503 and 507 are at least 10 or greater and at least 20 or greater, respectively, and the signal $\overline{TPXA}$ is at a binary 1 level, which will be the case when the numbers in registers 503 and 507 are not equal. The signals XDIF1–XDIF10 and XDIF20 are fed via the multiconductor cable 791 to an energizer circuit indicated generally by the reference numeral 792 and partially shown in FIG. 28b for sake of clarity. Each of the signals XD1–XD20 controls an individual gate circuit, e.g. gate 793. Each of the gates, when closed, connects the energizing circuit comprising the battery 794 and an associated resistor, e.g. resistor 795, via conductor 662 to the winding 179' of the magnitude solenoid 179.

In the preferred embodiment, when the numbers stored in the encoder register 507 differs by 20 or more decimal positions from the number stored in the table register 503, the gate circuits controlled by signals XD10 and XD20 are closed. Under these conditions a maximum current of sufficient amplitude is transmitted to the winding 179' via conductor 662 which positions the spool 179a to the extreme righthand position as viewed from FIG. 3 causing all the ports, e.g. port 179d, of solenoid 179 to be opened and the table to be driven in the X direction at its maximum rate of speed. As the table is driven to the desired position in the X direction, the number in the optical encoder register 507 continues to be updated due to the consequent movement imparted to the encoder 232 of sensor 120. As the table moves along the X direction, the number stored in the register 507 starts to approach the number stored in the table register 503, the number of register 507 either being sequentially increased or decreased depending on whether the number in the table register 503 is higher or lower than the number in the encoder register 507. When the decimal difference between the numbers stored in the registers 503 and 507 is equal to 19, the level of signal XD20 returns to its 0 position thereby opening its associated gate circuit and diminishing the energizing current in the winding 179', causing the table to be driven in the particular X direction at a reduced rate of speed. As long as the decimal difference between the registers 503 and 507 remains less than 20 but more than 9, the control signal XD10 is present thereby maintaining its associated gate circuit in the closed position and the table continues to be driven in the particular X direction at the aforementioned reduced rate of speed. When the difference becomes equal to the decimal number 9, the level of the control signal XD10 returns to zero thereby closing its associated gate circuit. Simultaneously, the signal XD9 appears and enables tis associated gate circuit, not shown, and thereby providing an energizing current in the winding 662 of an appropriate level which further reduces the rate of speed at which the table is being driven. Signals XD1–XD9 are generated in sequential inverse order due to the continuing movement of the table and consequently each of the gate circuits associated with these signals are sequentially closed and opened when its particular controlling signal is present and absent, respectively. As each gate is sequentially operated, the amplitude of the energizing current in the winding 179' is sequentially reduced causing the spool 179a to sequentially close one or more of the ports of solenoid 179 in a predetermined manner. As a result, the rate of speed of the table 117 is sequentially reduced so that when the difference between the numbers in the registers 503 and 507 is equal to the decimal number 1, the table will be operated at its minimum speed. When the numbers in the registers are equal, and the signal XERG is at a binary 1 level, the controlling signals XD1–XD20 will all be at their zero levels and consequently their associated gate circuits will all be in their opened positions. When the table is finally in the desired position, the X detent member 183 is actuated, as aforementioned, thereby locking the table in the desired position along the X axis.

In FIG. 28 there is illustrated a set of typical waveforms of certain signals associated with the circuitry 519 when the movement S of the table is initiated in the X forward direction after gate network 501 is first closed and the number in register 503 is higher than the number in register 507. Under these circumstances, it is readily seen that the signals XTRHIL and XTRLOL are set to their respective 1 and 0 levels when the encoder 232 of sensor 120 is placed in the position of FIG. 13b as is indicated by the vertical dash line 796 in FIG. 28.

In FIG. 29 there is illustrated another set of typical waveforms of certain signals associated with the circuitry 519 when the movement S of the table is initiated in the X forward direction after gate network 501 is closed and the number in one of the registers, e.g. register 503, is 440 and the number in the other register, e.g. register 507, is 40. It can be readily seen that under such circumstances from the waveforms of FIG. 29 that both the signals XDIF≤20 and XDIF≤10 are switched to binary 1 levels when the encoder 232 of sensor 120 places the synchronizing bit which is associated with the column of bits representing the number 40 is in the position shown in FIG. 13b as is indicated by the vertical dash line 717 in FIG. 29.

The circuitry 519' performs analogous functions as that of circuitry 519 for driving the table in the Y direction and controlling the solenoids of actuator system 121'. To this end, it is to be undestood that the circuitry 519' has corresponding elements and their respective arrangements as those shown for circuitry 519 but are omitted for sake of clarity.

As seen from the foregoing, when the X registers 503 and 507 are not equal, the X detent will be in a retracted position so as to allow the table to be driven to the X position indicated by register 503. Likewise, when the Y registers 504 and 508 are not equal, the Y detent will be in a retracted position so as to allow the table to be driven to the Y position indicated by register 504.

Figure 30:
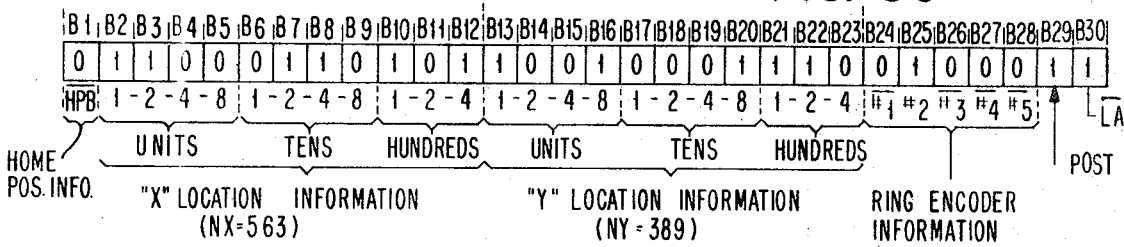
FIG. 30 is a graphical representation of the bits of a typical word associated with the data processor 116 of FIG. 2.

FIG. 30 diagrammatically represents a typical computer word generated by the data processor 116, having thirty-one bit positions B1–B30. Bit B1 contains the home position information. Bits B2–B12 and B13–B23 contain the X and Y table position information in the aforementioned 1–2–4–8 binary code. Bits B24–B28 contain the ring encoder information and bit B29 contains the operational mode information. Bit B30 contains the information associated with the signal $\overline{LS}$. The binary levels of the bits of the example illustrated in FIG. 30 accordingly signify that the table is not in the home position, c.f. bit B1; the X address of the hole to be tested is equivalent to the decimal number 563 and the Y address is equivalent to the decimal number 389, c.f. bits B2–B12 and B13–B23, respectively; encoder ring signal #2 is required to measure the hole at this location, c.f. bit B–25; the system is in the operational mode associated with the signal POST, c.f. bit B–29; and that all the measurements have not yet been completed, c.f. bit B–30.

The test data obtained from the measurements besides measuring the diameter signal and hole location, also may be used to determine the eccentricity of the hole and/or whether there is any debris within the hole(s), and/or used to determine the peripheral configuration of the hole.

CONCLUSION

The principles of this invention have been described with respect to a preferred embodiment and with regards to two specific tests; to wit: diameter and location measuring and for a specific object, to wit: a hole. As is obvious to those skilled in the art, the invention may be utilized for performing other types of measurements and/or tests, and for other types of symmetrical and/or asymmetrical objects. Nor is it meant to limit the number of tests performed by the invention to one or two but as is readily apparent to those skilled in the art, the principles of the invention can be extended to plural tests.

By way of example, it is obvious that the two tests aforedescribed could be operated independently. On the other hand, additional means could be provided to obtain other geometrical characteristic(s) of the object in addition to these two. For example, in the case of the hole, the hole and a third reference mask may be simultaneously scanned so as to determine the geometrical characteristic of the periphery configuration of the hole with respect to an elliptical or square shaped optical indicia configuration.

Figure 31C:
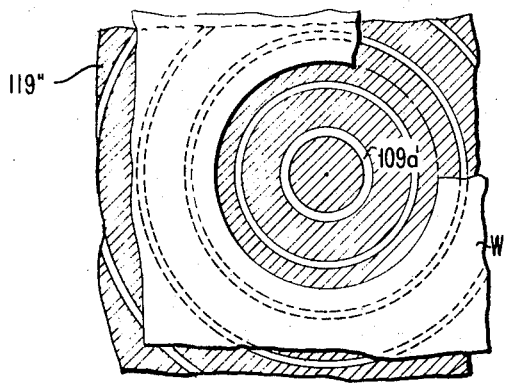
Figure 31D:
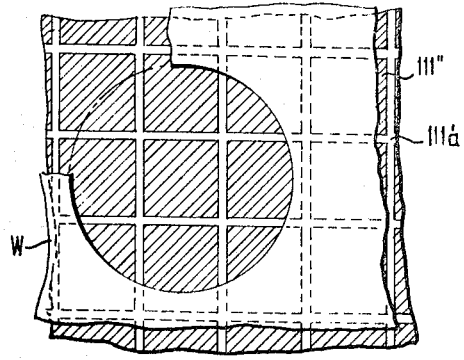

It is to be further understood, that while the optical indicia, e.g. indicium 109a, 111a, of the respective members 109, 111, FIGS. 31a–31b, are in the preferred embodiment selected to be optically opaque with respect to a transparent background, e.g. plate 109, 111; the apparatus can be modified to operate so that the optical characteristics of the indicia and background are reversed such as is shown in FIGS. 31c and 31d by the corresponding similar elements, e.g. elements 109a', 109", 111a', 111". The same is true for the optical indicia, e.g. bit 233, and background, e.g. plate 234', of the sensors 120 and 121.

It is to be further understood that while in the preferred embodiment the scanning element is divided into plural channels and sensed by three separate sensors, that by judiciously positioning one or more of the reference members, e.g. members 109, 111, with respect to the object under test, a single scanning element could simultaneously scan both the object and one, as suggested by the FIGS. 31a–31f, or more of the reference members, in which case only a single sensor need be provided. Under the circumstances, where the scanning element scans plural reference members and the object simultaneously and utilizes a single sensor, the separate tests would be performed on a time sharing basis. In this regard, as is obvious to those skilled in the art, in the aforedescribed preferred embodiment, the apparatus could be modified so that the tests could be performed simultaneously, if desired.

Moreover, as is readily apparent to those skilled in the art, the apparatus may be so modified that the scanning element need not emanate through the object and/or the reference members but may be reflected therefrom and under these circumstances the associated sensors would be positioned accordingly to sense the reflected scanning element.

Figure 31E:
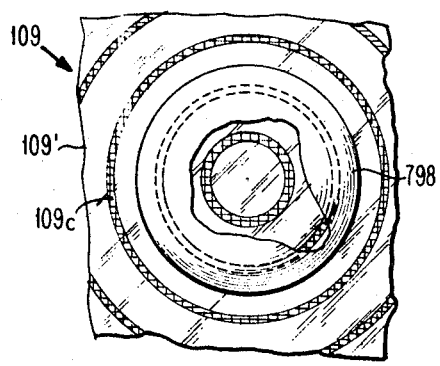
Figure 31F:
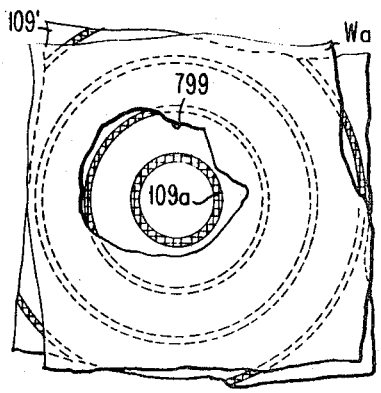

FIGS. 31e and 31f illustrate further extensions of the principle of this invention. In FIG. 31e, a certain geometrical property, e.g. diameter size, of a discrete object such as a solid disc-like object 798 partially broken away for purpose of explanation, is determined, the system being modified so that when the scanning element traverses the edge of the disc the measuring counter is turned on and when it traverses the optical encoder ring 109 it is turned off. In FIG. 31f, the system is utilized to measure the peripheral configuration of an irregular shaped or asymmetrical hole 799 in the workpiece Wa with respect to the encoder ring 109a.

Furthermore, while the invention is described with reference to an optical scanner, as is obvious to those skilled in the art, its principles are applicable to other type radiation scanners such as X-ray, IR, etc.

Thus, while the invention has been particularly shown and described with reference to preferred embodiments thereof, it will be understood by those skilled in the art that the foregoing and other changes in form and details, or combinations thereof, may be made therein without departing from the spirit and scope of the invention.

What is claimed is:

1. Apparatus for determining at least one geometrical property of at least one object having at least one spatial characteristic, said apparatus comprising:
   a reference member having at least one reference indicium;
   scanner means for scanning said object and reference member simultaneously with a scanning element in a radial scanning patter having at least one scan; and
   means for detecting the respective traversements by the scanning element of said spatial characteristic and said indicium to provide in response to said traversements an output signal proportional to said geometrical property.

2. Apparatus according to claim 1 wherein said object and said member are positioned with respect to each other and the path of the scanning element such that said traversements occur within the center portion of the scanning element's path.

3. Apparatus according to claim 1 wherein the path of said scanning element during each of said scans is comprised of three portions, to wit: first and second terminal portions and a third intermediate portion thereof, said apparatus further comprising:
   means for providing the occurrence of said traversements of the characteristics of said object and of the indicium of said reference member during the intermediate portion of said scanning element path.

4. Apparatus according to claim 1 wherein said radial scanning pattern has plural scans, each of which scans has a mutually exclusive predetermined angular position.

5. Apparatus according to claim 1 further comprising:
   a second member having at least one second reference indicium;
   said scanning element further scanning said object and said second reference member simultaneously in a radial scanning pattern having at least one scan; and
   said means for detecting further detecting the respective traversements by the scanning element of said spatial characteristic and said second reference indicium to provide an output signal proportional to a second different geometrical property of said object.

6. Apparatus for determining plural different geometrical properties of at least one object having at least one spatial characteristic, said apparatus comprising:
   plural reference members, each of said reference members having at least one reference indicium;
   scanner means for scanning said object and reference members simultaneously with a scanning element in a radial scanning pattern having at least one scan; and
   means for detecting the respective traversements by the scanning element of said spatial characteristic and said indicia of said members to provide in response to said traversements a plurality of output signals, each of said output signals being proportional to a mutually exclusive one of said geometrical properties.

7. Apparatus according to claim 6 wherein said object and said members are positioned with respect to each other and the path of the scanning element such that said traversements occur within the center portion of the scanning element's path.

8. Apparatus according to claim 6 wherein the path of said scanning element during each of said scans is comprised of three portions, to wit: first and second terminal portions and a third intermediate portion thereof, said apparatus further comprising:
   means for providing the occurrence of said traversements of the characteristic of said object and of the indicium of said reference member during the intermediate portion of said scanning element path.

9. Apparatus according to claim 6 wherein said radial scanning pattern has plural scans, each of which scan has a mutually exclusive predetermined angular position.

10. Apparatus for determining at least one geometrical property of at least one object having at least one optical discriminative characteristic, said apparatus comprising:
    a reference member having a predetermined array of optical discriminative indicia;
    scanner means for simultaneously scanning said object and said reference member with a light beam scanning element in a radial scanning pattern having a predetermined number of plural scans, each of said radial scans of said pattern commencing at a common origin and having a predetermined different angular position, said light beam during each of said scans traversing said optical discriminative characteristic and a predetermined one of said indicia; and
    optical sensor means for sensing during each of said radial scans the respective traversements by said light beam of said optical discriminative characteristic and the indicium associated with the particular scan, said optical sensor means providing in response to said traversements an output signal proportional to said geometrical property.

11. Apparatus according to claim 10 wherein the path of said scanning element during each of said scans is comprised of three portions, to wit: first and second terminal portions and a third intermediate portion thereof, said apparatus further comprising:
    means for providing the occurrence of said traversements of the characteristic of said object and of the particular indicium of said reference member during the intermediate portion of said scanning element path.

12. Apparatus for determining plural different geometrical properties of at least one object having at least one optical discriminative characteristic, said apparatus comprising:
    plural reference members, each of said reference members having a predetermined array of optical discriminative indicia;

scanner means for simultaneously scanning said object and said reference members with a light beam scanning element in a radial scanning pattern having a predetermined number of plural scans, each of said radial scans of said pattern commencing at a common origin and having a predetermined different angular position, said light beam during each of said scans traversing said optical discriminative characteristic and a predetermined one of the indicia of at least one of said reference members; and optical sensor means for sensing during each of said radial scans the respective traversements by said light beam of said optical discriminative characteristic and the predetermined one of the indicia of the reference members associated with the particular scan, said optical sensor means providing an exclusive output signal for each of said geometrical properties.

13. Apparatus according to claim 12 wherein the path of said scanning element during each of said scans is comprised of three portions, to wit: first and second terminal portions and a third intermediate portion thereof, said apparatus further comprising:

means for providing the occurrence of said traversements of the characteristic of said object and of the particular indicium of each of said reference members during the intermediate portion of said scanning element path.

14. Apparatus for determining at least one first geometrical property of at least one object, having an optically discriminative periphery, said apparatus comprising:

a flying spot scanner for providing a scanning beam in a first predetermined radial pattern having a predetermined first number of plural scans;

a first reference member having predetermined optical indicia;

beam splitter means aligned with the optical axis of said scanner to provide first and second scanning paths for said light beam;

first and second focusing means in optical alignment with said first and second paths, respectively, for focusing the respective images of said light beam associated therewith incident to said object and said first member, respectively;

first and second optical sensor means for providing first and second control signals, respectively, during each of the radial scans of said first pattern, said first sensor means sensing the light emanating from said object to provide said first control signal during coincidence of the respective image of the light beam associated with said first path and said periphery of said object, said second sensor means sensing the light emanating from said first reference member to provide said second control signal during coincidence of the respective image of the light beam associated with said second path and one of the optical indicia of said first reference member; and counter means providing during each scan of said first pattern a first output pulse signal having a predetermined pulse repetition frequency at the output thereof, said counter having first and second control inputs, one of said first and second control inputs being responsive to said first control signal, and the other of said first and second inputs being responsive to said second control signal; one of said first and second control inputs in response to the particular one of said first and second control signals applied thereat initiating the operation of said counter during each scan of said first pattern and the other of said first and second inputs in response to the other of said first and second control signals applied thereat subsequently stopping the operation of said counter during each scan of said first pattern, said first output signal being proportional to at least said one first geometrical property.

15. Apparatus according to claim 14 wherein each of the first and second paths of said scanning element during each of said scans is comprised of three portions, to wit: first and second terminal portions and a third intermediate portion thereof, said apparatus further comprising:

means for providing the occurrence of said traversements of said periphery of said object and of the indicia of said first reference member during the intermediate portion of said scanning element paths.

16. Apparatus according to claim 14 wherein said flying spot scanner provides a second radial scanning pattern having a predetermined number of plural scans for said scanning beam, and said beam splitter means provides a third scanning path for said light beam; said appaartus further comprising:

a second reference member having predetermined optical indicia;

third focusing means in optical alignment with said third path for focusing the image of said light beam associated therewith incident to said second reference member; and third sensor means for providing a third control signal during each of the radial scans of said second pattern, said third sensor means sensing the light emanating from said second reference member to provide said third control signal during coincidence of the respective image of the light beam associated with said third path and one of the optical indicia of said third reference member; said first optical sensor means providing a fourth control signal during each of the radial scans of said second pattern, said first sensor means further sensing the light emanating from said object to provide said fourth control signal during coincidence of the respective image of the light beam associated with said first path and said periphery of said object, the control input of said counter which is responsive to said second control signal being further responsive to said third control signal, and the other control input of said counter being further responsive to said fourth control signal, one of said first and second control inputs in resopnse to the particular one of the third and fourth control signals applied thereat initiating the operation of said counter during each scan of said second pattern and the other of said first and second inputs in response to the other one of the third and fourth control signals applied thereat subsequently stopping the operation of said counter during each scan of said second pattern, said counter means providing a second output signal proportional to a different second geometrical property of said object in response to said first and third control signals.

17. Apparatus according to claim 16 wherein each of the first, second and third paths of said scanning element during each of said scans is comprised of three portions, to wit: first and second terminal portions and a third intermediate portion thereof, said apparatus further comprising:

means for providing the occurrence of said traversements of said periphery of said object and of the respective indicia of said first, and second reference members during the intermediate portion of said scanning element paths.

18. Apparatus according to claim 16 wherein the predetermined number of said plural scans of said first radial scanning pattern is greater than the predetermined number of said plural scans of said second radial scanning pattern, said plural scans of said first radial scanning pattern having different angular positions, said plural scans of said second radial scanning pattern having angular positions corresponding to preselected angular positions of said first radial scanning pattern.

19. Apparatus according to claim 18 wherein said object is scanned first by the plural scans of said first radial scan pattern and then by the scans of said second radial scanning pattern.

20. Apparatus according to claim 18 wherein said flying spot scanner further includes a deflection system and control means therefor to provide the plural radial scans of said first and second patterns.

21. Apparatus according to claim 18 wherein said plural scans of said first and second radial scanning patterns are arranged in predetermined pairs, one of the scans of each of said pairs being displaced 180 degrees with respect to the other scan of the pair with which it is associated.

22. Apparatus according to claim 18 further comprising:

means for operating the flying spot scanner on a free-running basis and in a blanked condition whenever an object is not under test.

23. Apparatus for determining the size and location of a predetermined number of plural holes drilled in a workpiece, said apparatus comprising:

first and second reference members having first and second optical indicia arrays, said first array of optical indicia being related to predetermined diameter sizes of the holes drilled therein, and said second array of optical indicia being related to a predetermined reference datum;

optical scanner means for providing a light beam scanning element in first, second and third paths, said scanner means further providing first and second radial scanning patterns for said scanning element, each of said patterns having a first and second predetermined number, respectively, of plural scans;

means for focusing said first, second and third paths at a work station, said first reference member and said second reference member, respectively;

means for positioning the workpiece, said means for selectively positioning each of said predetermined number of plural holes at said work station; and first, second and third optical sensor means positioned to sense the light beam of said first, second and third paths, respectively, said first optical sensor being positioned to sense the traversement of said light beam of said first path of the periphery of said hole, and said second and third optical sensor means being positioned to sense the respective traversements of the light beam of said second and third paths, respectively, of the first and second indicia of said first and second reference members, respectively; and indicator means responsive to the outputs of said first and second optical sensor means during the first radial scanning pattern to provide a first output signal proportional to the diameter size of the hole positioned at the working station, said indicator means being further responsive to the outputs of said first and third optical sensor means during the second radial pattern to provide a second output signal proportional to the location of the hole positioned at the working station with respect to said reference datum.

24. Apparatus according to claim 23 wherein each of the first, second and third paths of said scanning element during each of said scans is comprised of three portions, to wit: first and second terminal portions and a third intermediate portion thereof, said apparatus further comprising:

means for providing the occurrence of said traversements of said periphery of said object and of the respective indicia of said first and second reference members during the intermediate portion of said scanning element paths.

25. Apparatus according to claim 23 wherein said optical scanner means further comprises a flying spot scanner system for providing said scanning element and a beam splitter for providing said three paths of said scanning element.

26. Apparatus according to claim 25 wherein each of the first, second and third paths of said scanning element during each of said scans is comprised of three portions, to wit: first and second terminal portions and a third intermediate portion thereof, said flying spot scanner system further comprising:

control means for controlling the intensity of said scanning element, said control means maintaining said scanning element in a blanked condition during said first and second portions and in an unblanked condition during said third intermediate portion of each scan, the respective traversements occurring during each of said scans being in time coincidence with the occurrence of the intermediate portion of the particular scan with which said respective traversements are associated.

27. Apparatus according to claim 23 wherein the predetermined number of said plural scans of said first radial scanning pattern is greater than the predetermined number of said plural scans of said second radial scanning pattern, said plural scans of said first radial scanning pattern having different angular positions, said plural scans of said second radial scanning pattern having angular positions corresponding to preselected angular positions of said first radial scanning pattern.

28. Apparatus according to claim 23 wherein each of said holes is scanned first by the plural scans of said first radial scan pattern and then by the scans of said second radial scanning pattern.

29. Apparatus according to claim 23 wherein said optical scanner further comprises a flying spot scanner, a deflection ssytem and control means therefor to provide the plural radial scans of said first and second patterns.

30. Apparatus according to claim 23 wherein said plural scans of said first and second radial scanning patterns are arranged in predetermined pairs, one of the scans of each of said pairs being displaced 180 degrees with respect to the other scan of the pair with which it is associated.

31. Apparatus according to claim 23 further comprising:

means for operating the flying spot scanner on a free-running basis and in a blanked condition whenever a hole is not under test.

References Cited
UNITED STATES PATENTS

| | | | |
|---|---|---|---|
| 3,112,468 | 11/1963 | Kamentsky | 340—146.3 |
| 3,408,458 | 10/1968 | Hennis | 340—146.3 |
| 2,964,642 | 12/1960 | Hobrough | 343—5MM |

THOMAS A. ROBINSON, Primary Examiner

U.S. Cl. X.R.

235—151.11; 250—219